US012189208B2

(12) United States Patent
Sugimoto et al.

(10) Patent No.: US 12,189,208 B2
(45) Date of Patent: Jan. 7, 2025

(54) LENS CONTROL DEVICE, IMAGING APPARATUS, OPERATION METHOD OF LENS CONTROL DEVICE, AND PROGRAM

(71) Applicant: FUJIFILM Corporation, Tokyo (JP)

(72) Inventors: Masahiko Sugimoto, Saitama (JP); Shinichi Shimotsu, Saitama (JP); Toshihiro Aoi, Saitama (JP); Tetsuya Fujikawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 354 days.

(21) Appl. No.: 17/892,115

(22) Filed: Aug. 21, 2022

(65) Prior Publication Data
US 2022/0397740 A1 Dec. 15, 2022

Related U.S. Application Data

(63) Continuation of application No. PCT/JP2020/039908, filed on Oct. 23, 2020.

(30) Foreign Application Priority Data

Feb. 27, 2020 (JP) .................................. 2020-032182

(51) Int. Cl.
*G02B 7/10* (2021.01)
*G02B 7/28* (2021.01)

(52) U.S. Cl.
CPC .............. *G02B 7/102* (2013.01); *G02B 7/285* (2013.01)

(58) Field of Classification Search
CPC .......... G02B 7/102; G02B 7/285; G02B 7/34; G03B 13/20; G03B 13/36; H04N 23/60
See application file for complete search history.

(56) References Cited

U.S. PATENT DOCUMENTS

| 4,523,828 | A | 6/1985 | Kato |
| 2010/0245657 | A1 | 9/2010 | Adachi et al. |
| 2022/0400240 | A1* | 12/2022 | Fujikawa ............. G02B 27/141 |

FOREIGN PATENT DOCUMENTS

| JP | 2000171682 | 6/2000 |
| JP | 2003322791 | 11/2003 |

(Continued)

OTHER PUBLICATIONS

"International Search Report (Form PCT/ISA/210) of PCT/JP2020/039908," mailed on Dec. 15, 2020, with English translation thereof, pp. 1-5.

(Continued)

*Primary Examiner* — James C. Jones
(74) *Attorney, Agent, or Firm* — JCIPRNET

(57) ABSTRACT

A lens control device includes a processor that performs a control of generating image data for each of first wavelength range light and second wavelength range light by an image sensor, in which the processor estimates a first focus position of a focus lens for the first wavelength range light based on a first focus evaluation value determined in accordance with the image data of the first wavelength range light, estimates a second focus position of the focus lens for the first wavelength range light based on a second focus evaluation value determined in accordance with the image data of the second wavelength range light, and performs a control of moving the focus lens along an optical axis based on the first focus position in a case in which a comparison result obtained by comparing the first focus position with the second focus position satisfies a predetermined condition.

20 Claims, 38 Drawing Sheets

(56) References Cited

FOREIGN PATENT DOCUMENTS

| JP | 2007139848 | 6/2007 |
| JP | 2010230776 | 10/2010 |
| JP | 2017003749 | 1/2017 |

OTHER PUBLICATIONS

"Written Opinion of the International Searching Authority (Form PCT/ISA/237)" of PCT/JP2020/039908, mailed on Dec. 15, 2020, with English translation thereof, pp. 1-8.

"Office Action of Japan Counterpart Application" with English translation thereof, issued on May 23, 2023, p. 1-p. 6.

* cited by examiner

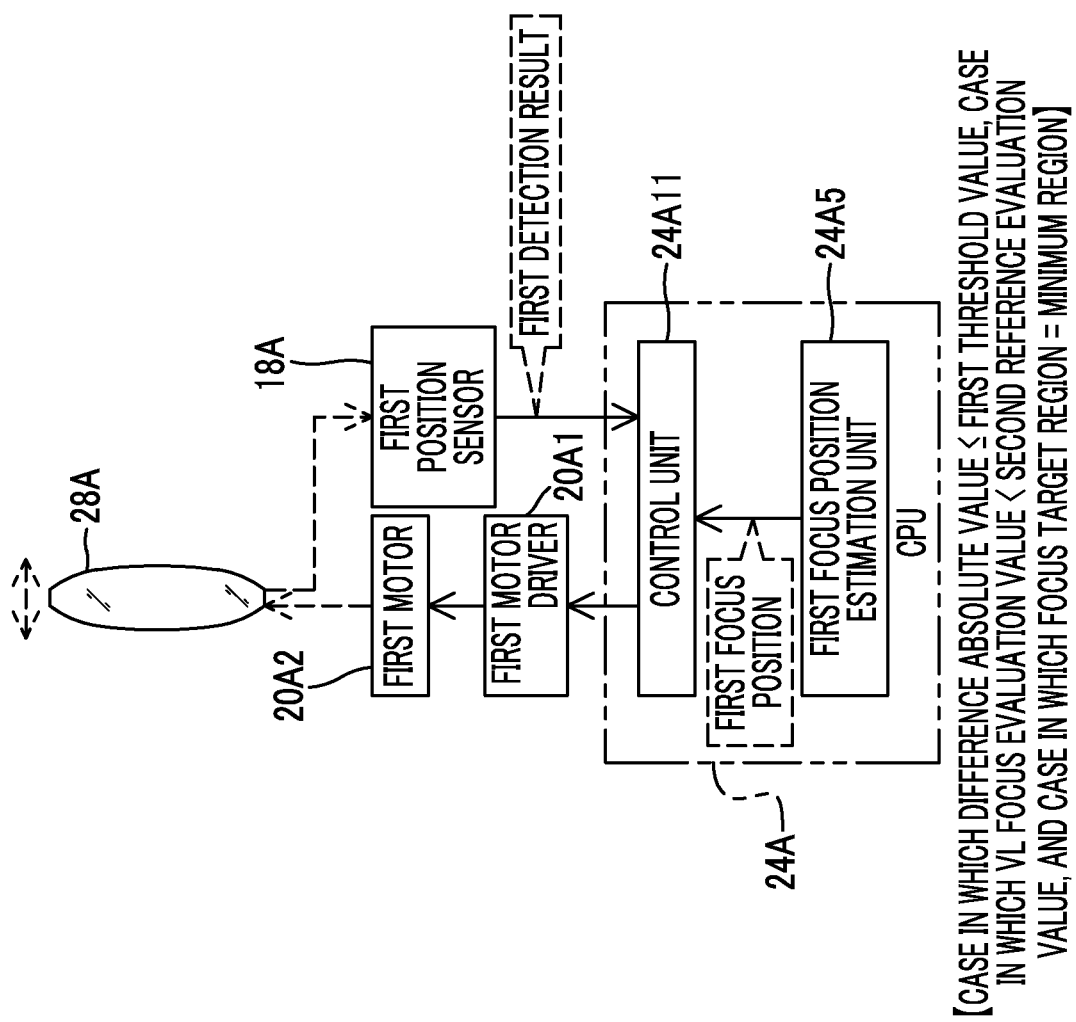

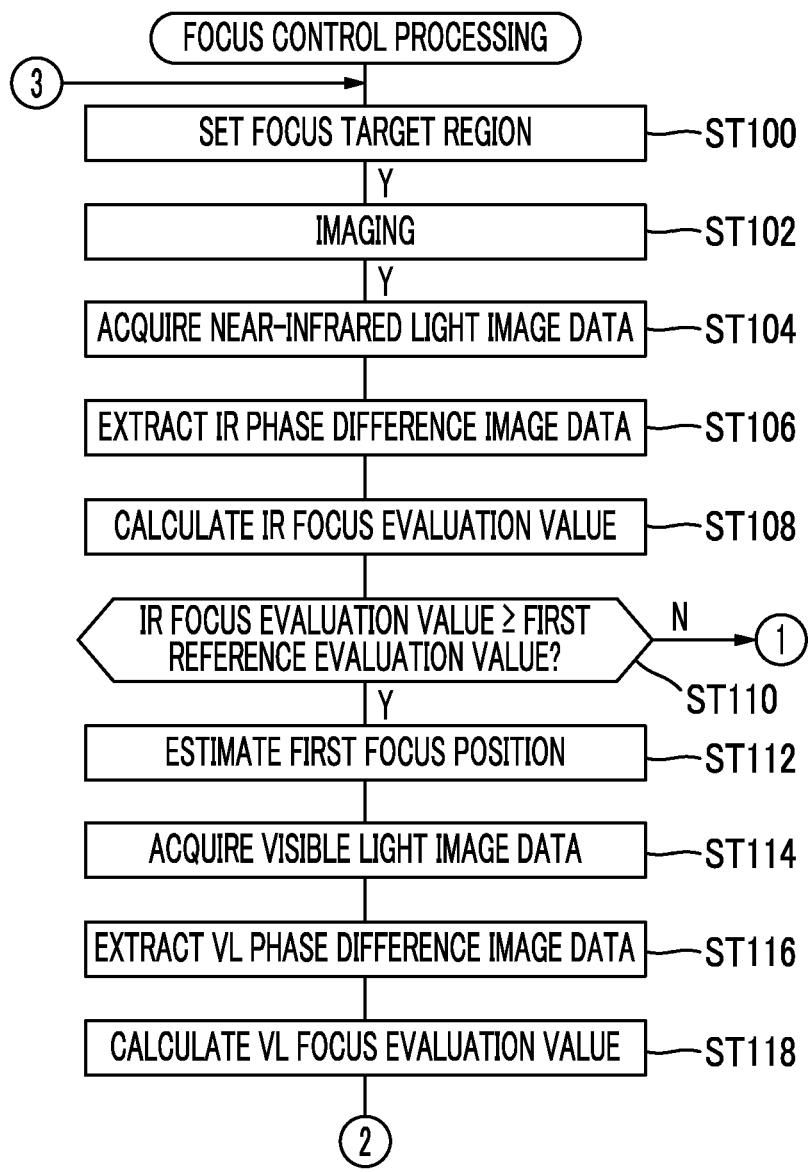

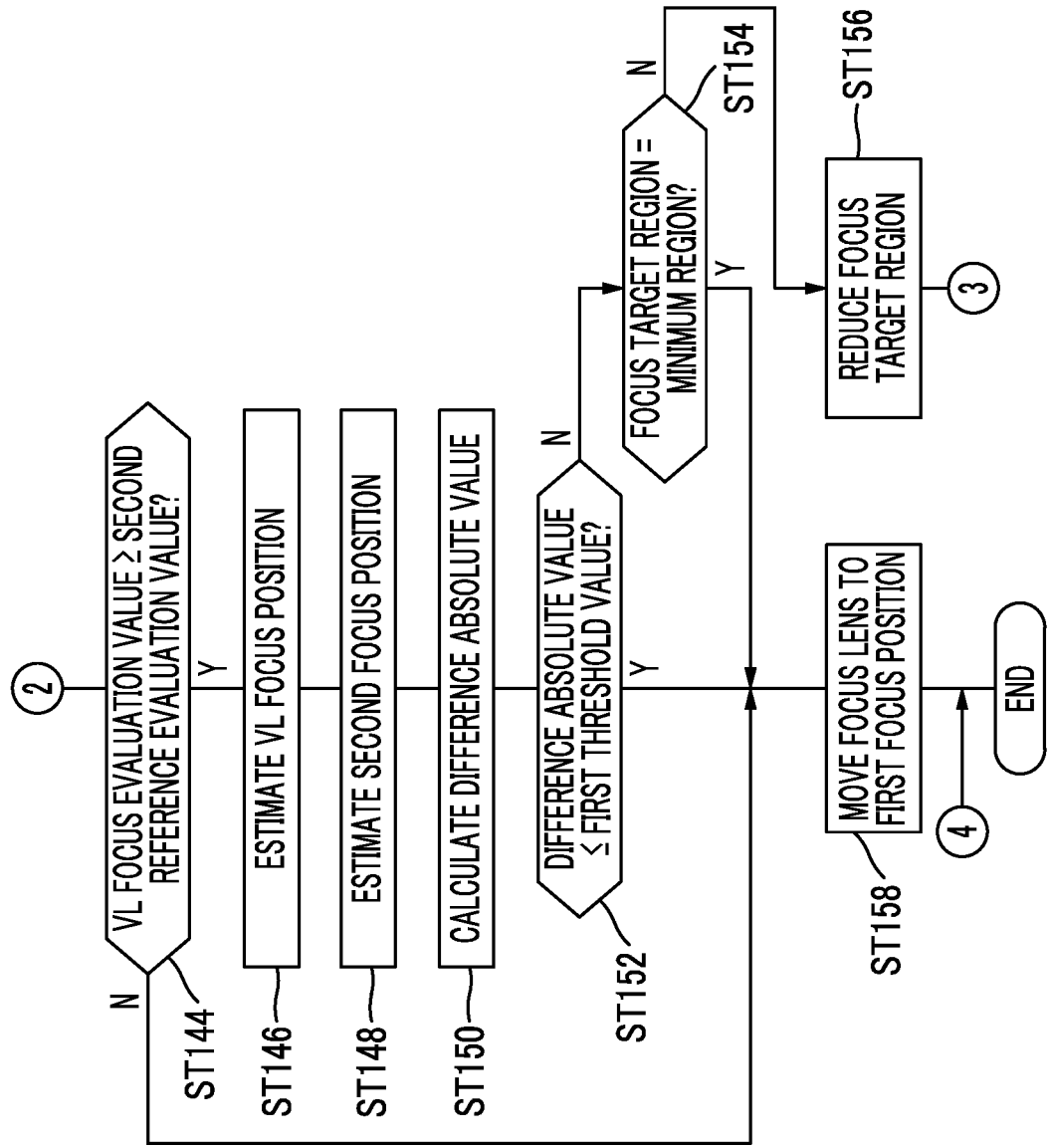

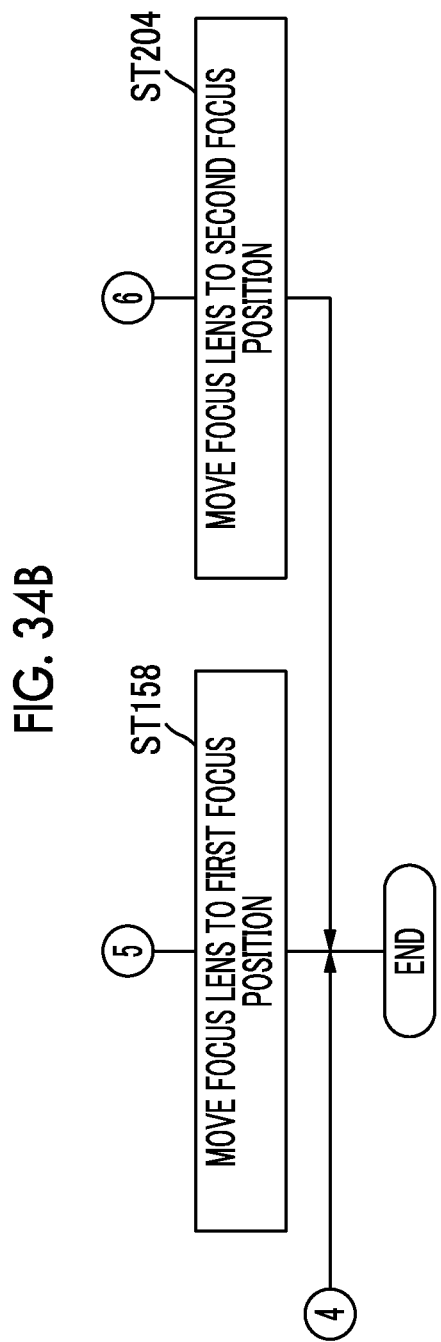

LENS CONTROL DEVICE, IMAGING APPARATUS, OPERATION METHOD OF LENS CONTROL DEVICE, AND PROGRAM

CROSS-REFERENCE TO RELATED APPLICATIONS

This application is a continuation application of International Application No. PCT/JP2020/039908, filed Oct. 23, 2020, the disclosure of which is incorporated herein by reference in its entirety. Further, this application claims priority under 35 USC 119 from Japanese Patent Application No. 2020-032182 filed Feb. 27, 2020, the disclosure of which is incorporated by reference herein.

BACKGROUND

1. Technical Field

The technology of the present disclosure relates to a lens control device, an imaging apparatus, an operation method of a lens control device, and a program.

2. Related Art

JP2010-230776A discloses a focus position adjustment device comprising an imaging optical system that images light from a subject, an imaging unit that generates at least first and second image signals by photoelectrically converting an image of the subject formed by the imaging optical system into the light having at least two different wavelengths or wavelength ranges on an imaging surface, a focus position moving mechanism that moves the imaging optical system in a direction along an optical axis with respect to the imaging surface of the imaging unit, a focus state evaluation unit that evaluates a focus state in each wavelength or wavelength range based on the at least first and second image signals generated by the imaging unit, and a movement control unit that drives the focus position moving mechanism based on the evaluation result of the focus state evaluation unit.

SUMMARY

One embodiment according to the technology of the present disclosure provides a lens control device, an imaging apparatus, an operation method of a lens control device, and a program which can perform highly reliable focusing for a first wavelength range light as compared with a case in which a focus lens is moved to a focus position estimated by using only a focus evaluation value determined in accordance with image data of the first wavelength range light.

A first aspect of the technology of the present disclosure relates to a lens control device comprising a processor that performs a control of generating image data for each of first wavelength range light and second wavelength range light by causing an image sensor in which the first wavelength range light and the second wavelength range light are imaged by an imaging lens including a focus lens that is moved along an optical axis to perform imaging for each of the first wavelength range light and the second wavelength range light, and a memory built in or connected to the processor, in which the processor estimates a first focus position of the focus lens for the first wavelength range light based on a first focus evaluation value determined in accordance with the image data of the first wavelength range light, estimates a second focus position of the focus lens for the first wavelength range light based on a second focus evaluation value determined in accordance with the image data of the second wavelength range light, and performs a control of moving the focus lens along the optical axis based on the first focus position in a case in which a comparison result obtained by comparing the first focus position with the second focus position satisfies a predetermined condition.

A second aspect according to the technology of the present disclosure relates to the lens control device according to the first aspect, in which the comparison result is a value corresponding to a deviation amount between the first focus position and the second focus position, and the predetermined condition is a condition that is equal to or smaller than a first threshold value.

A third aspect of the technology of the present disclosure relates to the lens control device according to the first or second aspect, in which the processor estimates a third focus position of the focus lens for the second wavelength range light based on the second focus evaluation value, and estimates the second focus position based on the third focus position and a focal length of the imaging lens.

A fourth aspect of the technology of the present disclosure relates to the lens control device according to any one of the first to third aspects, in which the processor estimates the first focus position in a case in which the first focus evaluation value is equal to or larger than a first reference evaluation value, and estimates the second focus position in a case in which the second focus evaluation value is equal to or larger than a second reference evaluation value.

A fifth aspect of the technology of the present disclosure relates to the lens control device according to the fourth aspect, in which, in a case in which the second focus evaluation value is smaller than the second reference evaluation value, the processor performs the control of moving the focus lens based on the first focus position.

A sixth aspect according to the technology of the present disclosure relates to the lens control device according to any one of the first to fifth aspects, in which, in a case in which the comparison result satisfies the predetermined condition, the processor selectively performs the control of moving the focus lens along the optical axis based on the first focus position and a control of moving the focus lens along the optical axis based on the second focus position in accordance with a degree of deviation of the second focus position from the first focus position to an infinity side.

A seventh aspect according to the technology of the present disclosure relates to the lens control device according to the sixth aspect, in which, in a case in which the degree of deviation of the second focus position from the first focus position to the infinity side is equal to or smaller than a second threshold value, the processor performs the control of moving the focus lens along the optical axis based on the first focus position.

An eighth aspect according to the technology of the present disclosure relates to the lens control device according to the seventh aspect, in which, in a case in which the degree of deviation of the second focus position from the first focus position to the infinity side exceeds the second threshold value, the processor performs the control of moving the focus lens along the optical axis based on the second focus position.

A ninth aspect according to the technology of the present disclosure relates to the lens control device according to the any one of the first to eighth aspects, in which, in a case in which the comparison result does not satisfy the predetermined condition, the processor reduces a first focus target region included in a first imaging region imaged by the image sensor, causes the image sensor to image the first imaging region for each of the first wavelength range light and the second wavelength range light, and generates the image data of each of the first wavelength range light and the second wavelength range light.

A tenth aspect according to the technology of the present disclosure relates to the lens control device according to the ninth aspect, in which the processor performs a control of reducing the first focus target region to a predetermined minimum region.

An eleventh aspect according to the technology of the present disclosure relates to the lens control device according to the tenth aspect, in which, in a case in which the first focus target region is reduced to the minimum region, the processor selectively performs the control of moving the focus lens along the optical axis based on the first focus position and a control of moving the focus lens along the optical axis based on the second focus position in accordance with a degree of deviation of the second focus position from the first focus position to an infinity side.

A twelfth aspect according to the technology of the present disclosure relates to the lens control device according to the eleventh aspect, in which, in a case in which the degree of deviation of the second focus position from the first focus position to the infinity side is equal to or smaller than a third threshold value, the processor performs the control of moving the focus lens along the optical axis based on the first focus position.

A thirteenth aspect according to the technology of the present disclosure relates to the lens control device according to the twelfth aspect, in which, in a case in which the degree of deviation of the second focus position from the first focus position to the infinity side exceeds the third threshold value, the processor performs the control of moving the focus lens along the optical axis based on the second focus position.

A fourteenth aspect according to the technology of the present disclosure relates to the lens control device according to any one of the first to thirteenth aspects, in which, in a case in which the first focus evaluation value is smaller than a third reference evaluation value, the processor enlarges a second focus target region included in a second imaging region imaged by the image sensor, causes the image sensor to image the second imaging region for each of the first wavelength range light and the second wavelength range light, and generates the image data for each of the first wavelength range light and the second wavelength range light.

A fifteenth aspect according to the technology of the present disclosure relates to the lens control device according to the fourteenth aspect, in which the processor performs a control of enlarging the second focus target region to a predetermined maximum region.

A sixteenth aspect according to the technology of the present disclosure relates to the lens control device according to the fourteenth or fifteenth aspect, in which, in a case in which the second focus target region is enlarged to the maximum region and the second focus evaluation value is smaller than a fourth reference evaluation value, the processor performs a control of moving the focus lens to a fourth focus position determined in accordance with a focal length.

A seventeenth aspect according to the technology of the present disclosure relates to the lens control device according to any one of the first to sixteenth aspects, in which the second wavelength range light is visible light, and the first wavelength range light is light having a longer wavelength than the visible light.

An eighteenth aspect according to the technology of the present disclosure relates to an imaging apparatus comprising the lens control device according to any one of the first to seventeenth aspects, and the image sensor.

A nineteenth aspect according to the technology of the present disclosure relates to an operation method of a lens control device including a processor that performs a control of generating image data for each of first wavelength range light and second wavelength range light by causing an image sensor in which the first wavelength range light and the second wavelength range light are imaged by an imaging lens including a focus lens that is moved along an optical axis to perform imaging for each of the first wavelength range light and the second wavelength range light, and a memory built in or connected to the processor, the method comprising estimating a first focus position of the focus lens for the first wavelength range light based on a first focus evaluation value determined in accordance with the image data of the first wavelength range light, estimating a second focus position of the focus lens for the first wavelength range light based on a second focus evaluation value determined in accordance with the image data of the second wavelength range light, and performing a control of moving the focus lens along the optical axis based on the first focus position in a case in which a comparison result obtained by comparing the first focus position with the second focus position satisfies a predetermined condition.

A twentieth aspect according to the technology of the present disclosure relates to a program causing a computer applied to a lens control device including a processor that performs a control of generating image data for each of first wavelength range light and second wavelength range light by causing an image sensor in which the first wavelength range light and the second wavelength range light are imaged by an imaging lens including a focus lens that is moved along an optical axis to perform imaging for each of the first wavelength range light and the second wavelength range light, and a memory built in or connected to the processor, to execute a process comprising estimating a first focus position of the focus lens for the first wavelength range light based on a first focus evaluation value determined in accordance with the image data of the first wavelength range light, estimating a second focus position of the focus lens for the first wavelength range light based on a second focus evaluation value determined in accordance with the image data of the second wavelength range light, and performing a control of moving the focus lens along the optical axis based on the first focus position in a case in which a comparison result obtained by comparing the first focus position with the second focus position satisfies a predetermined condition.

BRIEF DESCRIPTION OF THE DRAWINGS

Exemplary embodiments of the technology of the disclosure will be described in detail based on the following figures, wherein:

FIG. 28 is a conceptual diagram showing an example of processing contents of the first focus position estimation unit and the control unit in a case in which the difference absolute value is equal to or larger than the first threshold value, in a case in which the VL focus evaluation value is smaller than the second reference evaluation value, and in a case in which the focus target region is the predetermined minimum region;

FIG. 29A is a flowchart showing an example of a flow of focus control processing according to the first embodiment;

FIG. 29C is a continuation of the flowchart shown in FIGS. 29A and 29B;

FIG. 34B is a continuation of the flowchart shown in FIG. 34A; and

DETAILED DESCRIPTION

An example of embodiments of a lens control device, an imaging apparatus, an operation method of a lens control device, and a program according to the technology of the present disclosure will be described with reference to the accompanying drawings.

First, the terms used in the following description will be described.

CPU refers to an abbreviation of "central processing unit". RAM refers to an abbreviation of "random access memory". SSD refers to an abbreviation of "solid state drive". HDD refers to an abbreviation of "hard disk drive". EEPROM refers to an abbreviation of "electrically erasable and programmable read only memory". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". SSD refers to an abbreviation of "solid state drive". CMOS refers to an abbreviation of complementary metal oxide semiconductor. CCD refers to an abbreviation of charge-coupled device. EL refers to an abbreviation of "electro-luminescence". UI refers to an abbreviation of "user interface". A/D refers to an abbreviation of "analog to digital". USB refers to an abbreviation of "universal serial bus". GPU refers to an abbreviation of "graphics processing unit". AF refers to an abbreviation of "auto focus". SWIR refers to an abbreviation of "short-wavelength infrared". VL refers to an abbreviation of "visible light". IR (Ir) refers to an abbreviation of "infrared".

It should be noted that, in the present specification, the term "consisting of ~" means that a lens that has substantially no optical power, an optical element other than the lens, such as a stop, a filter, and a cover glass, a mechanism part, such as a lens flange, a lens barrel, an imaging element, and a shake correction mechanism, may be provided in addition to the described components. In addition, in the description of the present specification, the meaning of "vertical" includes the meaning of a perfect vertical as well as the meaning of a substantially vertical including errors allowed in design and manufacturing. In addition, in the description of the present specification, "match" refers to the match in the sense of including an error generally allowed in the technical field to which the technology of the present disclosure belongs, in addition to the exact match.

First Embodiment

Figure 1:
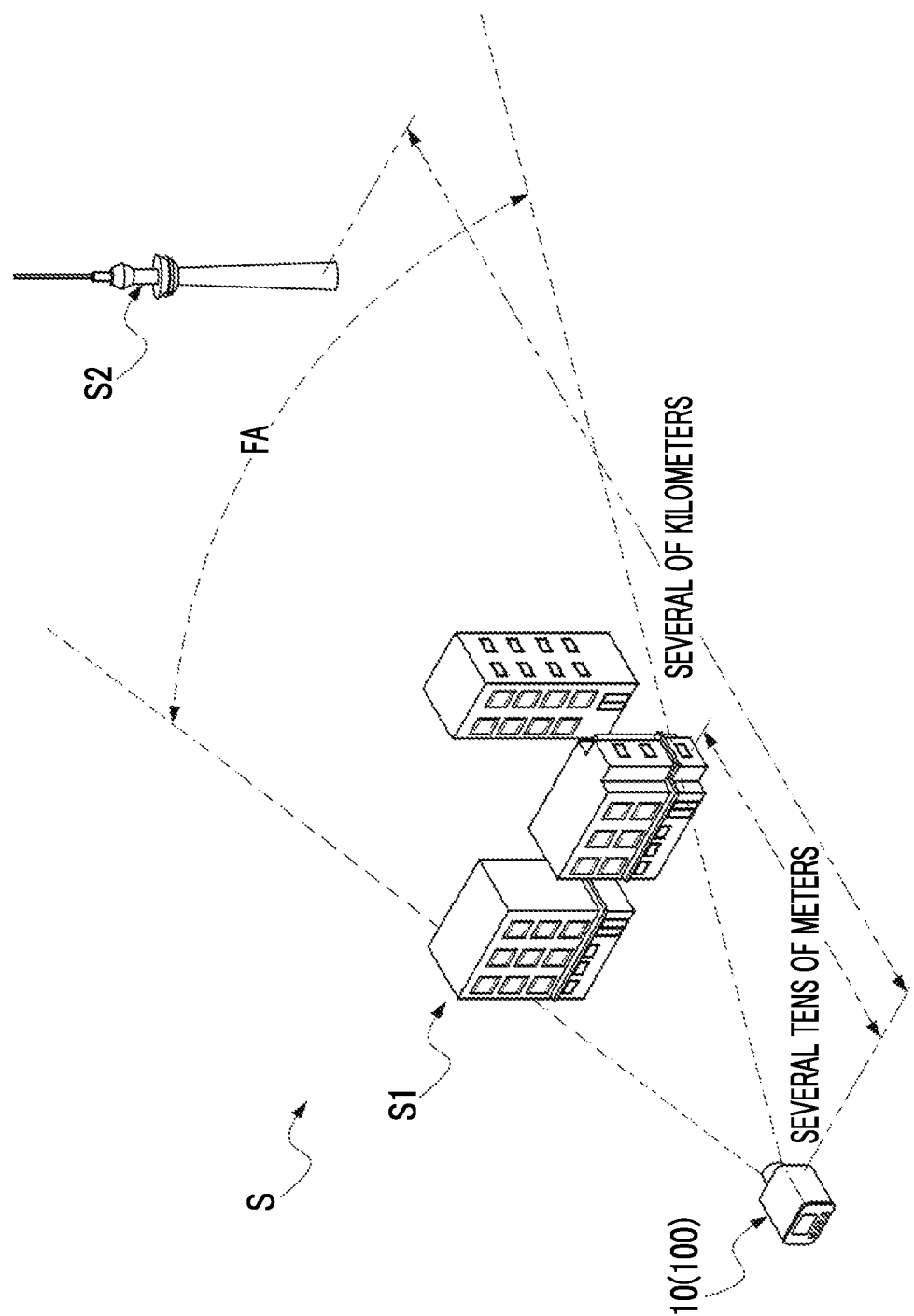
FIG. 1 is a perspective view showing an example of an aspect in which a subject is imaged by an imaging apparatus according to first and second embodiments.

As an example, as shown in FIG. 1, an imaging apparatus 10 images a subject S defined by an angle of view FA. The subject S includes a close-view subject S1 and a distant-view subject S2. The close-view subject S1 is a subject on a side closer to the imaging apparatus 10 than the distant-view subject S2. In the example shown in FIG. 1, the close-view subject S1 is positioned at a position several tens of meters separated from the imaging apparatus 10, and the distant-view subject S2 is positioned at a position several kilometers separated from the imaging apparatus 10. In addition, in the example shown in FIG. 1, several multi-tenant buildings are shown as an example of the close-view subject S1, and a radio tower is shown as an example of the distant-view subject S2. Here, the multi-tenant building and the radio tower are described, but these are merely examples, and any object can be the subject as long as imaging can be performed. It should be noted that the subject S is an example of a "first imaging region" and a "second imaging region" according to the technology of the present disclosure.

Figure 2:
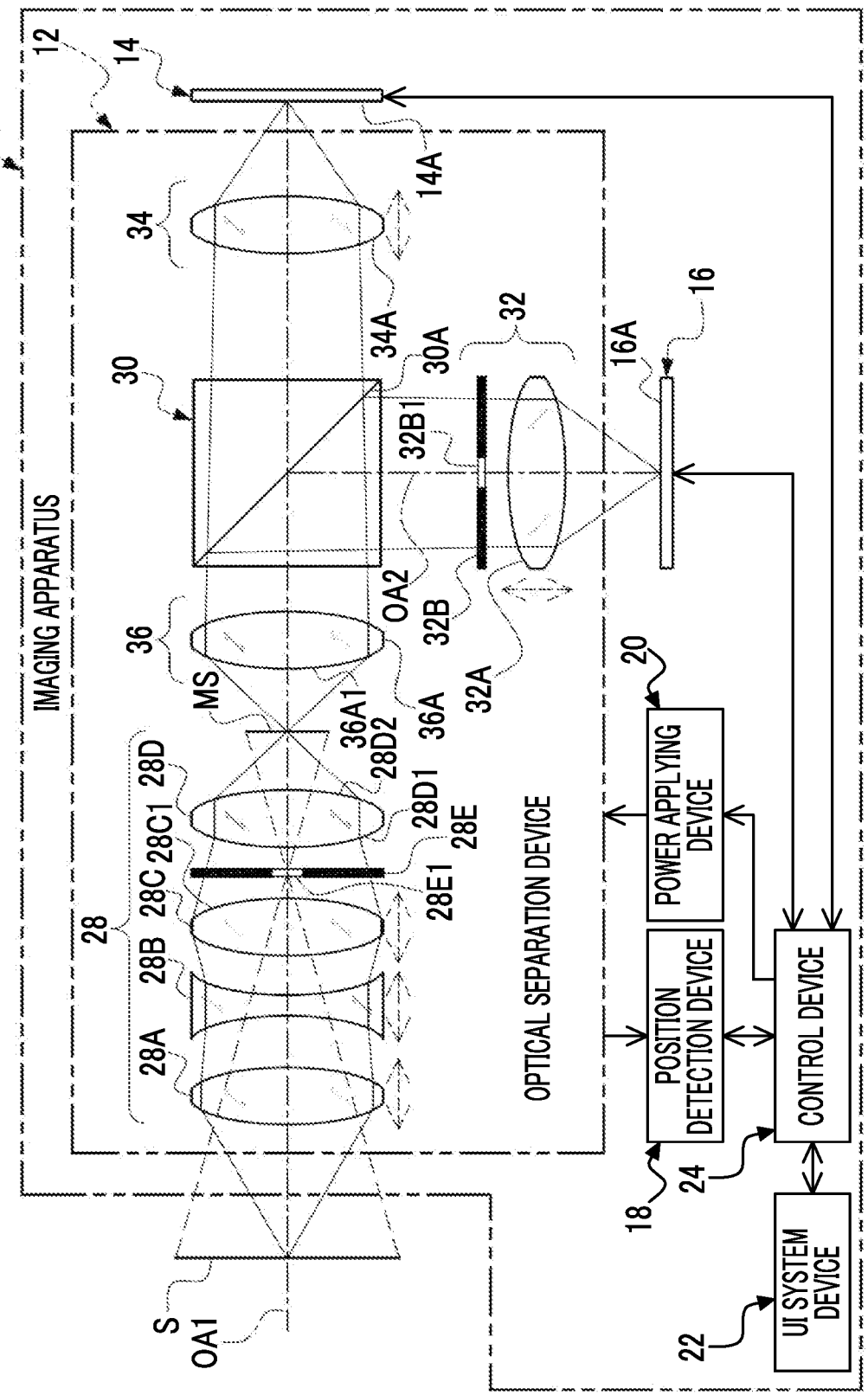
FIG. 2 is a schematic configuration diagram showing an example of a configuration of the imaging apparatus according to the first and second embodiments.

As an example, as shown in FIG. 2, the imaging apparatus 10 comprises an optical separation device 12, a first image sensor 14, a second image sensor 16, a position detection device 18, a power applying device 20, a UI system device 22, and a control device 24. The first image sensor 14 and the second image sensor 16 are examples of an "image sensor" according to the technology of the present disclosure, the control device 24 is an example of a "lens control device" according to the technology of the present disclosure, and the imaging apparatus 10 is an example of an "imaging apparatus" according to the technology of the present disclosure.

The optical separation device 12 is an example of an "imaging lens" according to the technology of the present disclosure, and comprises a first optical system 28, a color separation prism 30, a second optical system 32, a third optical system 34, and a fourth optical system 36.

Subject light indicating the subject S includes visible light, which is light having a visible wavelength range, and light (hereinafter, also referred to as "near-infrared light") having a near-infrared wavelength range, which is light having a longer wavelength than the visible light, as light having different wavelength ranges. The near-infrared light is an example of "first wavelength range light" according to the technology of the present disclosure, and the visible light is an example of "second wavelength range light" according to the technology of the present disclosure.

The first image sensor 14 in which the subject light is imaged by the optical separation device 12 performs imaging for the near-infrared light included in the imaged subject light. The second image sensor 16 in which the subject light is imaged by the optical separation device 12 performs imaging for the visible light included in the imaged subject light. Image data for the near-infrared light is generated by performing imaging for the near-infrared light by the first image sensor 14, and image data for the visible light is generated by performing imaging for the visible light by the second image sensor 16.

The optical separation device 12 is provided with a near-infrared light optical path and a visible light optical path. In the near-infrared light optical path, the first optical system 28, the fourth optical system 36, the color separation prism 30, and the third optical system 34 are disposed in order from a subject side (object side) along an optical axis OA1. The first image sensor 14 is disposed on a subsequent stage of the third optical system 34, that is, on an image side of the third optical system 34.

The first image sensor 14 is a near-infrared light two-dimensional image sensor, and comprises an InGaAs photodiode PD2 (see FIGS. 4, 5, and 6) having sensitivity to the near-infrared light, and a CMOS read-out circuit (not shown). It should be noted that, in the following, for convenience of description, the InGaAs photodiode PD2 will be referred to as a "photodiode PD2".

The first image sensor 14 includes a first light-receiving surface 14A. A plurality of photodiodes PD2 are disposed on the first light-receiving surface 14A, and the first light-receiving surface 14A receives the near-infrared light. The first image sensor 14 photoelectrically converts the near-infrared light received by the first light-receiving surface 14A to image the subject S for the near-infrared light. That is, in the first image sensor 14, the near-infrared light indicating the subject S is imaged, and the first image sensor 14 images the subject S based on the imaged near-infrared light.

The visible light optical path includes the optical axis OA1 and an optical axis OA2. The optical axis OA2 is an optical axis vertical to the optical axis OA1. In the visible light optical path, the first optical system 28, the fourth optical system 36, and the color separation prism 30 are disposed in order from a subject side (object side) along the optical axis OA1. The optical axis OA1 is branched into the optical axis OA2 by the color separation prism 30. In the visible light optical path, the second optical system 32 is disposed along the optical axis OA2 on the image side of the color separation prism 30. The second image sensor 16 is disposed on a subsequent stage of the second optical system 32, that is, on the image side of the second optical system 32. Stated another way, the second optical system 32 is provided between the color separation prism 30 and the second image sensor 16.

The second image sensor 16 is a visible light two-dimensional image sensor, and comprises a S1 photodiode PD1 (see FIGS. 3, 5, and 6) having sensitivity to the visible light, and a CMOS read-out circuit (not shown). It should be noted that, in the following, for convenience of description, the S1 photodiode PD1 will be referred to as a "photodiode PD1". In addition, in a case in which the distinction is not needed, the photodiode PD1 and the photodiode PD2 are referred to as a "photodiode PD".

The second image sensor 16 includes a second light-receiving surface 16A. A plurality of photodiodes PD1 are disposed on the second light-receiving surface 16A, and the second light-receiving surface 16A receives the visible light. The second image sensor 16 photoelectrically converts the visible light received by the second light-receiving surface 16A to image the subject S for the visible light. That is, in the second image sensor 16, the visible light indicating the subject S is imaged, and the second image sensor 16 images the subject S based on the imaged visible light.

It should be noted that, in the following, for convenience of description, an optical system consisting of lenses and the like disposed on the near-infrared light optical path will be referred to as a "near-infrared light optical system", and an optical system consisting of lenses and the like disposed on the visible light optical path will be referred to as a "visible light optical system".

The first optical system 28 is a variable magnification optical system. Specifically, the "variable magnification optical system" used herein is a zoom lens consisting of four groups having positive, negative, positive, and positive optical power in order from the object side. The first optical system 28 includes a plurality of lens units. The term "plurality of lens units" used herein refers to a first lens group 28A, a second lens group 28B, a third lens group 28C, and a fourth lens group 28D.

The first optical system 28 consists of the first lens group 28A, the second lens group 28B, the third lens group 28C, the fourth lens group 28D, and a first stop 28E. Each of the first lens group 28A, the second lens group 28B, the third lens group 28C, and the fourth lens group 28D consists of a plurality of lenses.

In the first optical system 28, the first lens group 28A, the second lens group 28B, the third lens group 28C, and the fourth lens group 28D are disposed in order from the subject side (object side) along the optical axis OA1. The third lens group 28C includes an emission surface 28C1, and the fourth lens group 28D includes an incident surface 28D1 and an emission surface 28D2. The emission surface 28C1 is a surface of the third lens group 28C positioned closest to the image side, the incident surface 28D1 is a surface of the fourth lens group 28D positioned closest to the subject side (object side), and the emission surface 28D2 is a surface of the fourth lens group 28D positioned closest to the image side.

The first stop 28E is disposed between the emission surface 28C1 and the emission surface 28D2. In the example shown in FIG. 2, the aspect is described in which the first stop 28E is disposed at a position (between the emission surface 28C1 and the incident surface 28D1) adjacent to the fourth lens group 28D on the object side with respect to the fourth lens group 28D in a direction of the optical axis OA1, but this is merely an example, and the first stop 28E may be disposed in the fourth lens group 28D.

Each of the first lens group 28A and the fourth lens group 28D is a stationary lens group. The stationary lens group is a lens group fixed to the image plane during changing magnification. Each of the second lens group 28B and the third lens group 28C is a moving lens group. The moving lens group is a lens group in which a distance from the adjacent lens group is changed by moving along the direction of the optical axis OA1 during changing magnification.

Each of the first lens group 28A, the third lens group 28C, and the fourth lens group 28D is a lens group that has a positive power, and the second lens group 28B is a lens group that has a negative power. Here, the lens groups, such as the first lens group 28A, the second lens group 28B, the third lens group 28C, and the fourth lens group 28D, are described, but the technology of the present disclosure is not limited to this. For example, at least one of the first lens group 28A, the second lens group 28B, the third lens group 28C, or the fourth lens group 28D may be one lens.

In the imaging apparatus 10, the adjustment of the focus position is realized by the first optical system 28. The adjustment of the focus position is realized by, for example, a front lens element focus method. In the front lens element focus method, the first lens group 28A is moved along the direction of the optical axis OA1, so that the near-infrared light is imaged on the first light-receiving surface 14A at the focus position in accordance with a subject distance. The "focus position" used herein refers to a position of the first lens group 28A on the optical axis OA1 in a focused state. In addition, here, the first lens group 28A is an example of a "focus lens" according to the technology of the present disclosure.

It should be noted that, in the first embodiment, the front lens element focus method is adopted, but the technology of the present disclosure is not limited to this, and a whole group feeding method, an inner focus method, or a rear focus method may be adopted. The "focus position" in a case of the whole group feeding method, the inner focus method, or the rear focus method refers to a position in a focused state among the positions on the optical axis OA1 of the lens or the lens group that is moved along the direction of the optical axis OA1 to adjust the focus position.

Each of the first lens group 28A, the third lens group 28C, and the fourth lens group 28D is a lens that has a positive power, and the second lens group 28B is a lens that has a negative power.

The subject light is incident on the first optical system 28 from the first lens group 28A, and the first optical system 28 emits the incident subject light via the first stop 28E.

The first stop 28E has an aperture 28E1, and the subject light passes through the aperture 28E1. The aperture 28E1 is disposed at a position at which peripheral rays of the subject light pass through the optical axis OA1. The first stop 28E is a movable stop in which a diameter of the aperture 28E1 can be changed. That is, a light amount of the subject light indicating the subject S can be changed by the first stop 28E.

The fourth optical system 36 is an optical system having a positive power. The fourth optical system 36 comprises a lens group 36A. The lens group 36A is a lens group having a positive power.

The lens group 36A consists of a plurality of lenses. It should be noted that, here, although the lens group is adopted as an example of the fourth optical system 36, the technology of the present disclosure is not limited to this, and a single lens may be used.

The subject light emitted from the first optical system 28 is incident on the fourth optical system 36. The fourth optical system 36 emits the incident subject light to the color separation prism 30.

The color separation prism 30 is an example of a separation optical system that separates the light having different wavelength ranges. The color separation prism 30 separates the subject light emitted from the fourth optical system 36 into the near-infrared light and the visible light by a selective reflecting surface 30A. The color separation prism 30 transmits the near-infrared light and reflects the visible light. That is, the color separation prism 30 guides the near-infrared light to the third optical system 34 along the optical axis OA1 and guides the visible light to the second optical system 32 along the optical axis OA2.

In the first embodiment, the invisible light obtained by separating the subject light by the color separation prism 30 is the near-infrared light. The "near-infrared light" used herein is light having a wavelength longer than about 800 nanometers of the subject light, and the visible light is light having a wavelength equal to or shorter than 700 nanometers. The near-infrared light of the subject light is transmitted through the color separation prism 30 with a transmittance of about 90 percent (%), and the visible light of the subject light is reflected by the selective reflecting surface 30A with a reflectivity exceeding about 90%.

It should be noted that, here, the light having the wavelength longer than about 800 nm is adopted as the near-infrared light, but this is merely an example, and the technology of the present disclosure is not limited to this. That is, since the wavelength range of the near-infrared light has various interpretations depending on theories and the like, the wavelength range defined as the wavelength range of the near-infrared light need only be determined in accordance with the application of the imaging apparatus 10. In addition, the same applies to the wavelength range of the visible light.

In addition, although the color separation prism 30 is described here, the technology of the present disclosure is not limited to this, and the subject light may be separated into the near-infrared light and the visible light by a dichroic mirror and/or a half mirror instead of the color separation prism 30. It should be noted that, in a case in which the half mirror is used, it is preferable that the light having an unneeded wavelength range be removed, by a filter, from the near-infrared light and the visible light obtained by separating the subject light.

The second optical system 32 is disposed on the image side of the color separation prism 30 along a direction of the optical axis OA2, and comprises a relay lens 32A and a second stop 32B. In the second optical system 32, the second stop 32B and the relay lens 32A are disposed in order from the object side along the optical axis OA2. That is, the second stop 32B is disposed at a position adjacent to the relay lens 32A on the object side of the relay lens 32A in the direction of the optical axis OA2.

The second stop 32B has an aperture 32B1 on the optical axis OA2. The aperture 32B1 is in a conjugate positional relationship with the aperture 28E1 on the optical axis OA1. The second stop 32B is a movable stop in which a diameter of the aperture 32B1 can be changed. That is, a light amount of the visible light can be changed by the second stop 32B. It should be noted that each of the first stop 28E and the second stop 32B is an independently controllable stop.

The relay lens 32A is a lens that has a positive power. The relay lens 32A images the incident visible light on the second light-receiving surface 16A via the second stop 32B. In this way, the visible light is incident on the second optical system 32 via the second stop 32B, and the second optical system 32 emits the incident visible light to the second light-receiving surface 16A.

The third optical system 34 is disposed on the image side of the color separation prism 30 along the direction of the optical axis OA1. Stated another way, the third optical system 34 is disposed on the side on which the near-infrared light is emitted from the color separation prism 30. The third optical system 34 comprises a relay lens 34A. The relay lens 34A is a lens that has a positive power. The near-infrared light emitted from the color separation prism 30 is incident on the relay lens 34A, and the relay lens 34A images the incident near-infrared light on the first light-receiving surface 14A.

The first optical system 28 forms an intermediate image MS between the first stop 28E and the second stop 32B. Specifically, the intermediate image MS is formed between the first stop 28E and the color separation prism 30 by the first optical system 28. More specifically, the intermediate image MS is formed by the first optical system 28 on the emission surface 28D2, which is the surface of the fourth lens group 28D closest to the image side, and an incident surface 36A1, which is the surface of the lens group 36A closest to the object side. The lens group 36A is disposed between the intermediate image MS and the color separation prism 30 on the optical axis OA1. Since the lens group 36A has a positive power, the luminous flux of the subject light is incident on the color separation prism 30 by giving a converging action to the subject light incident on the lens group 36A as divergent light. That is, the lens group 36A accommodates the peripheral rays of the incident subject light in the color separation prism 30 by a positive optical power.

The position detection device 18 and the power applying device 20 are connected to the optical separation device 12. The position detection device 18 is a device that detects the position of the second lens group 28B, the position of the third lens group 28C, the positions of the relay lenses 32A and 34A, the diameters of the apertures 28E1 and 32B1, and the like. The power applying device 20 is a device that applies power to the second lens group 28B, the third lens group 28C, the relay lenses 32A and 34A, the first stop 28E, and the second stop 32B.

The UI system device 22 is a device that receives an instruction from a user of the imaging apparatus 10 (hereinafter, simply referred to as a "user") and presents various pieces of information to the user. The first image sensor 14, the second image sensor 16, the position detection device 18, the power applying device 20, and the UI system device 22 are connected to the control device 24. The first image sensor 14, the second image sensor 16, the position detection device 18, the power applying device 20, and the UI system device 22 are controlled by the control device 24.

Figure 3:
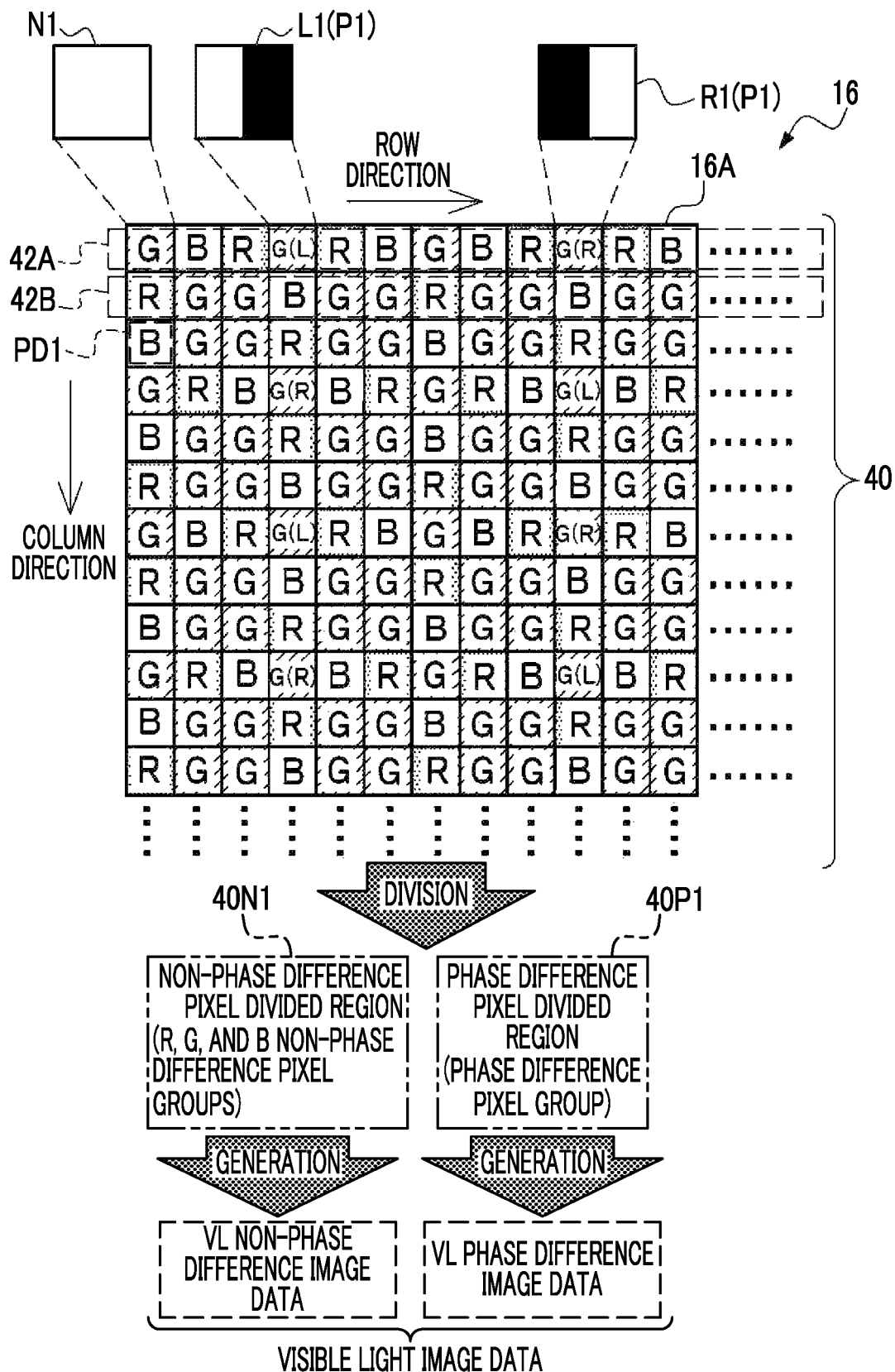
FIG. 3 is a schematic view showing an example of the arrangement of pixels included in a photoelectric conversion element for visible light of the imaging apparatus according to the first and second embodiments.

As an example, as shown in FIG. 3, the second image sensor 16 comprises a photoelectric conversion element 40. The photoelectric conversion element 40 includes the second light-receiving surface 16A. The photoelectric conversion element 40 is disposed in the imaging apparatus 10 (see FIG. 2) such that the center of the second light-receiving surface 16A and the optical axis OA2 (see FIG. 2) match each other. The photoelectric conversion element 40 has a plurality of photosensitive pixels disposed in a matrix, and the second light-receiving surface 16A is formed by the plurality of photosensitive pixels. The photosensitive pixel is a pixel having a photodiode PD1, photoelectrically converts the received light, and outputs an electric signal in accordance with a light-receiving amount. The type of the photosensitive pixel included in the photoelectric conversion element 40 is two types of a phase difference pixel P1 and a non-phase difference pixel N1 which is a pixel different from the phase difference pixel P1.

A color filter is disposed on the photodiode PD1. The color filters include a green (G) filter corresponding to a G wavelength range which most contributes to obtaining a brightness signal, a red (R) filter corresponding to an R wavelength range, and a blue (B) filter corresponding to a B wavelength range.

Generally, the non-phase difference pixel N1 is also referred to as a normal pixel. The photoelectric conversion element 40 has three types of photosensitive pixels of R pixel, G pixel, and B pixel, as the non-phase difference pixel N1. The R pixel, the G pixel, the B pixel, and the phase difference pixel P1 are regularly disposed with a predetermined periodicity in a row direction (for example, a horizontal direction in a state in which a bottom surface of the imaging apparatus 10 is in contact with a horizontal surface) and a column direction (for example, a vertical direction which is a direction perpendicular to the horizontal direction). The R pixel is a pixel corresponding to the photodiode PD1 in which the R filter is disposed, the G pixel and the phase difference pixel P1 are pixels corresponding to the photodiode PD1 in which the G filter is disposed, and the B pixel is a pixel corresponding to the photodiode PD1 in which the B filter is disposed.

A plurality of phase difference pixel lines 42A and a plurality of non-phase difference pixel lines 42B are arranged on the second light-receiving surface 16A. The phase difference pixel line 42A is a horizontal line including the phase difference pixels P1. Specifically, the phase difference pixel line 42A is the horizontal line in which the phase difference pixels P1 and the non-phase difference pixels N1 are mixed. The non-phase difference pixel line 42B is a horizontal line including only a plurality of non-phase difference pixels N1.

On the second light-receiving surface 16A, the phase difference pixel lines 42A and the non-phase difference pixel lines 42B for a first predetermined number of lines are alternately disposed along the column direction. For example, the "first predetermined number of lines" used herein refers to two lines. It should be noted that, here, the first predetermined number of lines is described as two lines, but the technology of the present disclosure is not limited to this, and the first predetermined number of lines may be three or more lines, dozen lines, a few tens of lines, a few hundred lines, and the like.

The phase difference pixel lines 42A are arranged in the column direction by skipping two lines from the first row to the last row. A part of the pixels of the phase difference pixel lines 42A is the phase difference pixel P1. Specifically, the phase difference pixel line 42A is a horizontal line in which the phase difference pixels P1 and the non-phase difference pixels N1 are periodically arranged. The phase difference pixels P1 are roughly divided into a first phase difference pixel L1 and a second phase difference pixel R1. In the phase difference pixel lines 42A, the first phase difference pixels L1 and the second phase difference pixels R1 are alternately disposed at intervals of a few pixels in a line direction as the G pixels.

The first phase difference pixels L1 and the second phase difference pixels R1 are disposed to alternately be present in the column direction. In the example shown in FIG. 3, in the fourth column, the first phase difference pixel L1, the second phase difference pixel R1, the first phase difference pixel L1, and the second phase difference pixel R1 are disposed in this order along the column direction from the first row. That is, the first phase difference pixels L1 and the second phase difference pixels R1 are alternately disposed along the column direction from the first row. In addition, in the example shown in FIG. 3, in the tenth column, the second phase difference pixel R1, the first phase difference pixel L1, the second phase difference pixel R1, and the first phase difference pixel L1 are disposed in this order along the column direction from the first row. That is, the second phase difference pixels R1 and the first phase difference pixels L1 are alternately disposed along the column direction from the first row.

The photoelectric conversion element 40 is divided into two regions. That is, the photoelectric conversion element 40 includes a non-phase difference pixel divided region 40N1 and a phase difference pixel divided region 40P1. The phase difference pixel divided region 40P1 is a phase difference pixel group composed of a plurality of phase difference pixels P1, and receives the subject light to generate VL phase difference image data as the electric signal in accordance with the light-receiving amount. The VL phase difference image data is used, for example, for distance measurement. The non-phase difference pixel divided region 40N1 is a non-phase difference pixel group composed of the plurality of non-phase difference pixels N, and receives the visible light indicating the subject S to generate VL non-phase difference image data as the electric signal in accordance with the light-receiving amount. The VL non-phase difference image data is displayed on a display 64A (see FIG. 11) as, for example, a visible light image. Both the VL phase difference image data and the VL non-phase difference image data are image data indicating the subject S for the visible light.

In the following, for convenience of description, in a case in which the distinction is not needed, the VL phase difference image data and the VL non-phase difference image data are referred to as "visible light image data". It should be noted that the visible light image data is an example of "image data for second wavelength range light" according to the technology of the present disclosure.

Figure 4:
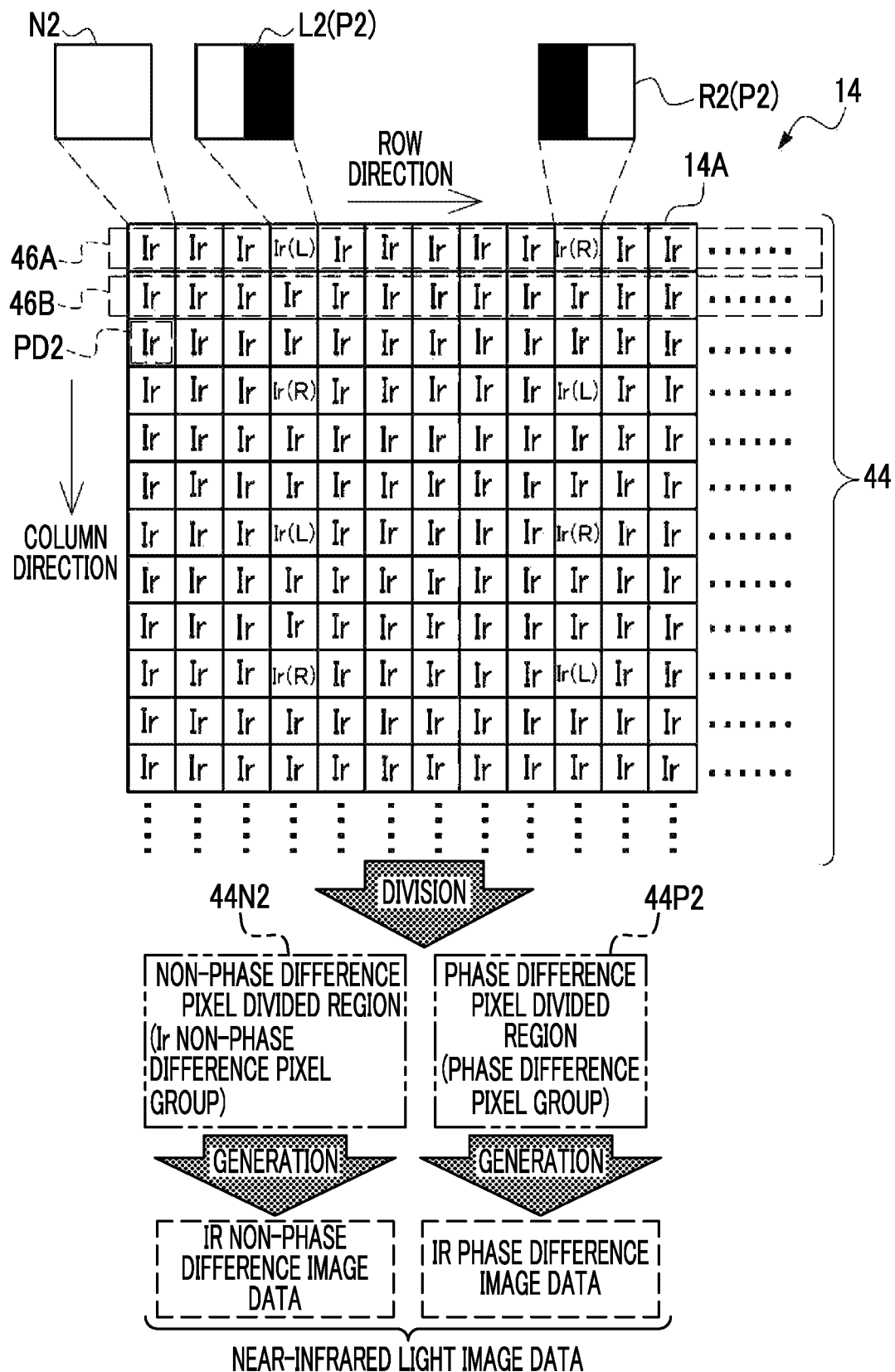
FIG. 4 is a schematic view showing an example of the arrangement of pixels included in a photoelectric conversion element for near-infrared light of the imaging apparatus according to the first and second embodiments.

As an example, as shown in FIG. 4, the first image sensor 14 comprises a photoelectric conversion element 44. The photoelectric conversion element 44 includes the first light-receiving surface 14A. The photoelectric conversion element 44 is disposed in the imaging apparatus 10 (see FIG. 2) such that the center of the first light-receiving surface 14A and the optical axis OA1 (see FIG. 2) match each other. The photoelectric conversion element 44 has a plurality of photosensitive pixels disposed in a matrix, and the first light-receiving surface 14A is formed by the plurality of photosensitive pixels. The photosensitive pixel is a pixel having a photodiode PD2, photoelectrically converts the received light, and outputs an electric signal in accordance with a light-receiving amount. The type of the photosensitive pixel included in the photoelectric conversion element 44 is two types of a phase difference pixel P2 and a non-phase difference pixel N2 which is a pixel different from the phase difference pixel P2.

It should be noted that, in the following, for convenience of description, in a case in which the distinction is not needed, the phase difference pixel P1 and the phase difference pixel P2 are referred to as "phase difference pixel P", and in a case in which the distinction is not needed, the non-phase difference pixel N1 and the non-phase difference pixel N2 are referred to as "non-phase difference pixel N".

An Ir filter is disposed on the photodiode PD2. The Ir filter is an Ir filter corresponding to the near-infrared wavelength range.

Generally, the non-phase difference pixel N2 is also referred to as a normal pixel. In the photoelectric conversion element 44, the non-phase difference pixel N2 and the phase difference pixel P2 are regularly disposed with a predetermined periodicity in a row direction (for example, a horizontal direction in a state in which a bottom surface of the imaging apparatus 10 is in contact with a horizontal surface) and a column direction (for example, a vertical direction which is a direction perpendicular to the horizontal direction). The non-phase difference pixel N2 is a pixel corresponding to the photodiode PD2 in which the Ir filter is disposed.

A plurality of phase difference pixel lines 46A and a plurality of non-phase difference pixel lines 46B are arranged on the first light-receiving surface 14A. The phase difference pixel line 46A is a horizontal line including the phase difference pixels P2. Specifically, the phase difference pixel line 46A is the horizontal line in which the phase difference pixels P2 and the non-phase difference pixels N2 are mixed. The non-phase difference pixel line 46B is a horizontal line including only a plurality of non-phase difference pixels N2.

On the first light-receiving surface 14A, the phase difference pixel lines 46A and the non-phase difference pixel lines 46B for a second predetermined number of lines are alternately disposed along the column direction. For example, the "second predetermined number of lines" used herein refers to two lines. It should be noted that, here, the second predetermined number of lines is described as two lines, but the technology of the present disclosure is not limited to this, and the second predetermined number of lines may be three or more lines, dozen lines, a few tens of lines, a few hundred lines, and the like.

The phase difference pixel lines 46A are arranged in the column direction by skipping two lines from the first row to the last row. A part of the pixels of the phase difference pixel lines 46A is the phase difference pixel P2. Specifically, the phase difference pixel line 46A is a horizontal line in which the phase difference pixels P2 and the non-phase difference pixels N2 are periodically arranged. The phase difference pixels P2 are roughly divided into a third phase difference pixel L2 and a fourth phase difference pixel R2. In the phase difference pixel lines 46A, the third phase difference pixels L2 and the fourth phase difference pixels R2 are alternately disposed at intervals of a few pixels in a line direction.

The third phase difference pixels L2 and the fourth phase difference pixels R2 are disposed to alternately be present in the column direction. In the example shown in FIG. 4, in the fourth column, the third phase difference pixel L2, the fourth phase difference pixel R2, the third phase difference pixel L2, and the fourth phase difference pixel R2 are disposed in this order along the column direction from the first row. That is, the third phase difference pixel L2 and the fourth phase difference pixel R2 are alternately disposed along the column direction from the first row. In addition, in the example shown in FIG. 4, in the tenth column, the fourth phase difference pixel R2, the third phase difference pixel L2, the fourth phase difference pixel R2, and the third phase difference pixel L2 are disposed in this order along the column direction from the first row. That is, the fourth phase difference pixel R2 and the third phase difference pixel L2 are alternately disposed along the column direction from the first row.

The photoelectric conversion element 44 is divided into two regions. That is, the photoelectric conversion element 44 includes a non-phase difference pixel divided region 44N2 and a phase difference pixel divided region 44P2. The phase difference pixel divided region 44P2 is a phase difference pixel group composed of a plurality of phase difference pixels P2, and receives the subject light to generate IR phase difference image data as the electric signal in accordance with the light-receiving amount. The IR phase difference image data is used, for example, for distance measurement. The non-phase difference pixel divided region 44N2 is a non-phase difference pixel group composed of the plurality of non-phase difference pixels N2, and receives the near-infrared light indicating the subject S to generate IR non-phase difference image data as the electric signal in accordance with the light-receiving amount. The IR non-phase difference image data is displayed on the display 64A (see FIG. 11) as, for example, a near-infrared light image. Both the IR phase difference image data and the IR non-phase difference image data are image data indicating the subject S for the near-infrared light.

In the following, for convenience of description, in a case in which the distinction is not needed, the IR phase difference image data and the IR non-phase difference image data are referred to as "near-infrared light image data". It should be noted that the near-infrared light image data is an example of "image data for first wavelength range light" according to the technology of the present disclosure.

Figure 5:
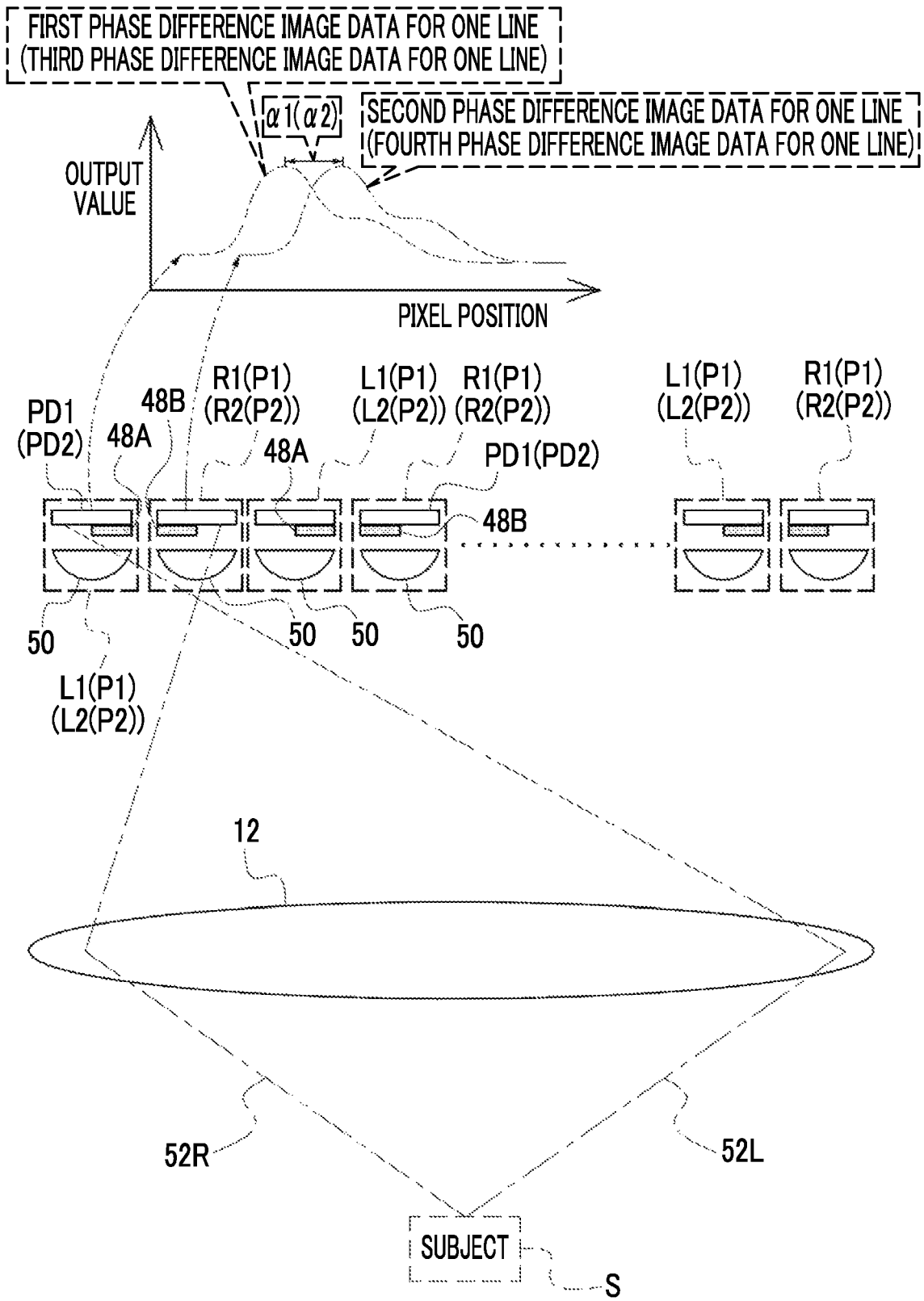
FIG. 5 is a conceptual diagram showing an example of an incidence characteristic of subject light on a phase difference pixel included in the photoelectric conversion element shown in FIGS. 3 and 4.

As an example, as shown in FIG. 5, the first phase difference pixel L1 comprises a light shielding member 48A, a microlens 50, and the photodiode PD1. In the first phase difference pixel L1, the light shielding member 48A is disposed between the microlens 50 and the light-receiving surface of the photodiode PD1. A left half (left side in a case of facing the subject from the light-receiving surface (in other words, a right side in a case of facing the light-receiving surface from the subject)) of the light-receiving surface of the photodiode PD1 in the row direction is shielded against the light by the light shielding member 48A.

The second phase difference pixel R1 comprises a light shielding member 48B, the microlens 50, and the photodiode PD1. In the second phase difference pixel R1, the light shielding member 48B is disposed between the microlens 50 and the light-receiving surface of the photodiode PD1.

The third phase difference pixel L2 and the fourth phase difference pixel R2 comprise a light shielding member 48A, the microlens 50, and the photodiode PD2. In the third phase difference pixel L2, the light shielding member 48A is disposed between the microlens 50 and the light-receiving surface of the photodiode PD2. A left half (left side in a case of facing the subject from the light-receiving surface (in other words, a right side in a case of facing the light-receiving surface from the subject)) of the light-receiving surface of the photodiode PD2 in the row direction is shielded against the light by the light shielding member 48A.

The fourth phase difference pixel R2 comprises a light shielding member 48B, the microlens 50, and the photodiode PD2. In the fourth phase difference pixel R2, the light shielding member 48B is disposed between the microlens 50 and the light-receiving surface of the photodiode PD2.

A right half (right side in a case of facing the subject from the light-receiving surface (in other words, a left side in a case of facing the light-receiving surface from the subject)) of the light-receiving surface of the photodiode PD in the row direction is shielded against the light by the light shielding member 48B. It should be noted that, in the following, for convenience of description, in a case in which the distinction is not needed, the light shielding members 48A and 48B are referred to as "light shielding member" without designating reference numeral.

Luminous flux passing through an exit pupil of the optical separation device 12 is roughly divided into left region passing light 52L and right region passing light 52R. The left region passing light 52L refers to the left half luminous flux of the luminous flux passing through the exit pupil of the optical separation device 12 in a case of facing the subject side from the phase difference pixel P side. The right region passing light 52R refers to the right half luminous flux of the luminous flux passing through the exit pupil of the optical separation device 12 in a case of facing the subject side from the phase difference pixel P side. The luminous flux passing through the exit pupil of the optical separation device 12 is divided into the right and left by the microlens 50, the light shielding member 48A, and the light shielding member 48B functioning as a pupil division unit. The first phase difference pixel L1 and the third phase difference pixel L2 receive the left region passing light 52L as the subject light, and the second phase difference pixel R1 and the fourth phase difference pixel R2 receive the right region passing light 52R as the subject light.

As a result, the VL phase difference image data (hereinafter, also referred to as "first phase difference image data") corresponding to the subject image corresponding to the left region passing light 52L in the visible light wavelength range, and the VL phase difference image data (hereinafter, also referred to as "second phase difference image data") corresponding to the subject image corresponding to the right region passing light 52R in the visible light wavelength range are generated by the photoelectric conversion element 40. In addition, the IR phase difference image data (hereinafter, also referred to as "third phase difference image data") corresponding to the subject image corresponding to the left region passing light 52L in the near-infrared light wavelength range, and the IR phase difference image data (hereinafter, also referred to as "fourth phase difference image data") corresponding to the subject image corresponding to the right region passing light 52R in the near-infrared light wavelength range are generated by the photoelectric conversion element 44.

In the imaging apparatus 10, for example, in the same phase difference pixel line 42A, the distance to the subject based on a deviation amount $\alpha 1$ between the first phase difference image data for one line and the second phase difference image data for one line, that is, a subject distance is measured. In addition, in the imaging apparatus 10, for example, in the same phase difference pixel line 46A, the distance to the subject based on a deviation amount $\alpha 2$ between the third phase difference image data for one line and the fourth phase difference image data for one line, that is, a subject distance is measured. It should be noted that, since a method of deriving the subject distance from the deviation amount $\alpha 1$ or $\alpha 2$ is a known technology, the detailed description thereof will be omitted here.

Figure 6:
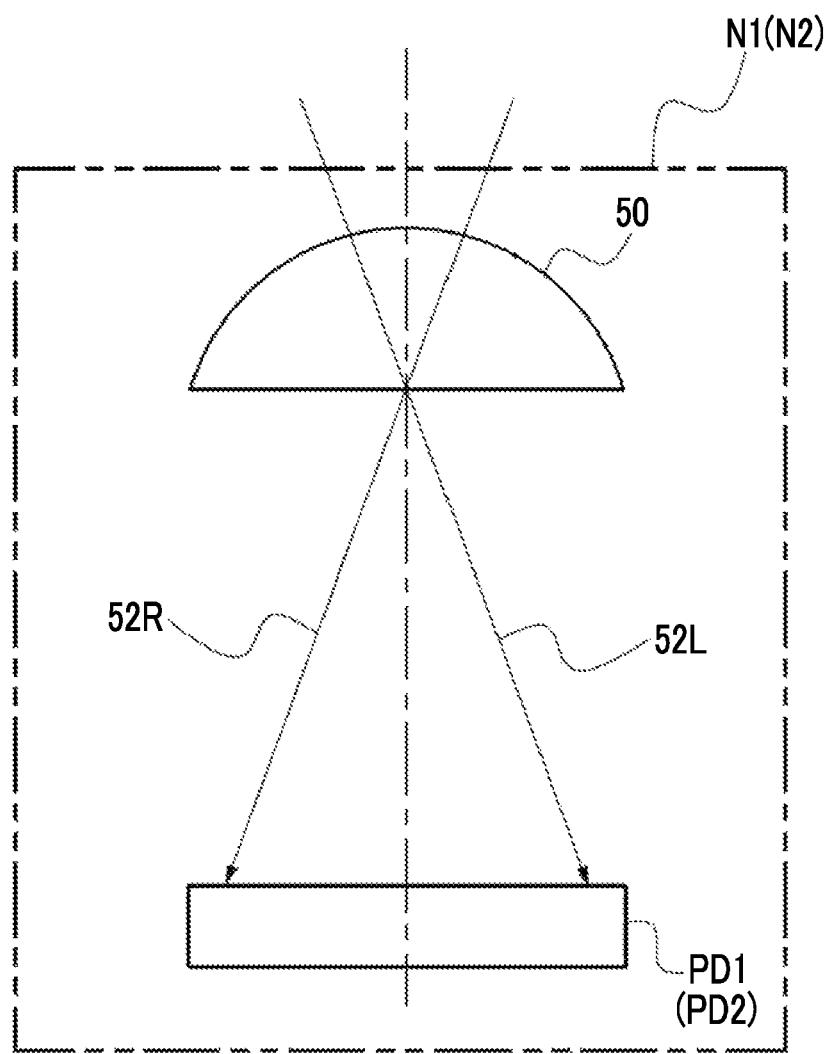
FIG. 6 is a schematic configuration diagram showing an example of a configuration of a non-phase difference pixel included in each photoelectric conversion element shown in FIGS. 3 and 4.

As an example, as shown in FIG. 6, the non-phase difference pixel N is different from the phase difference pixel P in that the light shielding member is not provided. The photodiode PD of the non-phase difference pixel N receives the left region passing light 52L and the right region passing light 52R as the subject light. As a result, the VL non-phase difference image data corresponding to the subject image corresponding to the left region passing light 52L and the right region passing light 52R in the visible light wavelength range is generated by the photoelectric conversion element 40. In addition, the IR non-phase difference image data corresponding to the subject image corresponding to the left region passing light 52L and the right region passing light 52R in the near-infrared light wavelength range is generated by the photoelectric conversion element 44.

Figure 7:
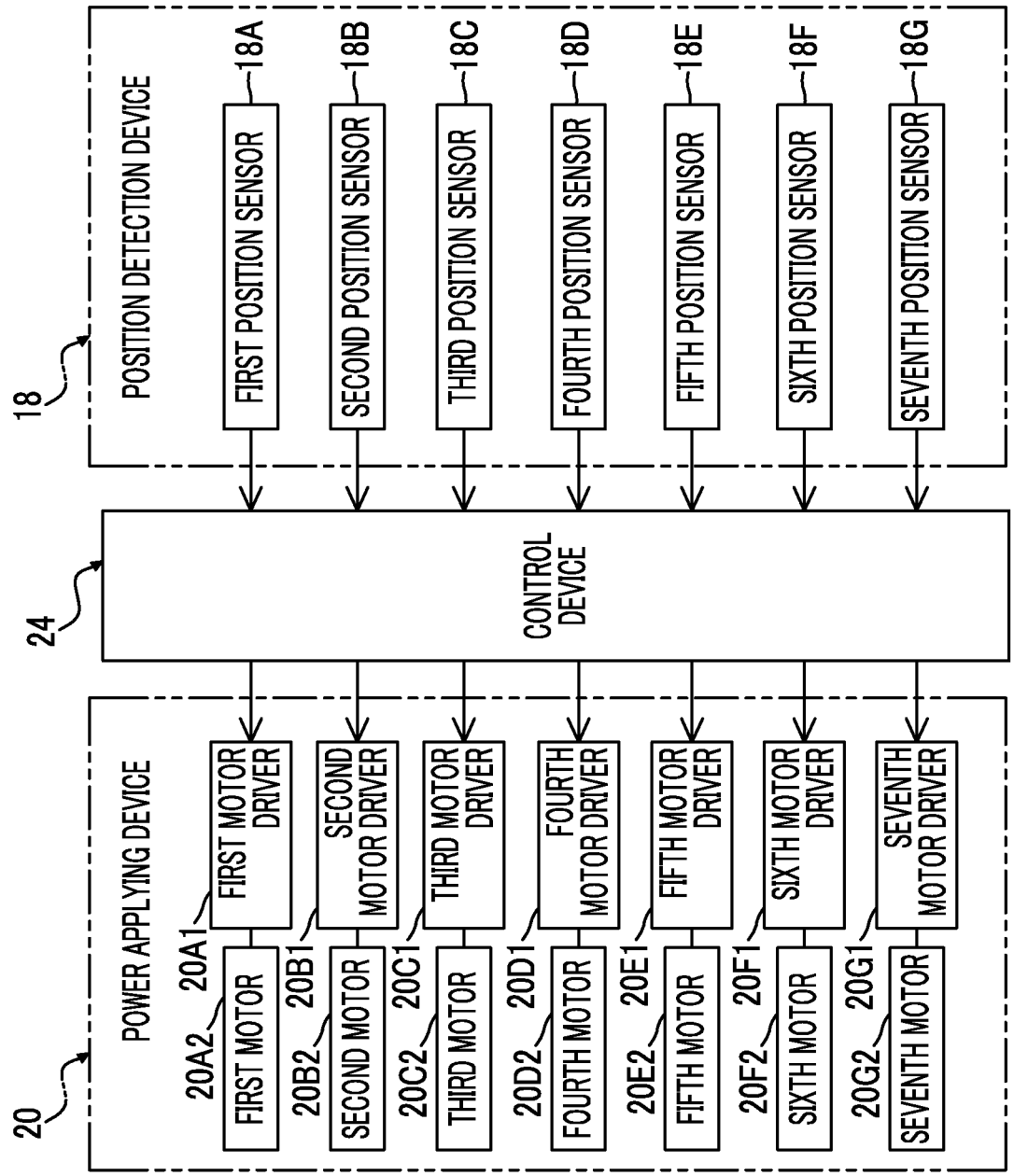
FIG. 7 is a block diagram showing an example of hardware configurations of a power applying device and a position detection device provided in the imaging apparatus according to the embodiment.

As an example, as shown in FIG. 7, the position detection device 18 comprises a first position sensor 18A, a second position sensor 18B, a third position sensor 18C, a fourth position sensor 18D, a fifth position sensor 18E, a sixth position sensor 18F, and a seventh position sensor 18G. The first position sensor 18A, the second position sensor 18B, the third position sensor 18C, the fourth position sensor 18D, the fifth position sensor 18E, the sixth position sensor 18F, and the seventh position sensor 18G are connected to the control device 24.

Here, a potentiometer is adopted as an example of each of the first position sensor 18A, the second position sensor 18B, the third position sensor 18C, the fourth position sensor 18D, the fifth position sensor 18E, and the sixth position sensor 18F.

The first position sensor 18A, the second position sensor 18B, the third position sensor 18C, the fourth position sensor 18D, and the fifth position sensor 18E are used in the near-infrared light optical system.

The first position sensor 18A detects a position of the first lens group 28A on the optical axis OA1. The second position sensor 18B detects a position of the second lens group 28B on the optical axis OA1. The third position sensor 18C detects a position of the third lens group 28C on the optical axis OA1. The fourth position sensor 18D detects the diameter of the aperture 28E1. The fifth position sensor 18E detects a position of the relay lens 34A on the optical axis OA1.

The sixth position sensor 18F and the seventh position sensor 18G are used in the visible light optical system. The sixth position sensor 18F detects the diameter of the aperture 32B1. The seventh position sensor 18G detects a position of the relay lens 32A on the optical axis OA2.

The power applying device 20 comprises a first motor driver 20A1, a second motor driver 20B1, a third motor driver 20C1, a fourth motor driver 20D1, a fifth motor driver 20E1, a sixth motor driver 20F1, and a seventh motor driver 20G1. In addition, the power applying device 20 comprises a first motor 20A2, a second motor 20B2, a third motor 20C2, a fourth motor 20D2, a fifth motor 20E2, a sixth motor 20F2, and a seventh motor 20G2.

The first motor driver 20A1, the second motor driver 20B1, the third motor driver 20C1, the fourth motor driver 20D1, the fifth motor driver 20E1, the sixth motor driver 20F1, and the seventh motor driver 20G1 are connected to the control device 24. The first motor driver 20A1, the second motor driver 20B1, the third motor driver 20C1, the fourth motor driver 20D1, the fifth motor driver 20E1, the sixth motor driver 20F1, and the seventh motor driver 20G1 are controlled by the control device 24.

The first motor driver 20A1 is connected to the first motor 20A2 to control the first motor 20A2 in accordance with the instruction from the control device 24. The second motor driver 20B1 is connected to the second motor 20B2 to control the second motor 20B2 in accordance with the instruction from the control device 24. The third motor driver 20C1 is connected to the third motor 20C2 to control the third motor 20C2 in accordance with the instruction from the control device 24. The fourth motor driver 20D1 is connected to the fourth motor 20D2 to control the fourth motor 20D2 in accordance with the instruction from the control device 24. The fifth motor driver 20E1 is connected to the fifth motor 20E2 to control the fifth motor 20E2 in accordance with the instruction from the control device 24. The sixth motor driver 20F1 is connected to the sixth motor 20F2 to control the sixth motor 20F2 in accordance with the instruction from the control device 24. The seventh motor driver 20G1 is connected to the seventh motor 20G2 to control the seventh motor 20G2 in accordance with the instruction from the control device 24.

The first motor driver 20A1, the second motor driver 20B1, the third motor driver 20C1, the fourth motor driver 20D1, the fifth motor driver 20E1, the first motor 20A2, the second motor 20B2, the third motor 20C2, the fourth motor 20D2, and the fifth motor 20E2 are used in the near-infrared light optical system.

The first motor 20A2 generates the power under the control of the first motor driver 20A1 and applies the generated power to the first lens group 28A to move the first lens group 28A in the direction of the optical axis OA1. The second motor 20B2 generates the power under the control of the second motor driver 20B1 and applies the generated power to the second lens group 28B to move the second lens group 28B in the direction of the optical axis OA1. The third motor 20C2 generates the power under the control of the third motor driver 20C1 and applies the generated power to the third lens group 28C to move the third lens group 28C in the direction of the optical axis OA1. The fourth motor 20D2 generates the power under the control of the fourth motor driver 20D1 and applies the generated power to the first stop 28E to adjust the opening degree of the aperture 28E1. The fifth motor 20E2 generates the power under the control of the fifth motor driver 20E1 and applies the generated power to the relay lens 34A to move the relay lens 34A in the direction of the optical axis OA1.

The sixth motor driver 20F1, the seventh motor driver 20G1, the sixth motor 20F2, and the seventh motor 20G2 are used in the visible light optical system. The sixth motor 20F2 generates the power under the control of the sixth motor driver 20F1 and applies the generated power to the second stop 32B to adjust an opening degree of the aperture 32B1. The seventh motor 20G2 generates the power under the control of the seventh motor driver 20G1 and applies the generated power to the relay lens 32A to move the relay lens 32A in the direction of the optical axis OA2.

Figure 8:
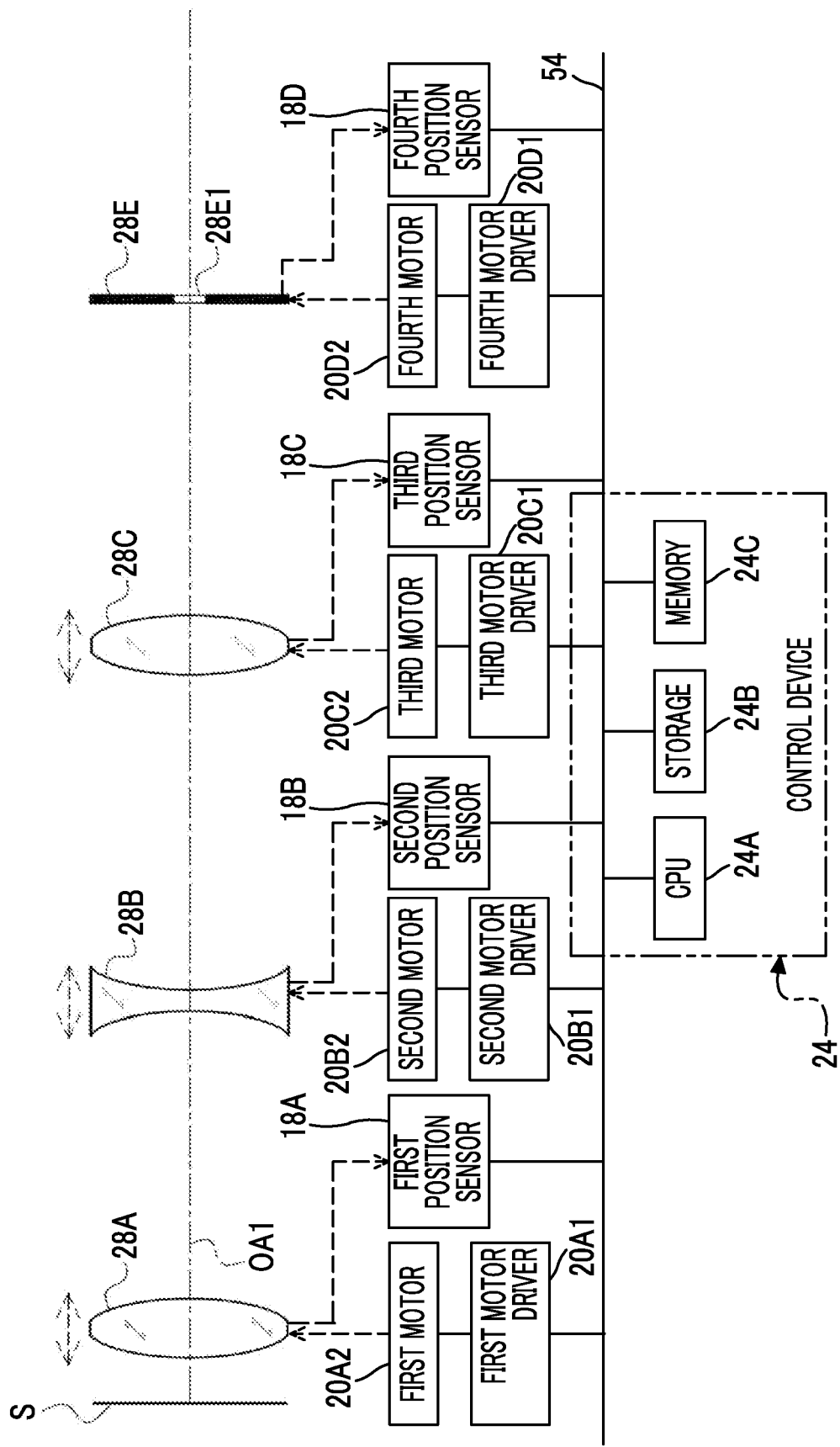
FIG. 8 is a schematic configuration diagram showing an example of hardware configurations of a near-infrared light optical system provided in the imaging apparatus according to the first and second embodiments and an electric system related to the near-infrared light optical system.

As an example, as shown in FIG. 8, the control device 24 comprises a CPU 24A, a storage 24B, and a memory 24C, and the CPU 24A, the storage 24B, and the memory 24C are connected to a bus 54. It should be noted that the storage 24B and the memory 24C are examples of a "memory" according to the technology of the present disclosure.

It should be noted that, in the example shown in FIG. 8, one bus is shown as the bus 54 for convenience of illustration, but a plurality of buses may be used. The bus 54 may be a serial bus, or may be a parallel bus, which includes a data bus, an address bus, a control bus, and the like.

Various parameters and various programs are stored in the storage 24B. The storage 24B is a non-volatile storage device. Here, an EEPROM is adopted as an example of the storage 24B. The EEPROM is merely an example, and an HDD and/or SSD or the like may be applied as the storage 24B instead of the EEPROM or together with the EEPROM. In addition, the memory 24C transitorily stores various pieces of information and is used as a work memory. Examples of the memory 24C include a RAM, but the technology of the present disclosure is not limited to this, and other types of storage devices may be used.

Various programs are stored in the storage 24B. The CPU 24A reads out a needed program from the storage 24B, and performs the read out program on the memory 24C. The CPU 24A controls the entire imaging apparatus 10 in accordance with the program performed on the memory 24C.

The first position sensor 18A, the second position sensor 18B, the third position sensor 18C, and the fourth position sensor 18D are connected to the bus 54. A detection result of the first position sensor 18A (hereinafter referred to as a "first detection result") is output to the CPU 24A by the first position sensor 18A. A detection result by the second position sensor 18B (hereinafter referred to as a "second detection result") is output to the CPU 24A by the second position sensor 18B. A detection result by the third position sensor 18C (hereinafter referred to as a "third detection result") is output to the CPU 24A by the third position sensor 18C. A detection result by the fourth position sensor 18D (hereinafter referred to as a "fourth detection result") is output to the CPU 24A by the fourth position sensor 18D.

The first motor driver 20A1, the second motor driver 20B1, the third motor driver 20C1, and the fourth motor driver 20D1 are connected to the bus 54. The CPU 24A controls the first motor 20A2 via the first motor driver 20A1 based on the first detection result to control the position of the first lens group 28A on the optical axis OA1. The CPU 24A controls the second motor 20B2 via the second motor driver 20B1 based on the second detection result to control the position of the second lens group 28B on the optical axis OA1. The CPU 24A controls the third motor 20C2 based on the third detection result to control the position of the third lens group 28C on the optical axis OA1. The CPU 24A controls the fourth motor 20D2 via the fourth motor driver 20D1 based on the fourth detection result and the light-receiving amount on the first light-receiving surface 14A to adjust the opening degree of the aperture 28E1.

Figure 9:
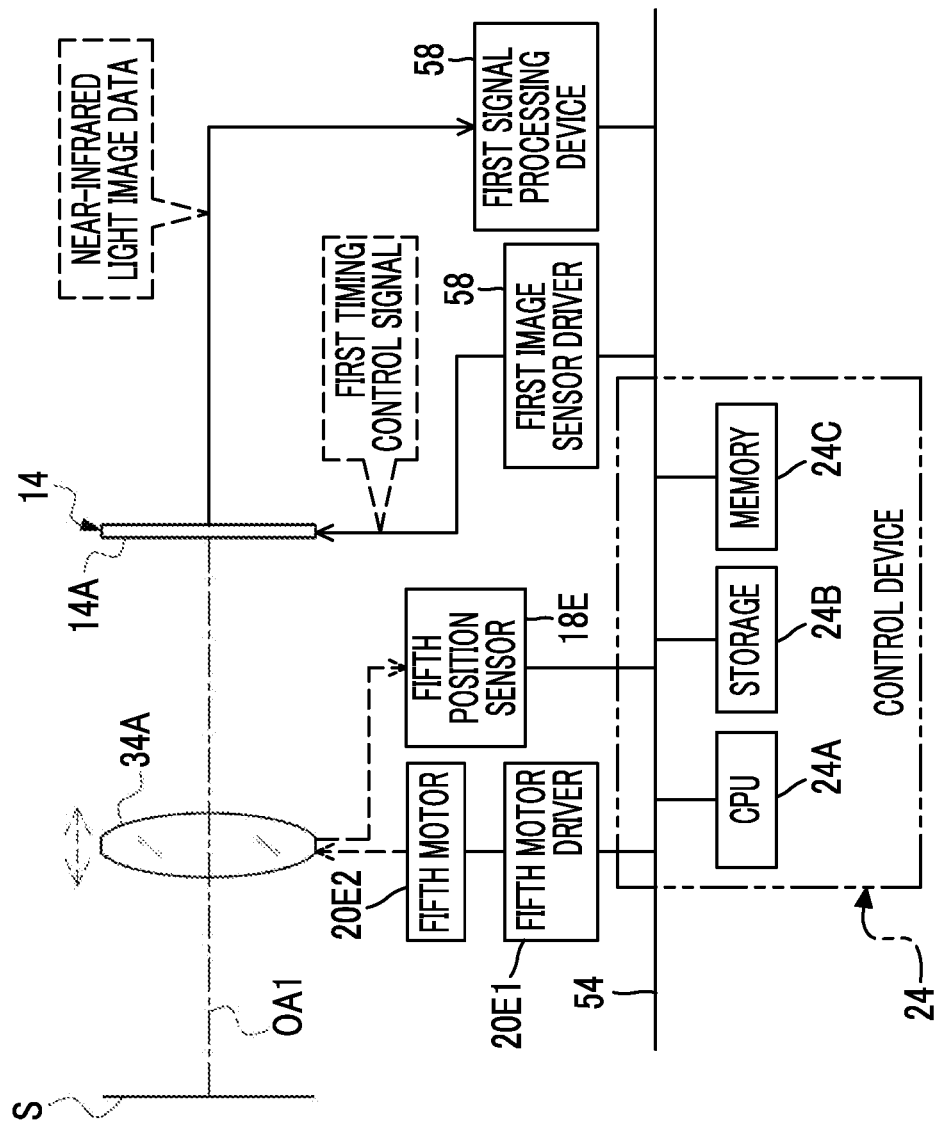
FIG. 9 is a schematic configuration diagram showing an example of a relay lens and a first image sensor provided in the near-infrared light optical system provided in the imaging apparatus according to the embodiment, and a hardware configuration of an electric system related to the relay lens and the first image sensor.
Figure 10:
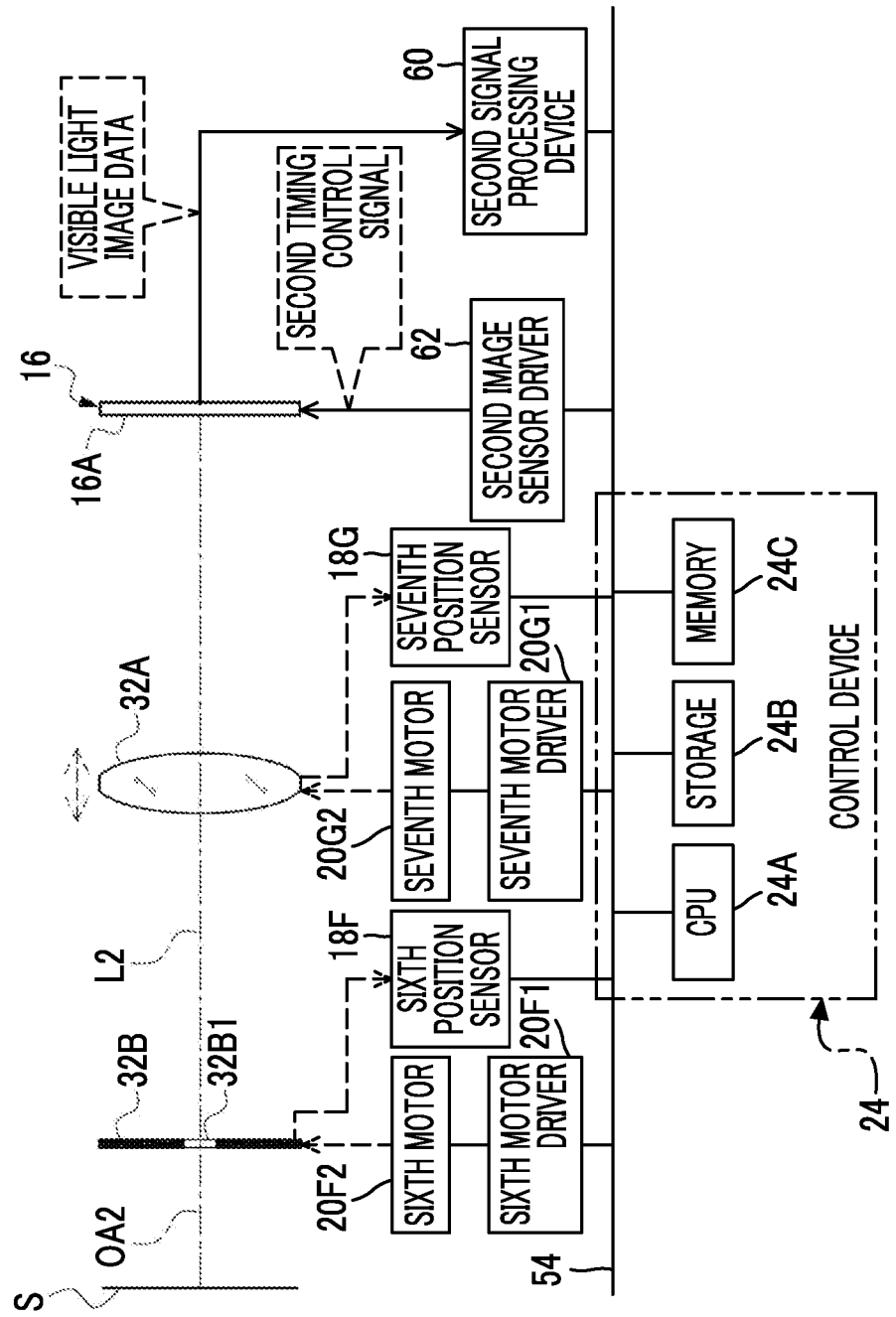
FIG. 10 is a schematic configuration diagram showing an example of hardware configurations of a visible light optical system provided in the imaging apparatus according to the first and second embodiments and an electric system related to the visible light optical system.

As an example, as shown in FIG. 9, the fifth position sensor 18E is connected to the bus 54. A detection result by the fifth position sensor 18E (hereinafter referred to as a "fifth detection result") is output to the CPU 24A by the fifth position sensor 18E.

The fifth motor driver 20E1 is connected to the bus 54. The CPU 24A controls the fifth motor 20E2 via the fifth motor driver 20E1 based on the fifth detection result to control the position of the relay lens 34A on the optical axis OA1.

The first image sensor 14 is positioned on the optical axis OA1 on a subsequent stage of the relay lens 34A, that is, on the image side of the relay lens 34A. Then, the first image sensor 14 images the subject S based on the near-infrared light imaged on the first light-receiving surface 14A to generate the near-infrared light image data indicating the subject S for the near-infrared light and to output the generated near-infrared light image data to the subsequent stage.

A first signal processing device 56 and a first image sensor driver 58 are connected to the first image sensor 14. The first signal processing device 56 and the first image sensor driver 58 are connected to the bus 54. The first image sensor driver 58 outputs a first timing control signal to the first image sensor 14 under the control of the CPU 24A. The first timing control signal is a signal for controlling imaging by the first image sensor 14. A frame rate of imaging by the first image sensor 14 is defined by the first timing control signal.

The first timing control signal includes a vertical synchronizing signal and a horizontal synchronizing signal. The vertical synchronizing signal is a signal for defining a timing at which the transmission of an analog image for one frame is started. The horizontal synchronizing signal is a signal for defining a timing at which the output of the analog image for one horizontal line is started. The first image sensor 14 starts outputting analog near-infrared light image data in a frame unit to the first signal processing device 56 in response to the vertical synchronizing signal input from the first image sensor driver 58. In addition, the first image sensor 14 starts outputting the analog near-infrared light image data in a unit of horizontal lines to the first signal processing device 56 in response to the horizontal synchronizing signal input from the first image sensor driver 58.

Under the control of the CPU 24A, the first signal processing device 56 performs various pieces of analog signal processing on the analog near-infrared light image data input from the first image sensor 14 and then performs the A/D conversion to generate digital near-infrared light image data.

Under the control of the CPU 24A, the first signal processing device 56 performs digital signal processing, such as demosaic processing, noise reduction processing, gradation correction processing, and color correction processing, on the digital near-infrared light image data. The digital near-infrared light image data subjected to the digital signal processing is output to the CPU 24A by the first signal processing device 56, and is stored in a predetermined storage region (for example, the storage 24B and/or the memory 24C) by the CPU 24A. It should be noted that, in the following, in a case in which the distinction is not needed, the analog near-infrared light image data and the digital near-infrared light image data are simply referred to as "near-infrared light image data".

As an example, as shown in FIG. 9, the sixth position sensor 18F and the seventh position sensor 18G are connected to the bus 54. A detection result by the sixth position sensor 18F (hereinafter referred to as a "sixth detection result") is output to the CPU 24A by the sixth position sensor 18F. A detection result by the seventh position sensor 18G (hereinafter referred to as a "seventh detection result") is output to the CPU 24A by the seventh position sensor 18G.

The sixth motor driver 20F1 and the seventh motor driver 20G1 are connected to the bus 54. The CPU 24A controls the sixth motor 20F2 via the sixth motor driver 20F1 based on the sixth detection result and the light-receiving amount on the second light-receiving surface 16A to adjust the opening degree of the aperture 32B1. The CPU 24A controls the seventh motor 20G2 via the seventh motor driver 20G1 based on the seventh detection result to control the position of the relay lens 32A on the optical axis OA2.

The second image sensor 16 is positioned on the optical axis OA2 on a subsequent stage of the relay lens 32A, that is, on the image side of the relay lens 32A. Then, the second image sensor 16 images the subject S based on the visible light imaged on the second light-receiving surface 16A to generate the visible light image data and to output the generated visible light image data to the subsequent stage.

A second signal processing device 60 and a second image sensor driver 62 are connected to the second image sensor 16. The second signal processing device 60 and the second image sensor driver 62 are connected to the bus 54. The second image sensor driver 62 outputs a second timing control signal to the second image sensor 16 under the control of the CPU 24A. The second timing control signal is a signal for controlling imaging by the second image sensor 16. A frame rate of imaging by the second image sensor 16 is defined by the second timing control signal.

The second timing control signal includes the vertical synchronizing signal and the horizontal synchronizing signal, similarly to the first timing control signal. The second image sensor 16 starts outputting analog visible light image data in a frame unit to the second signal processing device 60 in response to the vertical synchronizing signal input from the second image sensor driver 62. In addition, the second image sensor 16 starts outputting analog visible light image data in a unit of horizontal lines to the second signal processing device 60 in response to the horizontal synchronizing signal input from the second image sensor driver 62.

Under the control of the CPU 24A, the second signal processing device 60 performs various pieces of analog signal processing on the analog visible light image data input from the second image sensor 16 and then performs the A/D conversion to generate digital visible light image data.

The second signal processing device 60 performs the digital signal processing described above on the digital visible light image data under the control of the CPU 24A. The digital visible light image data subjected to the digital signal processing is output to the CPU 24A by the second signal processing device 60, and is stored in the predetermined storage region described above by the CPU 24A. It should be noted that, in the following, in a case in which the distinction is not needed, the analog visible light image data and the digital visible light image data are simply referred to as "visible light image data".

Figure 11:
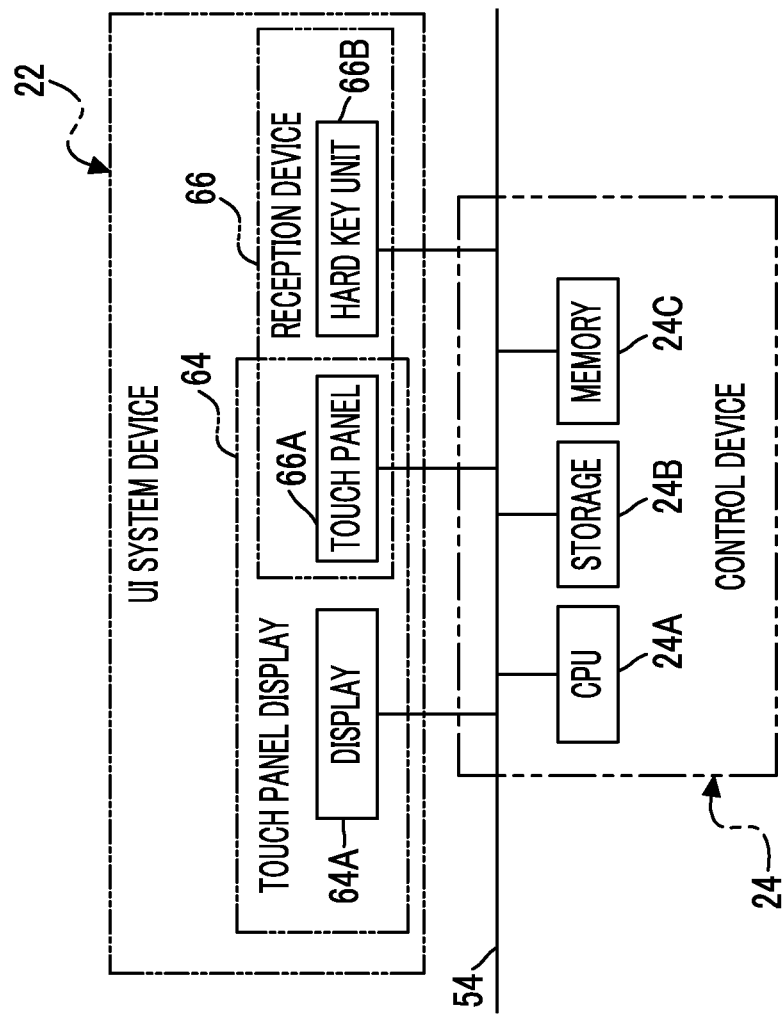
FIG. 11 is a block diagram showing an example of configurations of a UI system device and a control device provided in the imaging apparatus according to the first and second embodiments.

As an example, as shown in FIG. 11, the UI system device 22 comprises a touch panel display 64 and a reception device 66. The touch panel display 64 comprises a display 64A and a touch panel 66A, and the touch panel 66A is superimposed on a display region of the display 64A. Examples of the display 64A include a liquid crystal display. It should be noted that the display 64A does not have to be the liquid crystal display, and other displays, such as an organic EL display, may be used.

The display 64A and the touch panel 66A are connected to the bus 54. Therefore, the CPU 24A displays various pieces of information on the display 64A and is operated in accordance with various instructions received by the touch panel 66A.

The reception device 66 comprises the touch panel 66A and a hard key unit 66B. The hard key unit 66B is a plurality of hard keys, and includes a power button, a release button, buttons for various settings, and the like. The hard key unit 66B is connected to the bus 54, and the CPU 24A is operated in accordance with various instructions received by the hard key unit 66B.

By the way, the visible light and the near-infrared light have different wavelength ranges from each other. Therefore, for example, in a case in which the focus lens is moved to the focus position estimated based on only the visible light image data, it is more difficult to focus on the near-infrared light than on the visible light. As a method of focusing on the near-infrared light, a method of focusing using the focus position estimated based on only the near-infrared light data can be considered. However, even in a case in which the focusing is performed by using the focus position estimated based on only the near-infrared light data, the estimated focus position needs to be a reliable focus position. That is, in order to improve the accuracy of focusing on the near-infrared light, it is naturally preferable to perform focusing by using the focus position that is as reliable as possible.

Figure 12:
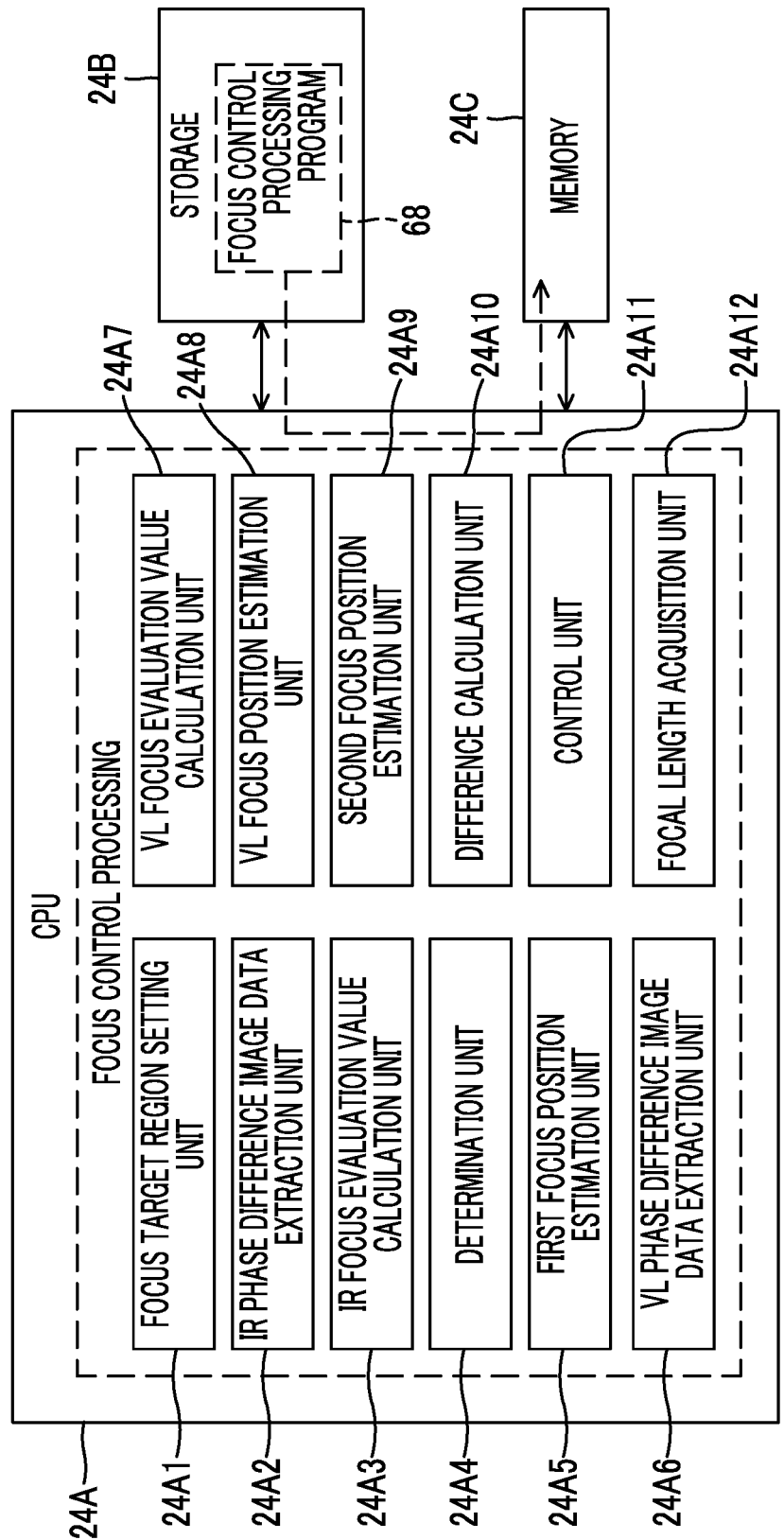
FIG. 12 is a block diagram showing an example of a main function of a CPU provided in the imaging apparatus according to the first embodiment.

Therefore, in view of such circumstances, in the imaging apparatus 10, as shown in FIG. 12, a focus control processing program 68 is stored in the storage 24B, and the focus control processing is performed by the CPU 24A in accordance with the focus control processing program 68. The focus control processing program 68 is an example of a "program" according to the technology of the present disclosure. In the following, the configuration of the focus control processing will be specifically described.

The CPU 24A reads out the focus control processing program 68 from the storage 24B and performs the read out focus control processing program 68 on the memory 24C to be operated as a focus target region setting unit 24A1, an IR phase difference image data extraction unit 24A2, an IR focus evaluation value calculation unit 24A3, a determination unit 24A4, a first focus position estimation unit 24A5, a VL phase difference image data extraction unit 24A6, a VL focus evaluation value calculation unit 24A7, a VL focus position estimation unit 24A8, a second focus position estimation unit 24A9, a difference calculation unit 24A10, a control unit 24A11, and a focal length acquisition unit 24A12. That is, the focus control processing is realized by the CPU 24A being operated as the focus target region setting unit 24A1, the IR phase difference image data extraction unit 24A2, the IR focus evaluation value calculation unit 24A3, the determination unit 24A4, the first focus position estimation unit 24A5, the VL phase difference image data extraction unit 24A6, the VL focus evaluation value calculation unit 24A7, the VL focus position estimation unit 24A8, the second focus position estimation unit 24A9, the difference calculation unit 24A10, the control unit 24A11, and the focal length acquisition unit 24A12.

The CPU 24A estimates a focus position (hereinafter, also referred to as a "first focus position") of the first lens group 28A for the near-infrared light based on a focus evaluation value (hereinafter, also referred to as an "IR focus evaluation value") determined in accordance with the near-infrared light image data by performing the focus control processing. In addition, the CPU 24A estimates a focus position (hereinafter, also referred to as a "second focus position") of the first lens group 28A for the visible light based on a focus evaluation value (hereinafter, also referred to as a "VL focus evaluation value") determined in accordance with the visible light image data by performing the focus control processing. Further, by performing the focus control processing, the CPU 24A performs a control of moving the first lens group 28A along the optical axis OA1 based on the first focus position in a case in which a comparison result obtained by comparing the first focus position with the second focus position satisfies a predetermined condition. Here, the comparison result refers to a value corresponding to, for example, a deviation amount between the first focus position and the second focus position, and the predetermined condition refers to, for example, a condition that is equal to or smaller than a first threshold value.

It should be noted that the IR focus evaluation value is an example of a "first focus evaluation value" according to the technology of the present disclosure, and the VL focus evaluation value is an example of a "second focus evaluation value" according to the technology of the present disclosure.

Figure 13:
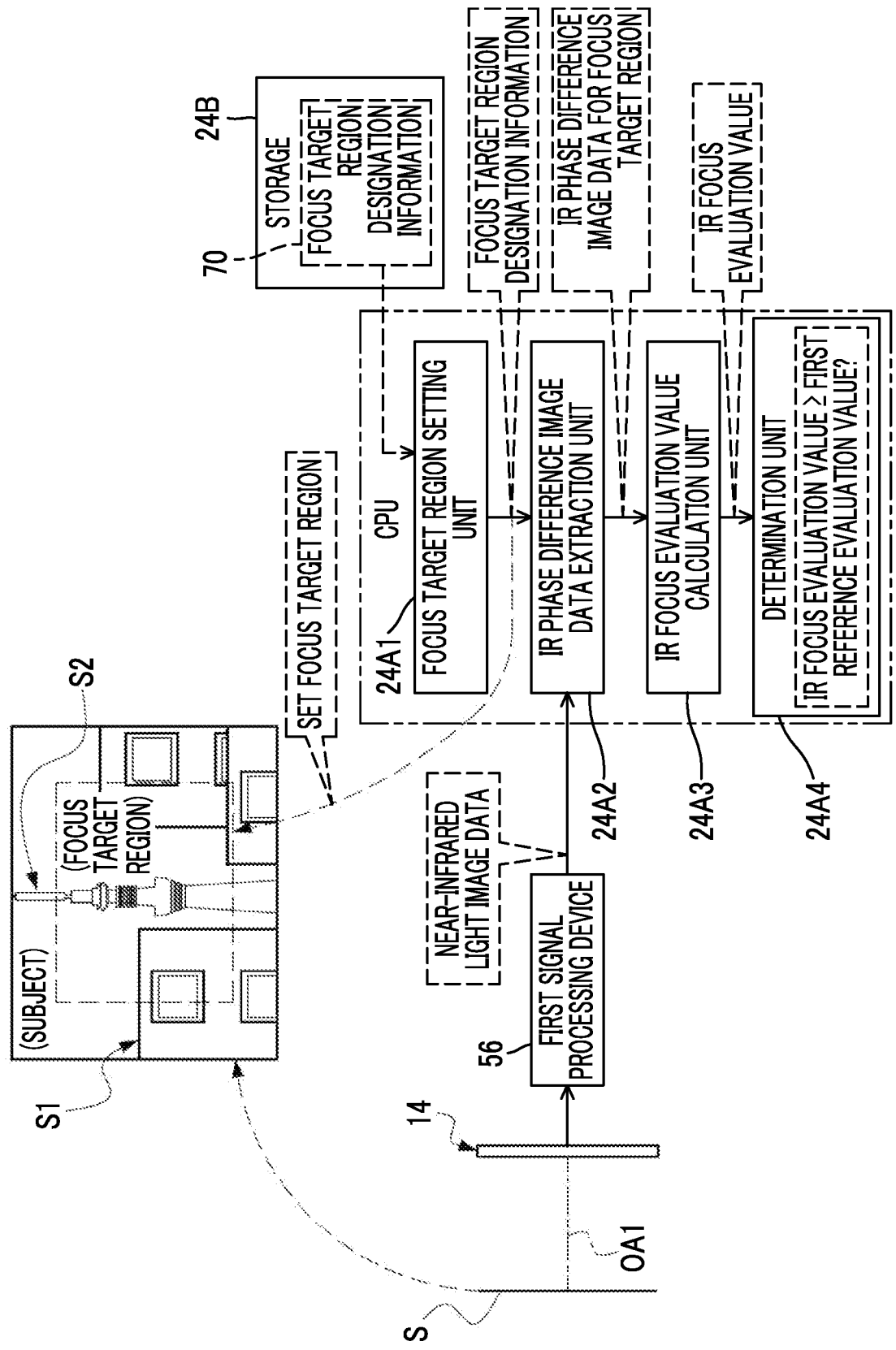
FIG. 13 is a conceptual diagram showing an example of processing contents of a focus target region setting unit, an IR phase difference image data extraction unit, an IR focus evaluation value calculation unit, and a determination unit shown in FIG. 12.

As an example, as shown in FIG. 13, the IR phase difference image data extraction unit 24A2 acquires the near-infrared light image data obtained by being imaged by the first image sensor 14 from the first signal processing device 56.

Focus target region designation information 70 is stored in the storage 24B. The focus target region designation information 70 is information for designating the focus target region in the subject S. As will be described below in detail, the focus target region designation information 70 is updated by the focus target region setting unit 24A1 in accordance with a given condition.

In the example shown in FIG. 13, the default focus target region designation information 70 is stored in the storage 24B, and the focus target region setting unit 24A1 reads out the focus target region designation information 70 from the storage 24B, and sets the focus target region designated by the read out focus target region designation information 70. That is, the focus target region setting unit 24A1 sets the focus target region with respect to the subject S by setting the focus target region designated by the focus target region designation information 70 with respect to the near-infrared light image data acquired from the first signal processing device 56 by the IR phase difference image data extraction unit 24A2. In the example shown in FIG. 13, a rectangular focus target region is set in a center portion of the subject S. Here, the focus target region is an example of a "first focus target region" and a "second focus target region" according to the technology of the present disclosure.

The IR phase difference image data extraction unit 24A2 extracts the IR phase difference image data for the focus target region set by the focus target region setting unit 24A1 from the near-infrared light image data.

The IR focus evaluation value calculation unit 24A3 calculates the IR focus evaluation value based on the IR phase difference image data extracted by the IR phase difference image data extraction unit 24A2. Here, as an example of the IR focus evaluation value, a value based on the deviation amount $\alpha 2$ is adopted. The value based on the deviation amount $\alpha 2$ refers to a value that is higher as the deviation amount $\alpha 2$ is smaller.

The determination unit 24A4 determines whether or not the IR focus evaluation value calculated by the IR focus evaluation value calculation unit 24A3 is equal to or larger than a first reference evaluation value. The first reference evaluation value is an example of a "first reference evaluation value" and a "third reference evaluation value" according to the technology of the present disclosure.

The first reference evaluation value is, for example, a fixed value that is derived in advance as a lower limit value of the IR focus evaluation value capable of being reliably used in estimating the first focus position by a test with an actual machine and/or computer simulation. It should be noted that, here, although the fixed value is used as the first reference evaluation value, the technology of the present disclosure is not limited to this, and a variable value that can be changed in accordance with various given conditions may be used.

Figure 14:
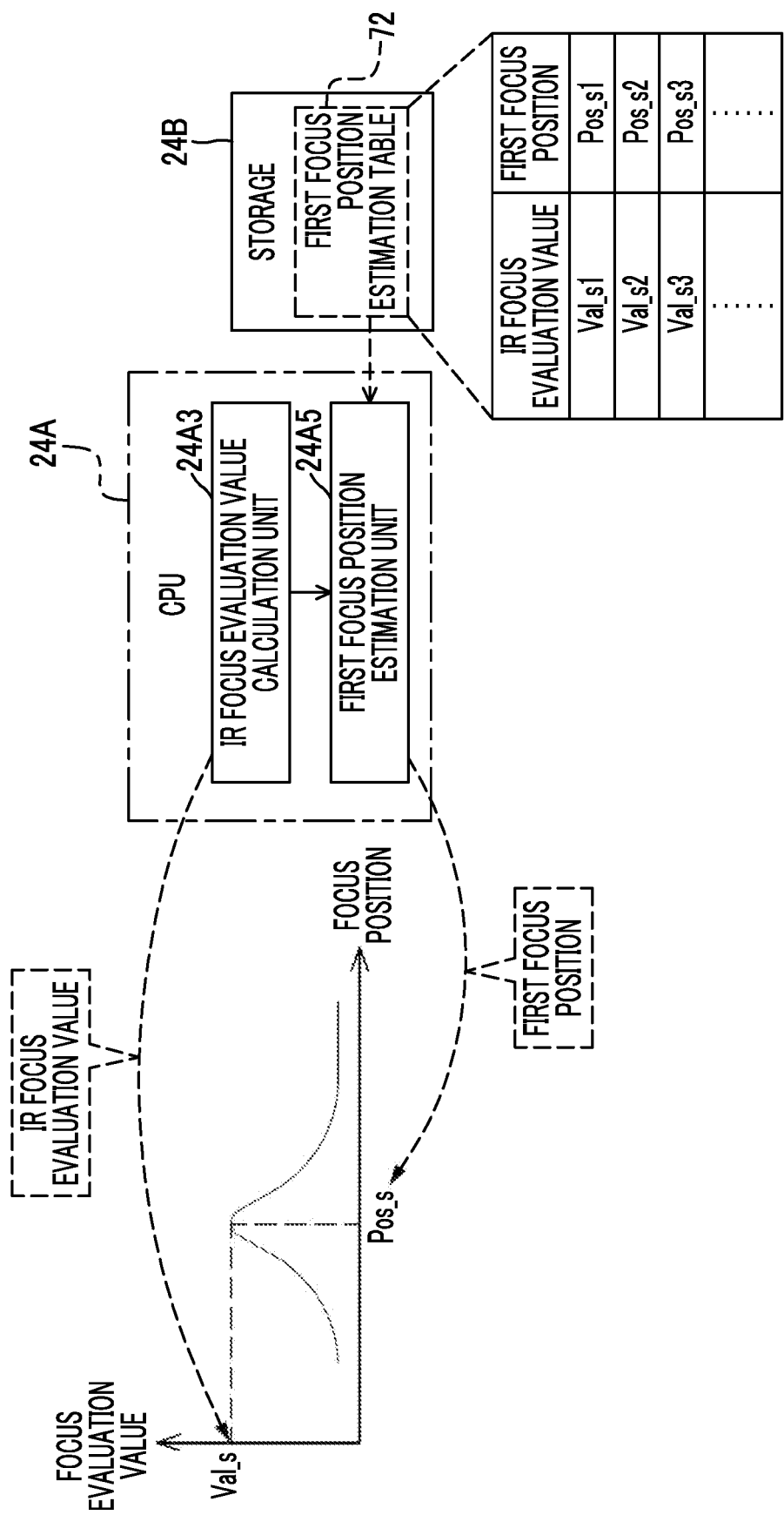
FIG. 14 is a conceptual diagram showing an example of processing contents of the IR focus evaluation value calculation unit and a first focus position estimation unit in a case in which an IR focus evaluation value is equal to or larger than a first reference evaluation value.

As an example, as shown in FIG. 14, the storage 24B stores a first focus position estimation table 72. The first focus position estimation table 72 is a table in which the IR focus evaluation value and the first focus position are associated with each other. The first focus position estimation table 72 is, for example, a table created in accordance with a combination derived in advance as the optimum combination of the IR focus evaluation value and the first focus position by a test with an actual machine and/or computer simulation. It should be noted that the IR focus evaluation value and the first focus position stored in the first focus position estimation table 72 may be variable values that can be changed in accordance with various given conditions.

In a case in which the determination unit 24A4 determines that the IR focus evaluation value calculated by the IR focus evaluation value calculation unit 24A3 is equal to or larger than the first reference evaluation value, the first focus position estimation unit 24A5 estimates the first focus position based on the IR focus evaluation value calculated by the IR focus evaluation value calculation unit 24A3. The estimation of the first focus position is realized by deriving the first focus position from the first focus position estimation table 72. That is, the first focus position estimation unit 24A5 derives the first focus position corresponding to the IR focus evaluation value calculated by the IR focus evaluation value calculation unit 24A3 from the first focus position estimation table 72 in the storage 24B.

It should be noted that, here, as the first focus position estimated by the first focus position estimation unit 24A5, the first focus position derived from the first focus position estimation table 72 is used as it is, but the technology of the present disclosure is not limited to this, and the finely adjusted first focus position obtained by performing the fine adjustment (for example, multiplication of a coefficient) on the first focus position derived from the first focus position estimation table 72 may be used as the first focus position estimated by the first focus position estimation unit 24A5.

In addition, the first focus position estimation table 72 is described here, the technology of the present disclosure is not limited to this, and the first focus position may be calculated from a calculation expression for estimating the first focus position in which the IR focus evaluation value is a dependent variable and the first focus position is an independent variable.

Figure 15:
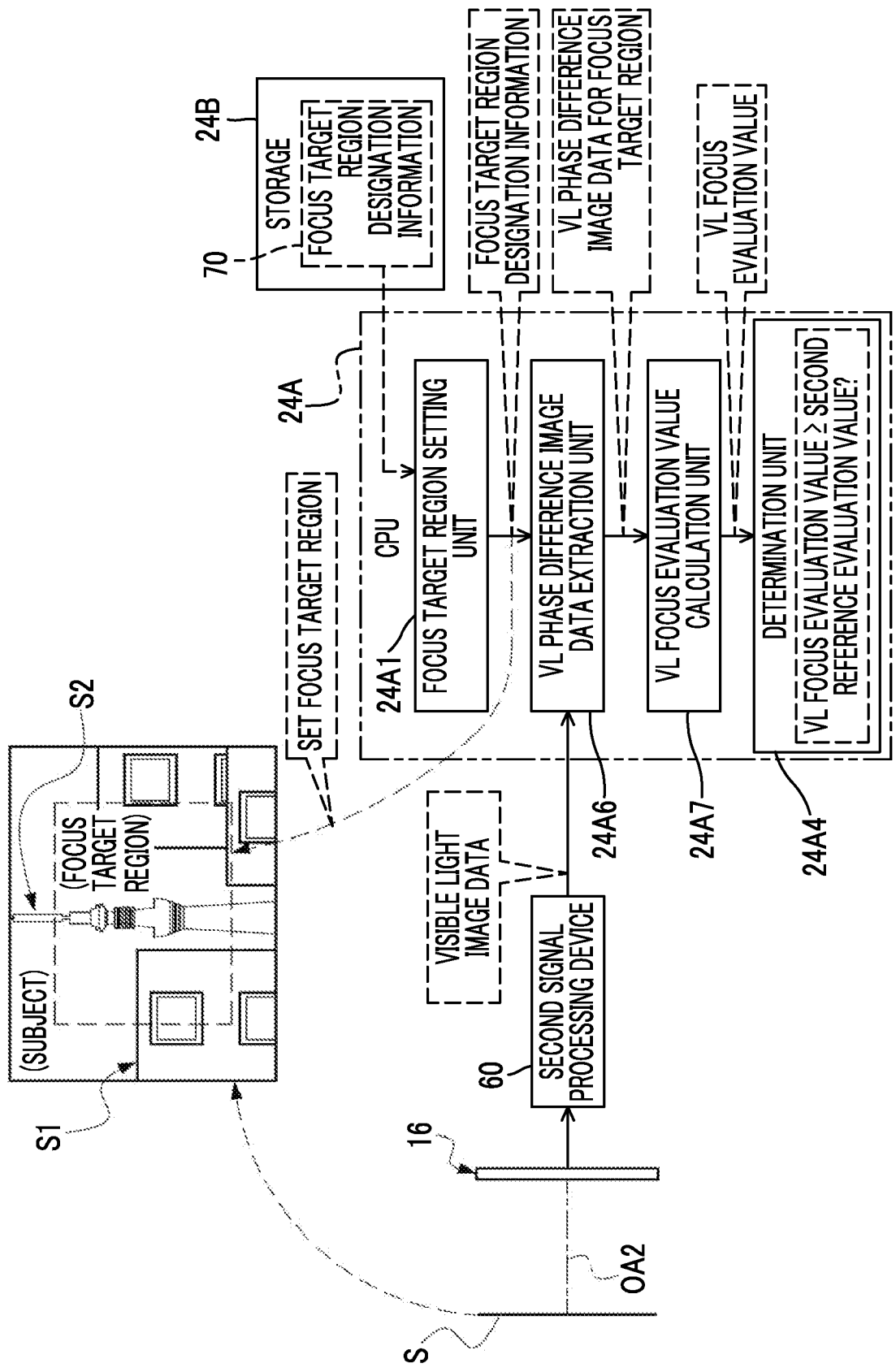
FIG. 15 is a conceptual diagram showing an example of processing contents of the focus target region setting unit, a VL phase difference image data extraction unit, a VL focus evaluation value calculation unit, and the determination unit shown in FIG. 12.

As an example, as shown in FIG. 15, the VL phase difference image data extraction unit 24A6 acquires the visible light image data obtained by being imaged by the second image sensor 16 from the second signal processing device 60. The focus target region setting unit 24A1 reads out the focus target region designation information 70 from the storage 24B, and sets the focus target region designated by the read out focus target region designation information 70. That is, the focus target region setting unit 24A1 sets the focus target region with respect to the subject S by setting the focus target region designated by the focus target region designation information with respect to the visible light image data acquired from the second signal processing device 60 by the VL phase difference image data extraction unit 24A6. In the example shown in FIG. 15, a rectangular focus target region is set in a center portion of the subject S.

The VL phase difference image data extraction unit 24A6 extracts the VL phase difference image data for the focus target region set by the focus target region setting unit 24A1 from the visible light image data.

The VL focus evaluation value calculation unit 24A7 calculates the VL focus evaluation value based on the VL phase difference image data extracted by the VL phase difference image data extraction unit 24A6. Here, as an example of the VL focus evaluation value, a value based on the deviation amount $\alpha 1$ is adopted. The value based on the deviation amount $\alpha 1$ refers to a value that is higher as the deviation amount $\alpha 1$ is smaller.

The determination unit 24A4 determines whether or not the VL focus evaluation value calculated by the VL focus evaluation value calculation unit 24A7 is equal to or larger than a second reference evaluation value. The second reference evaluation value is an example of a "second reference evaluation value" and a "fourth reference evaluation value" according to the technology of the present disclosure.

The second reference evaluation value is, for example, a fixed value that is derived in advance as a lower limit value of the VL focus evaluation value capable of being reliably used in estimating the second focus position by a test with an actual machine and/or computer simulation. It should be noted that, here, although the fixed value is used as the second reference evaluation value, the technology of the present disclosure is not limited to this, and a variable value that can be changed in accordance with various given conditions may be used.

Figure 16:
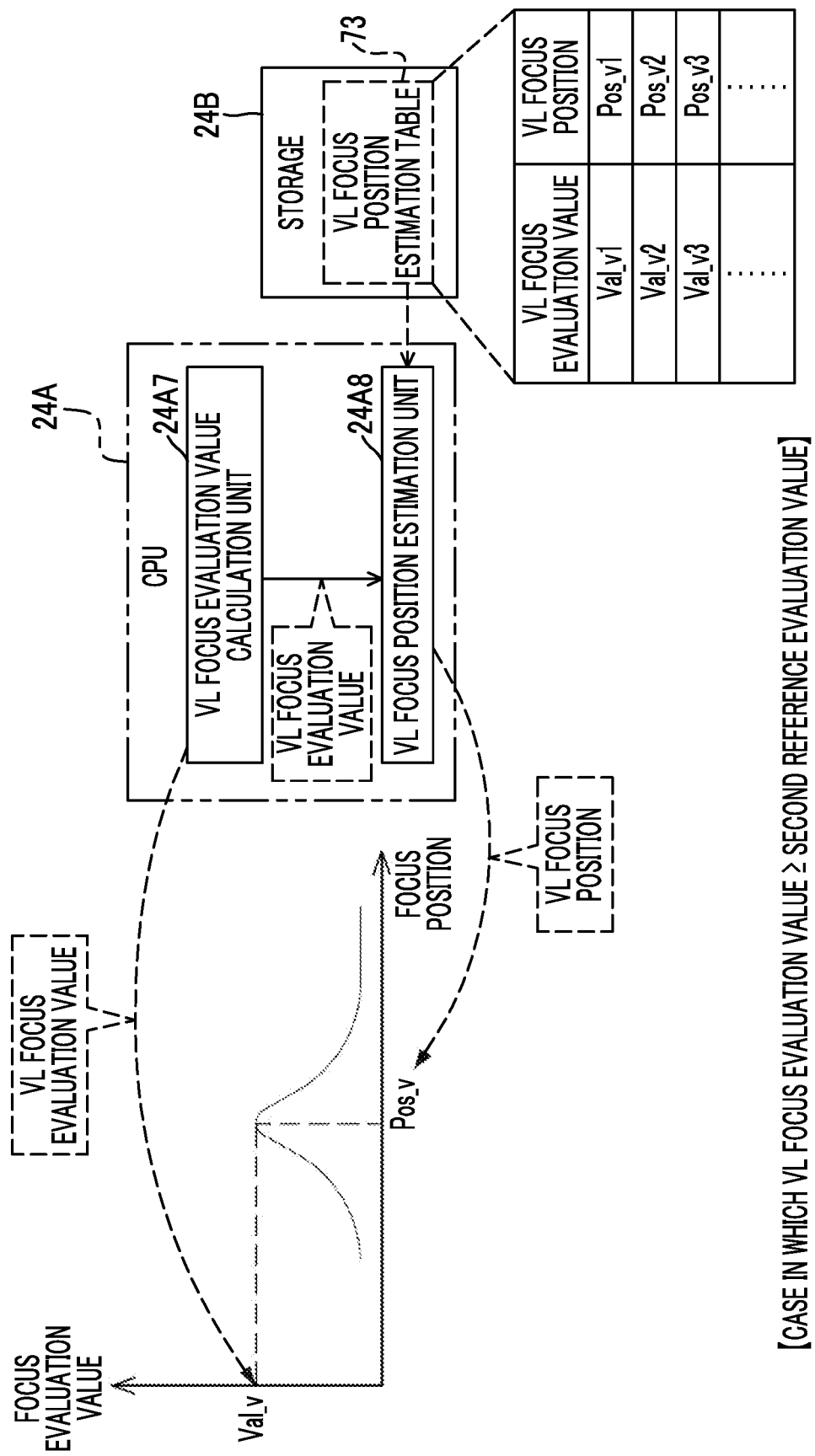
FIG. 16 is a conceptual diagram showing an example of processing contents of the VL focus evaluation value calculation unit and the VL focus position estimation unit in a case in which a VL focus evaluation value is equal to or larger than a second reference evaluation value.

As an example, as shown in FIG. 16, the storage 24B stores a VL focus position estimation table 73. The VL focus position estimation table 73 is a table in which the VL focus evaluation value and the VL focus position are associated with each other. The VL focus position estimation table 73 is, for example, a table created in accordance with a combination derived in advance as the optimum combination of the VL focus evaluation value and the VL focus position by a test with an actual machine and/or computer simulation. It should be noted that the VL focus evaluation value and the VL focus position stored in the VL focus position estimation table 73 may be variable values that can be changed in accordance with various given conditions.

In a case in which the determination unit 24A4 determines that the VL focus evaluation value calculated by the VL focus evaluation value calculation unit 24A7 is equal to or larger than the second reference evaluation value, the VL focus position estimation unit 24A8 estimates the VL focus position based on the VL focus evaluation value calculated by the VL focus evaluation value calculation unit 24A7. The VL focus position is an example of a "third focus position" according to the embodiment of the technology of the present disclosure.

The estimation of the VL focus position is realized by deriving the VL focus position from the VL focus position estimation table 73. That is, the VL focus position estimation unit 24A8 derives the VL focus position corresponding to the VL focus evaluation value calculated by the VL focus evaluation value calculation unit 24A7 from the VL focus position estimation table 73 in the storage 24B.

It should be noted that, here, as the VL focus position estimated by the VL focus position estimation unit 24A8, the VL focus position derived from the VL focus position estimation table 73 is used as it is, but the technology of the present disclosure is not limited to this, and the finely adjusted VL focus position obtained by performing the fine adjustment (for example, multiplication of a coefficient) on the VL focus position derived from the VL focus position estimation table 73 may be used as the VL focus position estimated by the VL focus position estimation unit 24A8.

In addition, the VL focus position estimation table 73 is described here, the technology of the present disclosure is not limited to this, and the VL focus position may be calculated from a calculation expression for estimating the VL focus position in which the VL focus evaluation value is a dependent variable and the VL focus position is an independent variable.

Figure 17:
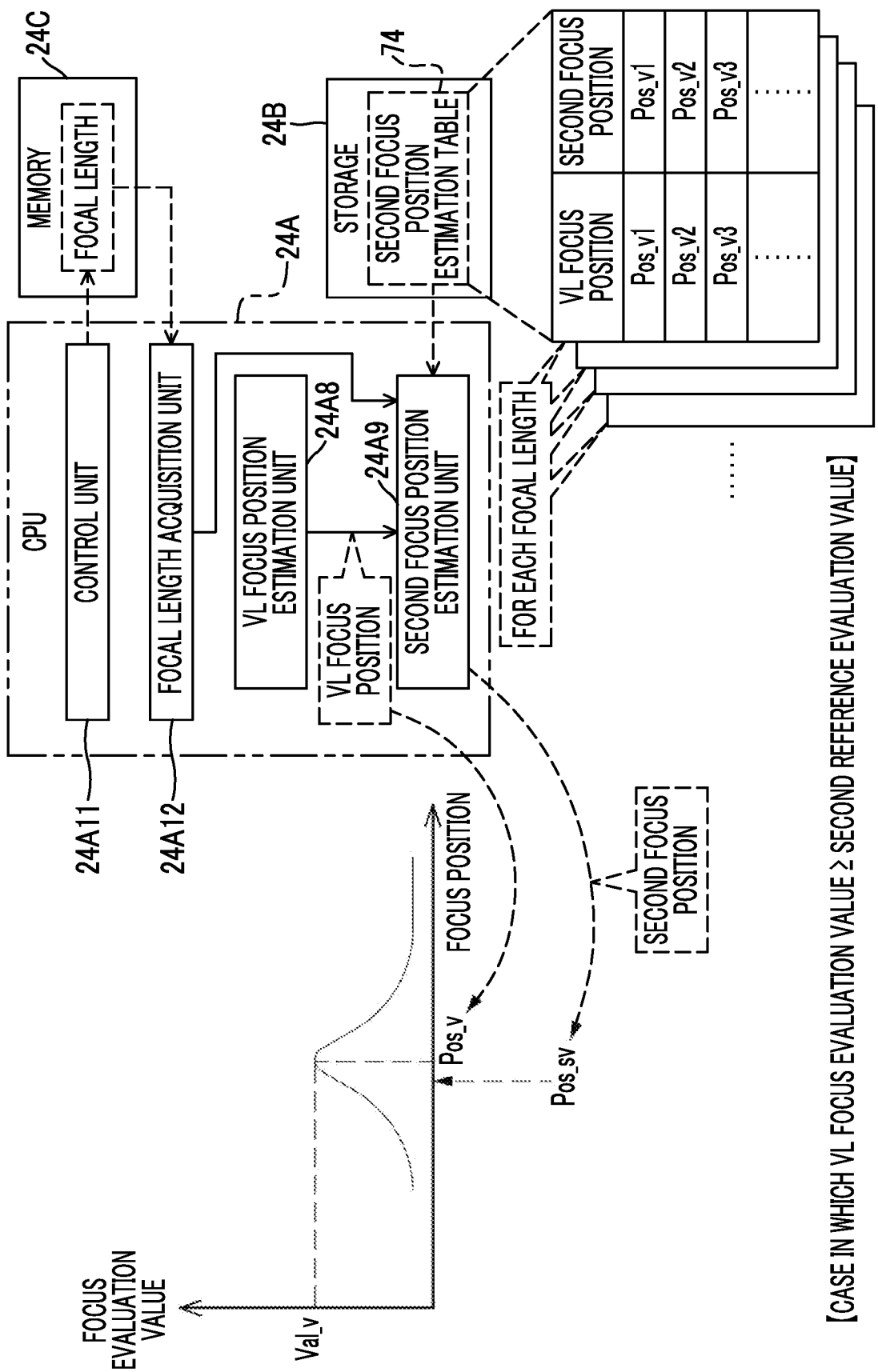
FIG. 17 is a conceptual diagram showing an example of processing contents of a control unit, a focal length acquisition unit, the VL focus position estimation unit, and a second focus position estimation unit in a case in which the VL focus evaluation value is equal to or larger than the second reference evaluation value.

As an example, as shown in FIG. 17, the storage 24B stores a second focus position estimation table 74 for each focal length. The second focus position estimation table 74 is a table in which the VL focus position and the second focus position are associated with each other. The second focus position estimation table 74 is, for example, a table created in accordance with a combination derived in advance as the optimum combination of the VL focus position and the second focus position by a test with an actual machine and/or computer simulation. It should be noted that the VL focus position and the second focus position stored in the second focus position estimation table 74 may be variable values that can be changed in accordance with various given conditions.

The control unit 24A11 acquires the focal length of the optical separation device 12 to store the acquired focal length in the memory 24C. The focal length stored in the memory 24C is updated by the control unit 24A11 each time the focal length is changed. The focal length acquisition unit 24A12 acquires the focal length from the memory 24C.

In a case in which the determination unit 24A4 determines that the VL focus evaluation value calculated by the VL focus evaluation value calculation unit 24A7 is equal to or larger than the second reference evaluation value, the second focus position estimation unit 24A9 estimates the second focus position based on the VL focus position calculated by the VL focus position estimation unit 24A8 and the focal length acquired by the focal length acquisition unit 24A12. The estimation of the second focus position is realized by deriving the second focus position from the second focus position estimation table 74. That is, the second focus position estimation unit 24A9 acquires the second focus position estimation table 74 corresponding to the focal length acquired by the focal length acquisition unit 24A12 from the storage 24B, and derives the second focus position corresponding to the VL focus position derived by the VL focus position estimation unit 24A8 from the acquired second focus position estimation table 74.

It should be noted that, here, as the second focus position estimated by the second focus position estimation unit 24A9, the second focus position derived from the second focus position estimation table 74 is used as it is, but the technology of the present disclosure is not limited to this, and the finely adjusted second focus position obtained by performing the fine adjustment (for example, multiplication of a coefficient) on the second focus position derived from the second focus position estimation table 74 may be used as the second focus position estimated by the second focus position estimation unit 24A9.

In addition, although the form example is described in which the second focus position estimation table 74 is prepared for each focal length, the technology of the present disclosure is not limited to this, and the number of second focus position estimation tables 74 may be one. In this case, for example, the second focus position estimation unit 24A9 may derive the second focus position corresponding to the VL focus position from the second focus position estimation table 74, may adjust the second focus position by multiplying the derived second focus position by a coefficient corresponding to the focal length acquired by the focal length acquisition unit 24A12, and may determine the adjusted second focus position as the final second focus position.

In addition, the second focus position estimation table 74 is described here, the technology of the present disclosure is not limited to this, and the second focus position may be calculated from a calculation expression for estimating the second focus position in which the VL focus position and the focal length are dependent variables and the second focus position is an independent variable.

Figure 18:
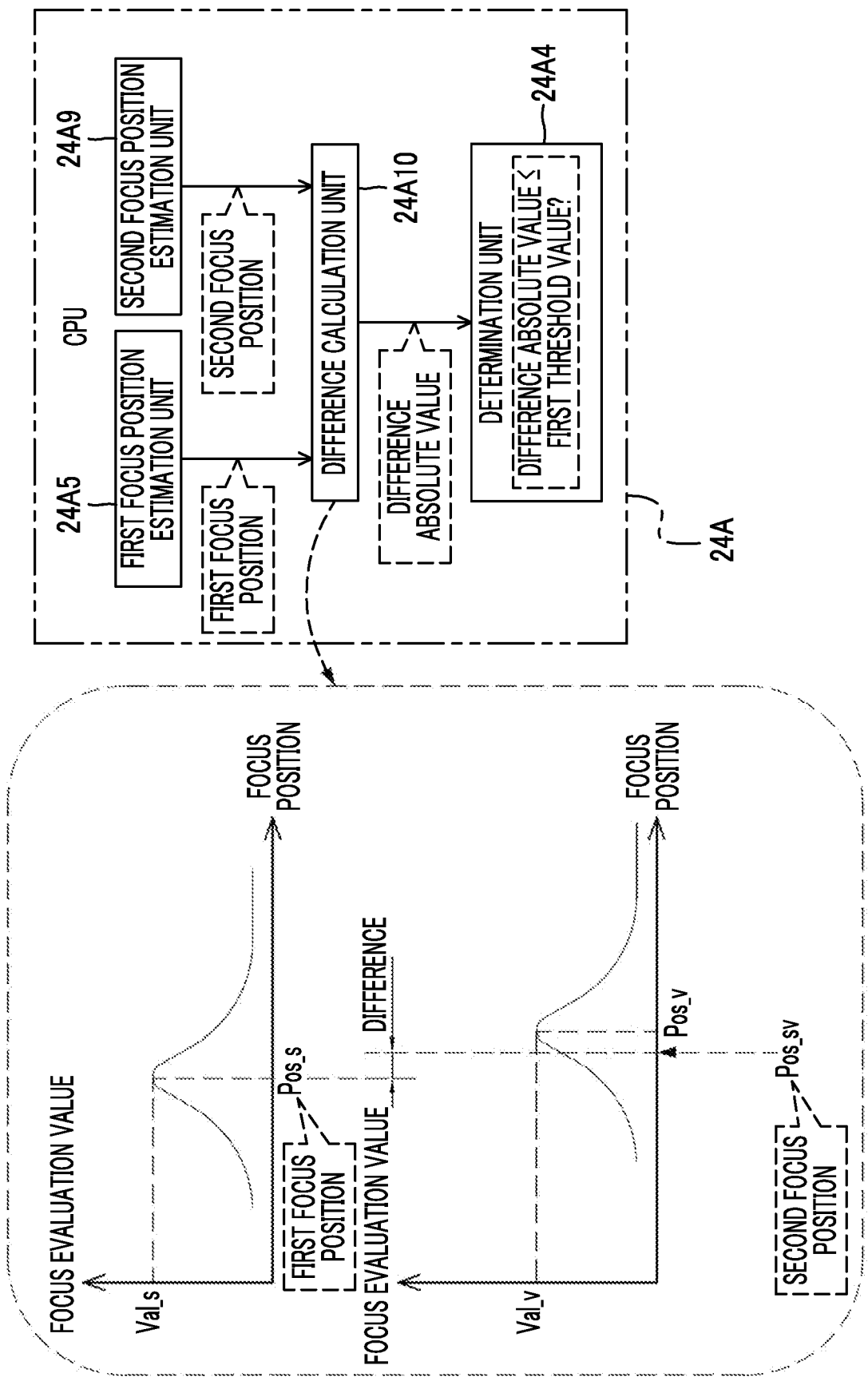
FIG. 18 is a conceptual diagram showing an example of processing contents of the first focus position estimation unit, the second focus position estimation unit, a difference calculation unit, and the determination unit shown in FIG. 12.

As an example, as shown in FIG. 18, the difference calculation unit 24A10 calculates an absolute value of a difference (hereinafter, also referred to as a "difference absolute value") between the first focus position estimated by the first focus position estimation unit 24A5 and the second focus position estimated by the second focus position estimation unit 24A9. The difference absolute value is an example of a "comparison result" and a "value corresponding to a deviation amount between a first focus position and a second focus position" according to the technology of the present disclosure. The difference absolute value is an index indicating a high level of the reliability of the first focus position. The reliability of the first focus position is lower as the difference absolute value is larger, and the reliability of the first focus position is higher as the difference absolute value is smaller.

Therefore, the determination unit 24A4 determines whether or not the difference absolute value calculated by the difference calculation unit 24A10 is equal to or larger than a first threshold value. The first threshold value is a fixed value derived in advance as an upper limit value of the difference absolute value at which the first focus position can be trusted by, for example, a test with an actual machine and/or computer simulation. It should be noted that, here, although the fixed value is used as the first threshold value, the technology of the present disclosure is not limited to this, and a variable value that can be changed in accordance with various given conditions may be used.

Figure 19:
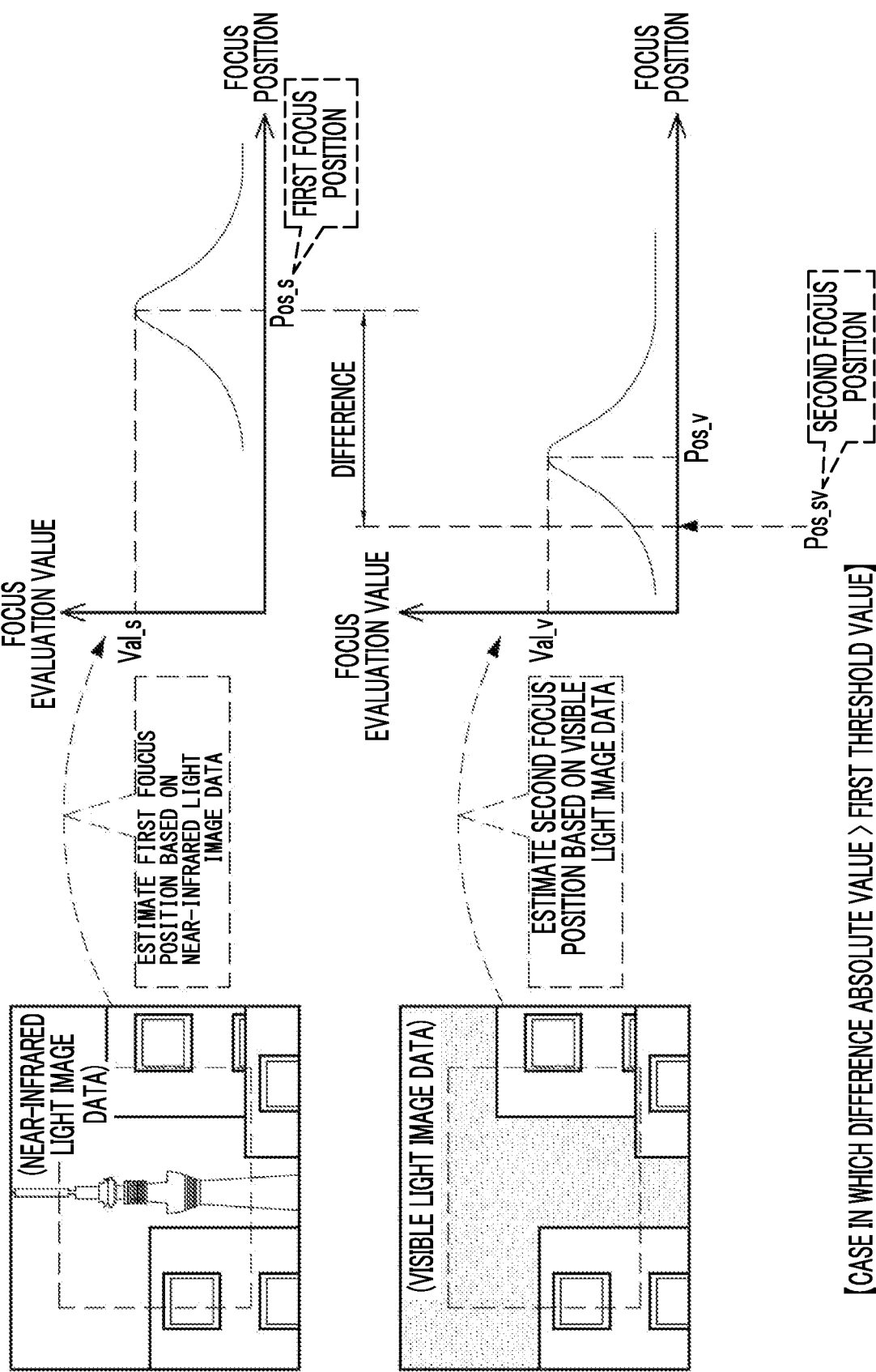
FIG. 19 is a conceptual diagram showing an example of a relationship between a first focus position and a second focus position in a case in which a difference absolute value exceeds a first threshold value.

As an example, as shown in FIG. 19, in a case in which the difference absolute value between the first focus position and the second focus position exceeds the first threshold value, for example, the influence of the visible light on the close-view subject S1 is more strongly reflected than the visible light on the distant-view subject S2 with respect to the visible light image data for the focus target region of the subject S. Examples of the reason for the above include a reason that the light amount of the visible light indicating the distant-view subject S2 out of the visible light incident on the imaging apparatus 10 is overwhelmingly insufficient than the light amount of the visible light indicating the close-view subject S1 depending on a time slot and/or a weather condition. In this way, in a case in which the influence of the visible light on the close-view subject S1 is more strongly reflected on the visible light image data than on the visible light on the distant-view subject S2, the second focus position is separated from the first focus position at a level exceeding the first threshold value.

Figure 20:
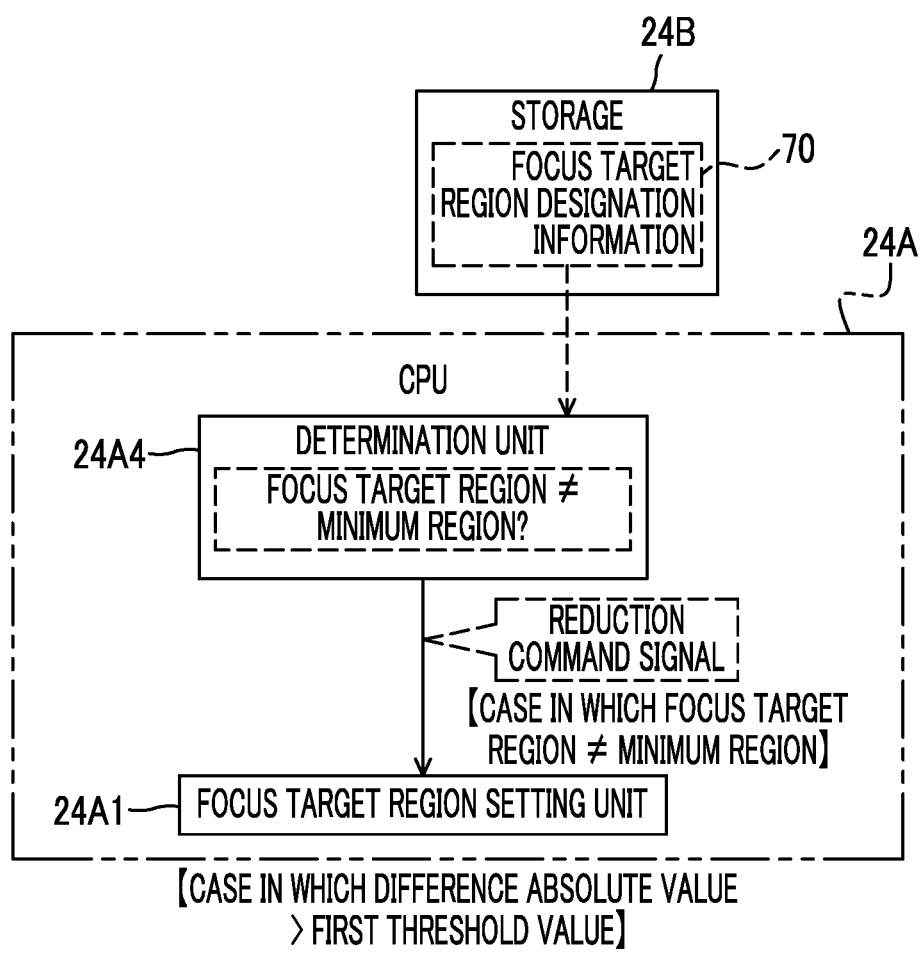
FIG. 20 is a conceptual diagram showing an example of processing contents of the determination unit and the focus target region setting unit in a case in which the difference absolute value exceeds the first threshold value.

Therefore, the focus target region is reduced by the CPU 24A such that the influence of the visible light on the close-view subject S1 is made smaller and the influence of the visible light on the distant-view subject S2 is made larger than the present time with respect to the visible light image data for the focus target region of the subject S. Specifically, as shown in FIG. 20 as an example, first, the determination unit 24A4 determines whether or not the focus target region is a predetermined minimum region. Here, the focus target region to be compared with the predetermined minimum region is the focus target region designated by the focus target region designation information 70 stored in the storage 24B, that is, the latest focus target region set by the focus target region setting unit 24A1. The predetermined minimum region may be, for example, a fixed focus target region smaller than a default focus target region, or may be a focus target region that can be changed in accordance with various given conditions.

In a case in which the focus target region is not the minimum region, the determination unit 24A4 outputs a reduction command signal for instructing the focus target region setting unit 24A1 to reduce the focus target region.

Figure 21:
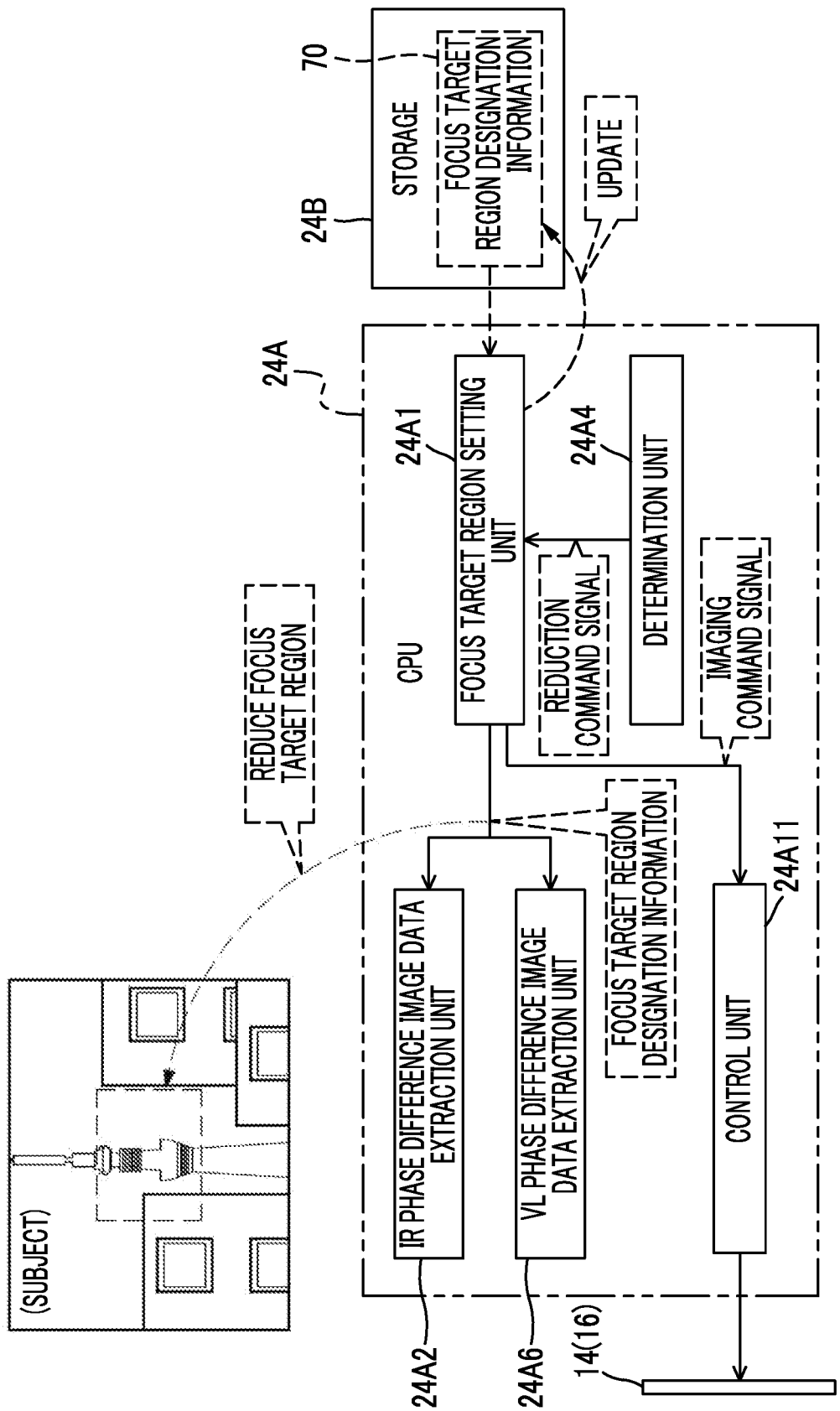
FIG. 21 is a conceptual diagram showing an example of processing contents of the focus target region setting unit, the determination unit, the IR phase difference image data extraction unit, the VL phase difference image data extraction unit, and the control unit in a case in which the focus target region is reduced.

As an example, as shown in FIG. 21, the focus target region setting unit 24A1 updates the focus target region designation information 70 in the storage 24B such that the focus target region is reduced by a predetermined rate (for example, such that the focus target region becomes 0.9 times) in response to the reduction command signal input from the determination unit 24A4.

The focus target region setting unit 24A1 sets the focus target region designated by the updated focus target region designation information 70. That is, the focus target region setting unit 24A1 reduces the focus target region with respect to the subject S by setting the focus target region designated by the focus target region designation information with respect to each of the near-infrared light image data acquired from the first signal processing device 56 by the IR phase difference image data extraction unit 24A2 and the visible light image data acquired from the second signal processing device 60 by the VL phase difference image data extraction unit 24A6. The focus target region setting unit 24A1 reduces the focus target region, and then outputs an imaging command signal for instructing the control unit 24A11 to perform imaging. The control unit 24A11 causes the first image sensor 14 to image the subject S in response to the imaging command signal input from the focus target region setting unit 24A1 to generate the near-infrared light image data. In addition, the control unit 24A11 causes the second image sensor 16 to image the subject S in response to the imaging command signal input from the focus target region setting unit 24A1 to generate the visible light image data.

Figure 22:
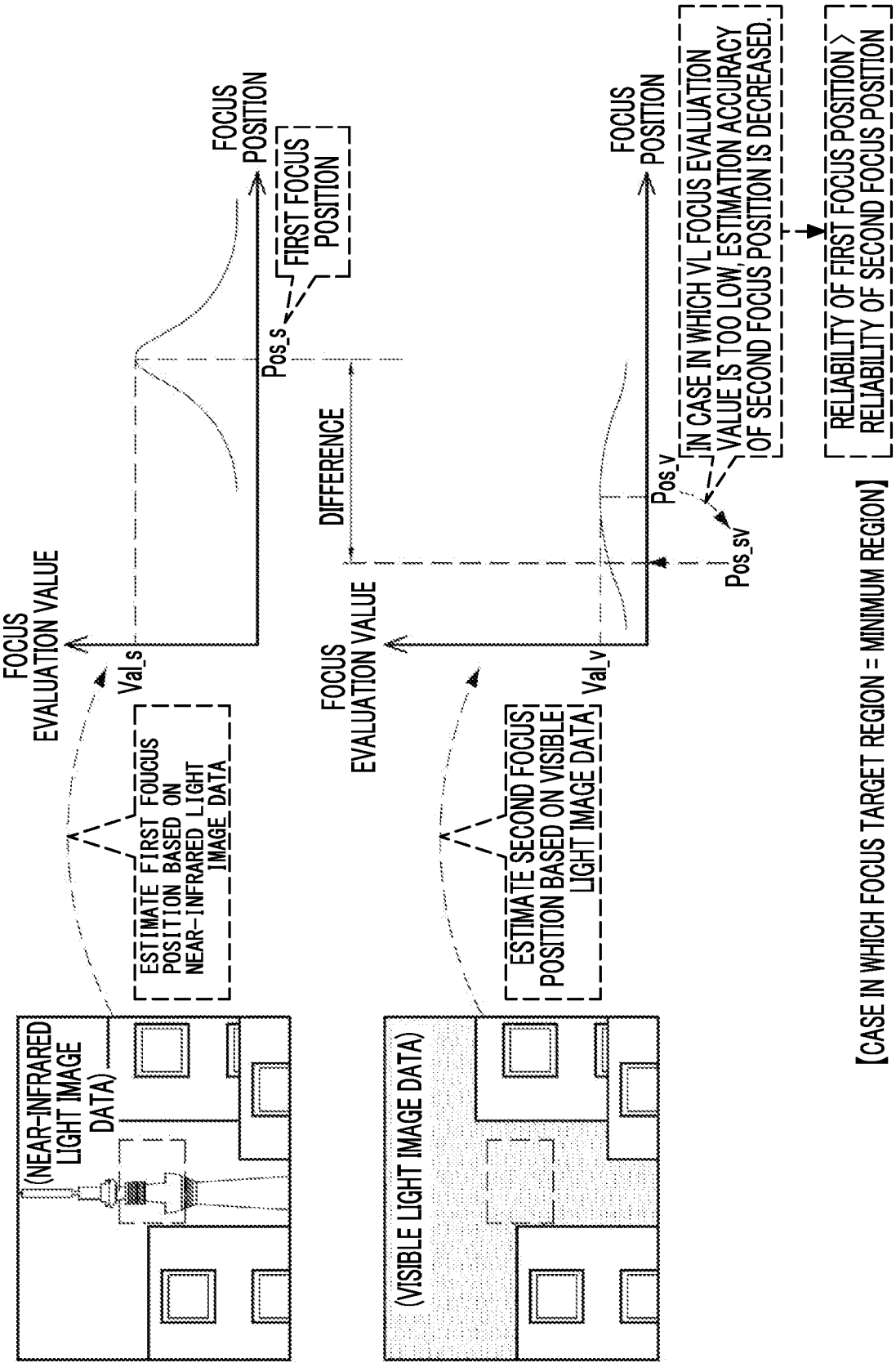
FIG. 22 is a conceptual diagram showing an example of a relationship between the first focus position and the second focus position in a case in which the focus target region reaches a predetermined minimum region.

In a case in which the focus target region is gradually reduced by the focus target region setting unit 24A1 and the focus target region eventually reaches the predetermined minimum region, as shown in FIG. 22 as an example, a signal level of the VL phase difference image data may be decreased, and the VL focus evaluation value may be decreased accordingly. Here, in a case in which the VL focus evaluation value is too low, the estimation accuracy of the second focus position is decreased. In this case, in a case in which the IR focus evaluation value is equal to or larger than the first reference evaluation value, it is confirmed that the reliability of the first focus position is higher than the reliability of the second focus position estimated based on the VL focus position, and the first focus position is used for focusing.

On the other hand, the sensitivity of the first image sensor 14 to the near-infrared light is decreased depending on the time slot and/or the weather condition (for example, a foggy environment), and the IR focus evaluation value is decreased. Therefore, in a case in which the IR focus evaluation value is smaller than the first reference evaluation value, the focus target region setting unit 24A1 enlarges the focus target region to increase the light amount of the near-infrared light received by the first image sensor 14.

Figure 23:
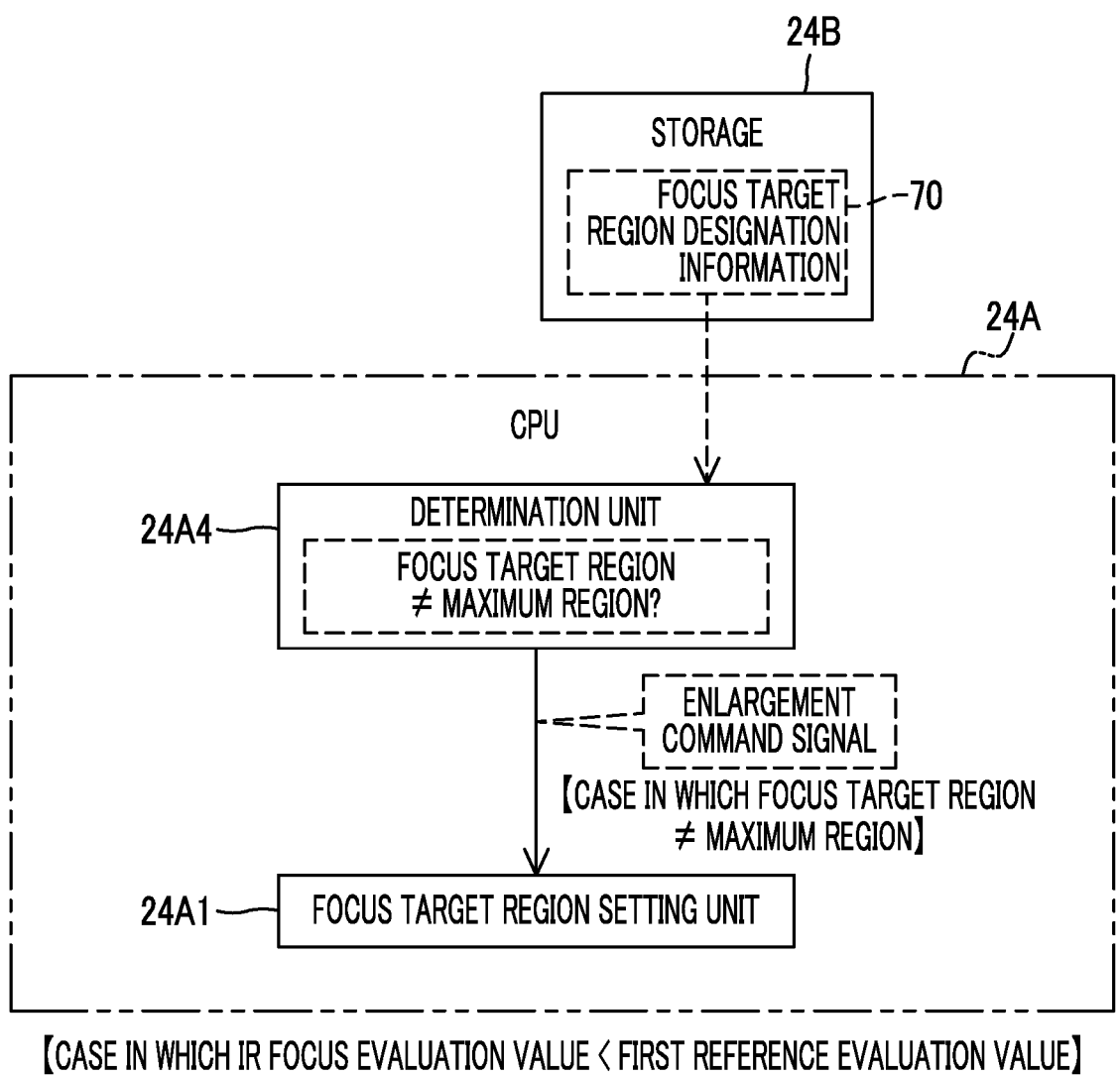
FIG. 23 is a conceptual diagram showing an example of processing contents of the determination unit and the focus target region setting unit in a case in which the IR focus evaluation value is smaller than the first reference evaluation value.

In this case, as shown in FIG. 23 as an example, first, the determination unit 24A4 determines whether or not the focus target region is a predetermined maximum region. Here, the focus target region to be compared with the predetermined maximum region is the focus target region designated by the focus target region designation information 70 stored in the storage 24B, that is, the latest focus target region set by the focus target region setting unit 24A1. The predetermined maximum region may be, for example, a fixed focus target region larger than a default focus target region, or may be a focus target region that can be changed in accordance with various given conditions.

In a case in which the focus target region is not the maximum region, the determination unit 24A4 outputs an enlargement command signal for instructing the focus target region setting unit 24A1 to enlarge the focus target region.

Figure 24:
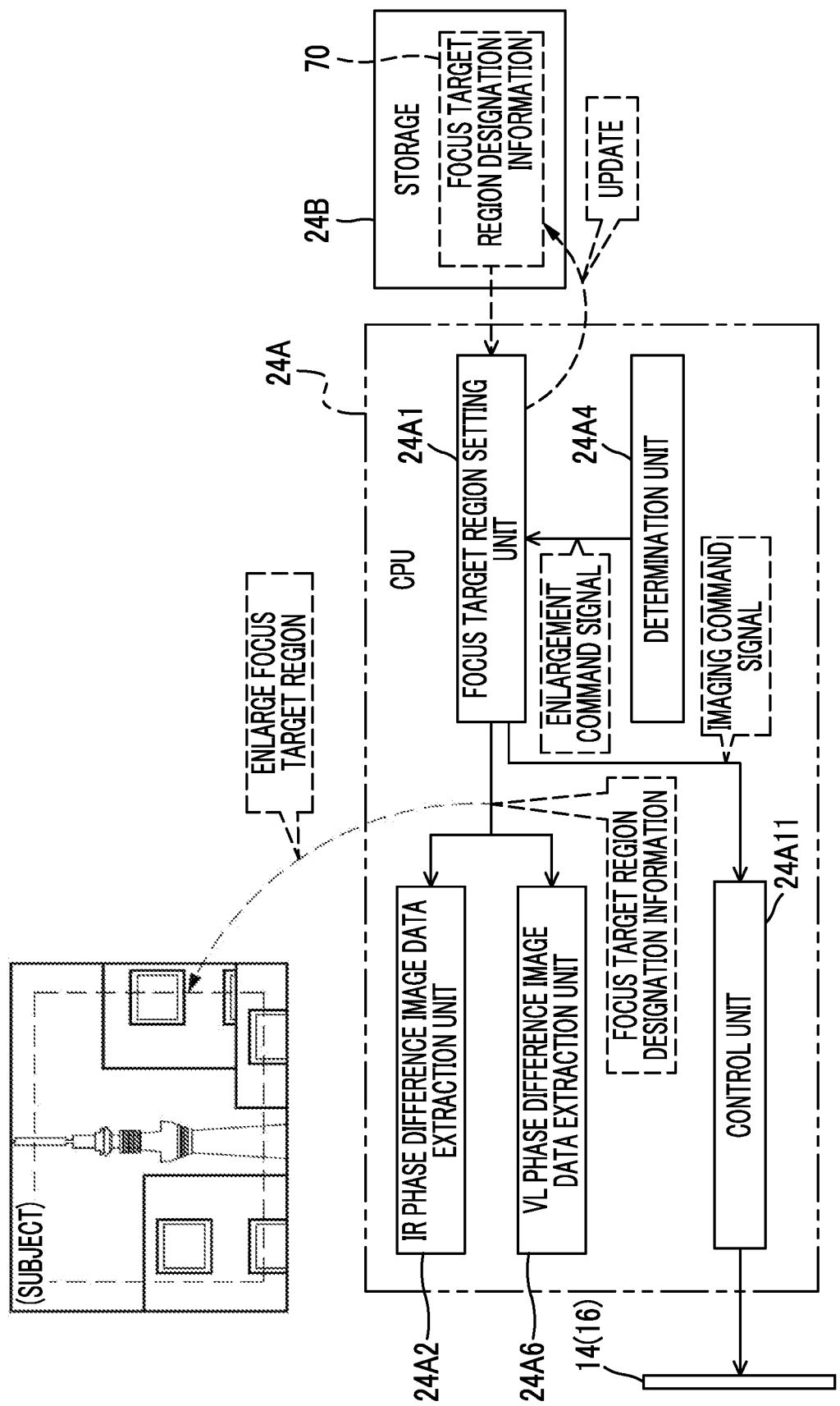
FIG. 24 is a conceptual diagram showing an example of processing contents of the focus target region setting unit, the determination unit, the IR phase difference image data extraction unit, the VL phase difference image data extraction unit, and the control unit in a case in which the focus target region is enlarged.

As an example, as shown in FIG. 24, the focus target region setting unit 24A1 updates the focus target region designation information 70 in the storage 24B such that the focus target region is enlarged by a predetermined rate (for example, such that the focus target region becomes 1.1 times) in response to the enlargement command signal input from the determination unit 24A4.

The focus target region setting unit 24A1 sets the focus target region designated by the updated focus target region designation information 70. That is, the focus target region setting unit 24A1 enlarges the focus target region with respect to the subject S by setting the focus target region designated by the focus target region designation information with respect to each of the near-infrared light image data acquired from the first signal processing device 56 by the IR phase difference image data extraction unit 24A2 and the visible light image data acquired from the second signal processing device 60 by the VL phase difference image data extraction unit 24A6. The focus target region setting unit 24A1 enlarges the focus target region, and then outputs an imaging command signal for instructing the control unit 24A11 to perform imaging. The control unit 24A11 causes the first image sensor 14 to image the subject S in response to the imaging command signal input from the focus target region setting unit 24A1 to generate the near-infrared light image data. In addition, the control unit 24A11 causes the second image sensor 16 to image the subject S in response to the imaging command signal input from the focus target region setting unit 24A1 to generate the visible light image data. The focus target region setting unit 24A1 gradually enlarges the focus target region within a limit of the predetermined maximum region.

Figure 25:
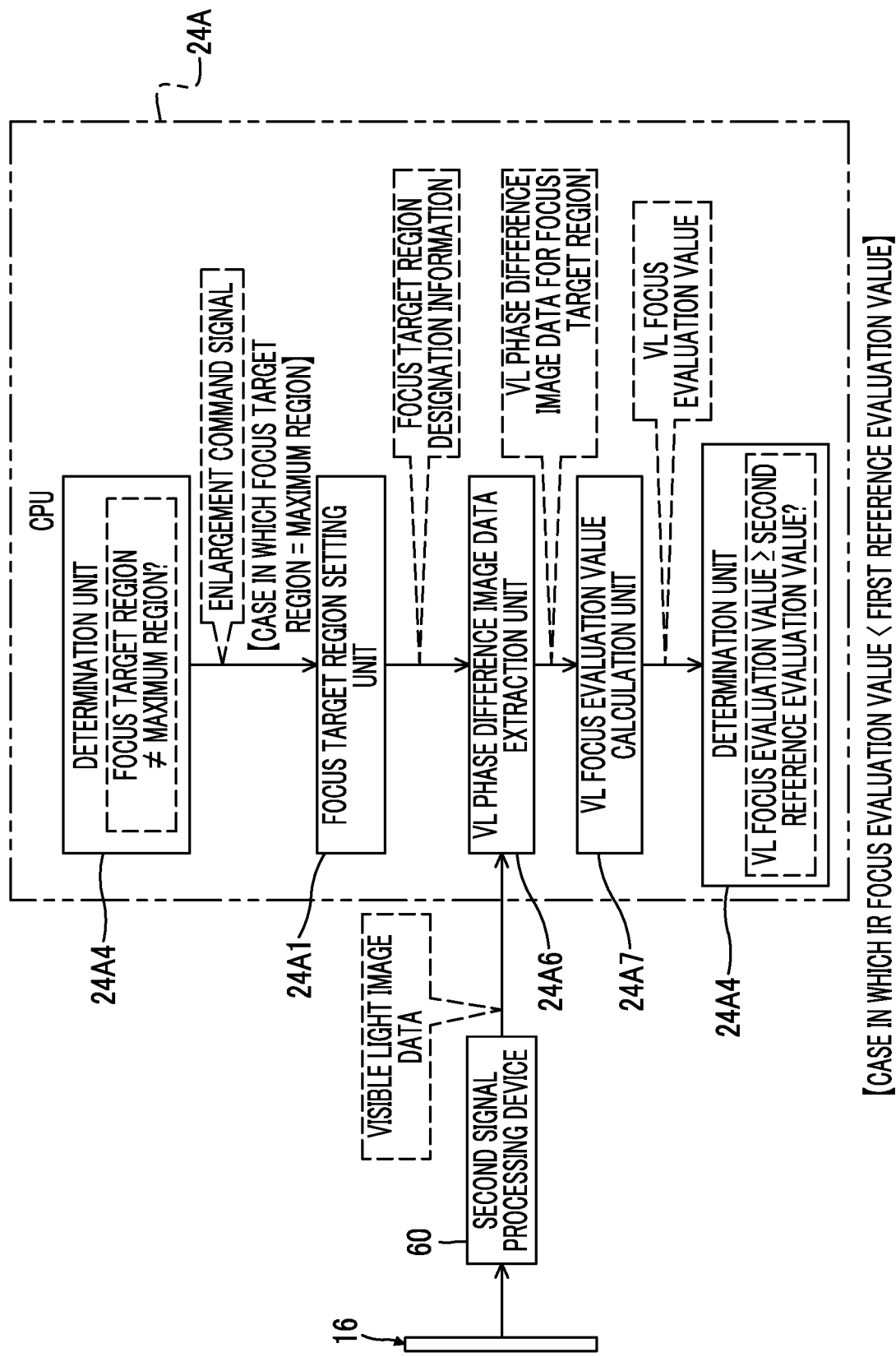
FIG. 25 is a conceptual diagram showing an example of processing contents of the determination unit, the focus target region setting unit, the VL phase difference image data extraction unit, the VL focus evaluation value calculation unit, and the determination unit in a case in which the IR focus evaluation value is smaller than the first reference evaluation value.

As an example, as shown in FIG. 25, in a case in which the focus target region is enlarged to the predetermined maximum region by the focus target region setting unit 24A1 and the IR focus evaluation value is smaller than the first reference evaluation value, the VL phase difference image data extraction unit 24A6 extracts the VL phase difference image data for the focus target region from the visible light image data. The VL focus evaluation value calculation unit 24A7 calculates the VL focus evaluation value based on the VL phase difference image data extracted by the VL phase difference image data extraction unit 24A6. Then, the determination unit 24A4 determines whether or not the VL focus evaluation value calculated by the VL focus evaluation value calculation unit 24A7 is equal to or larger than a second reference evaluation value.

Figure 26:
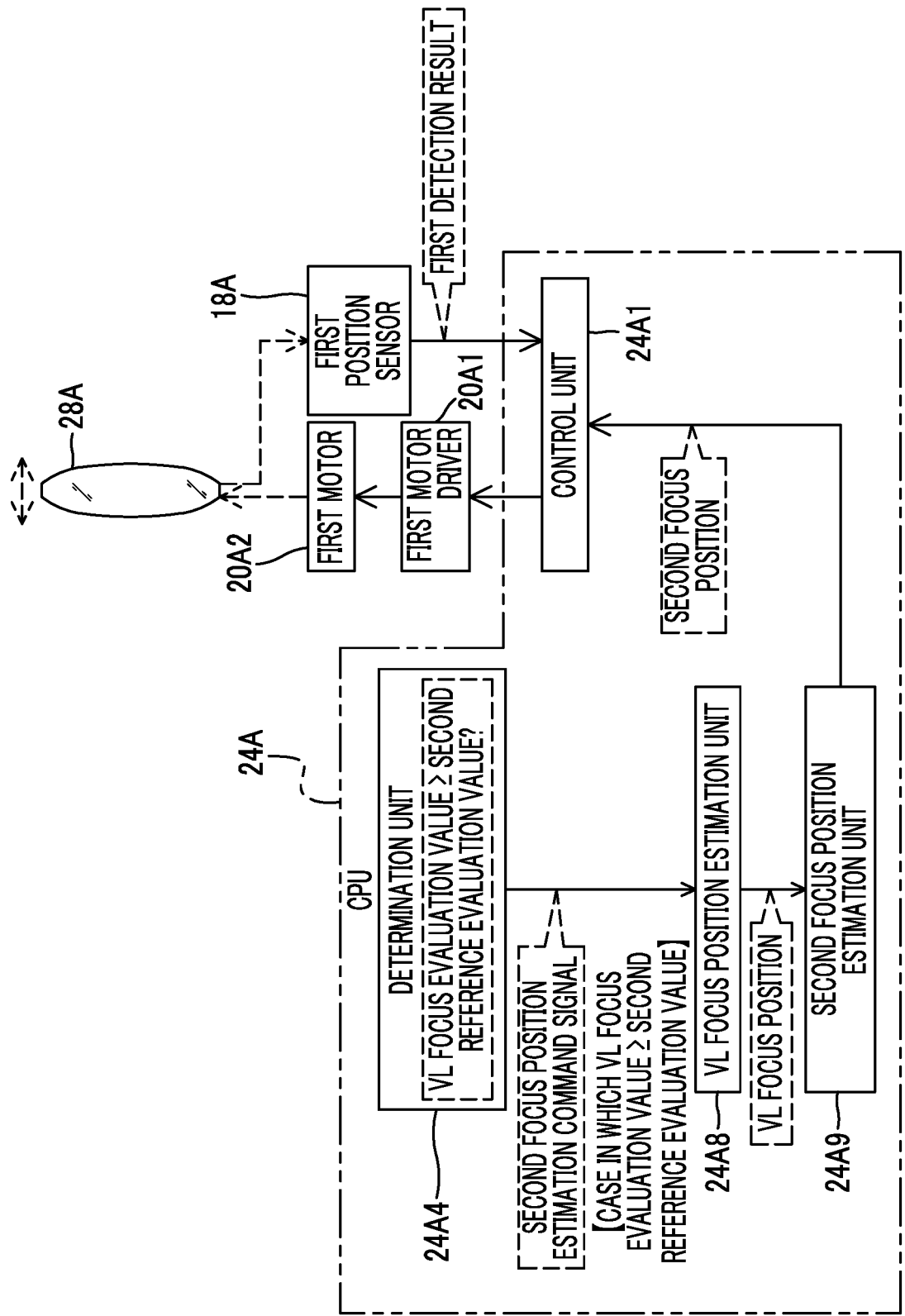
FIG. 26 is a conceptual diagram showing an example of processing contents of the determination unit, the VL focus position estimation unit, the second focus position estimation unit, and the control unit in a case in which the VL focus evaluation value is equal to or larger than the second reference evaluation value.

In a case in which the determination unit 24A4 determines that the VL focus evaluation value is equal to or larger than the second reference evaluation value, as shown in FIG. 26 as an example, the VL focus position estimation unit 24A8 estimates the VL focus position based on the VL focus evaluation value used for the determination of the determination unit 24A4. The second focus position estimation unit 24A9 estimates the second focus position based on the VL focus position estimated by the VL focus position estimation unit 24A8. The control unit 24A11 performs the control of moving the first lens group 28A along the optical axis OA1 toward the second focus position estimated by the second focus position estimation unit 24A9.

Figure 27:
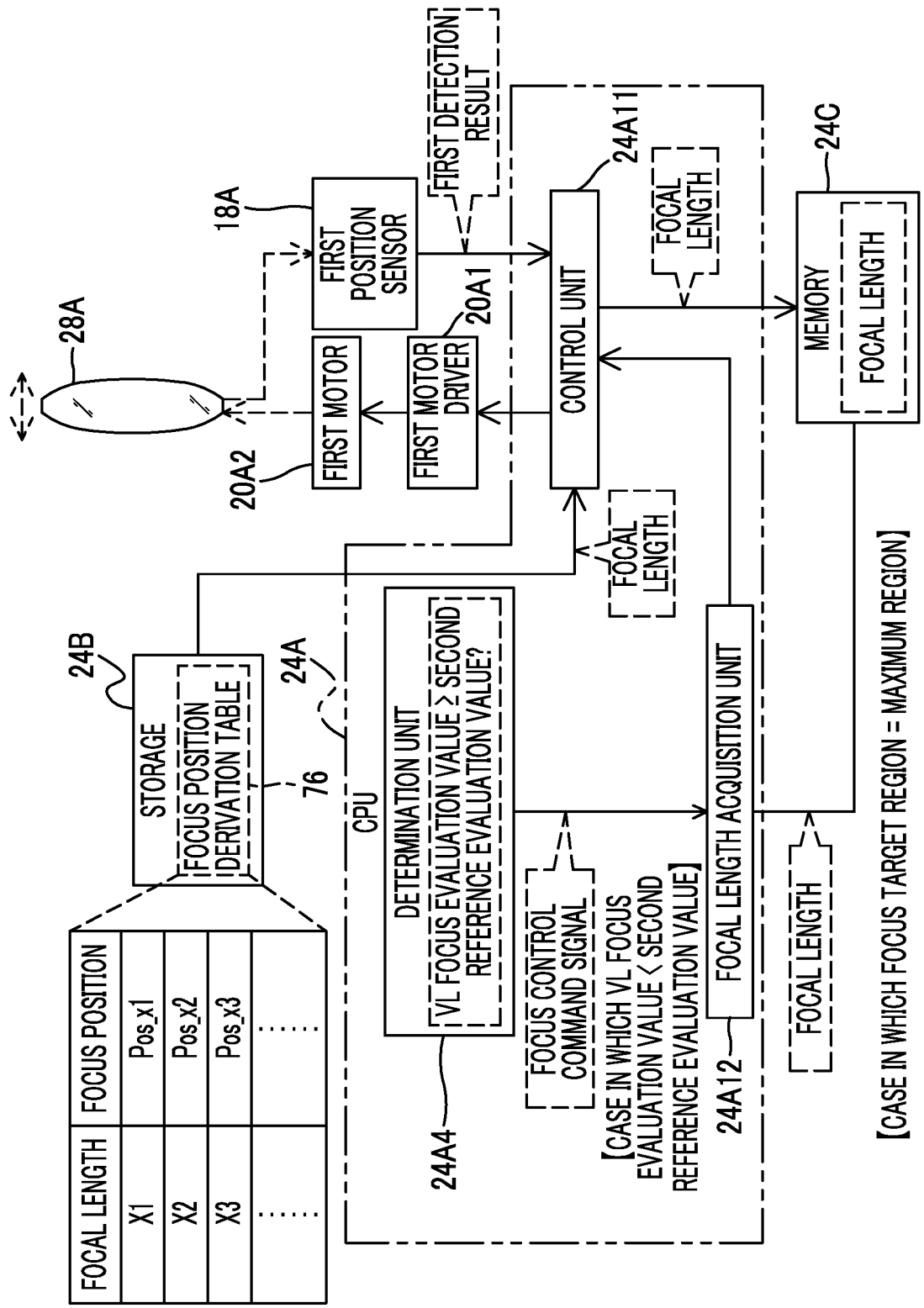
FIG. 27 is a conceptual diagram showing an example of processing contents of the determination unit, the focal length acquisition unit, and the control unit in a case in which the focus target region reaches a predetermined maximum region and the VL focus evaluation value is smaller than the second reference evaluation value.

On the other hand, in a case in which the determination unit 24A4 determines that the VL focus evaluation value is smaller than the second reference evaluation value in a state in which the focus target region is enlarged to the maximum region, as shown in FIG. 27 as an example, the determination unit 24A4 outputs a focus control command signal for giving an instruction for moving the first lens group 28A to the focus position in accordance with the focal length to the focal length acquisition unit 24A12. The focal length acquisition unit 24A12 acquires the focal length from the memory 24C.

A focus position derivation table 76 is stored in the storage 24B. In the focus position derivation table 76, the focal length and the focus position are associated with each other. The focus position derivation table 76 is, for example, a table created in accordance with a combination derived in advance as the optimum combination of the focal length and the focus position by a test with an actual machine and/or computer simulation. It should be noted that the focal length and the focus position stored in the focus position derivation table 76 may be variable values that can be changed in accordance with various given conditions.

The control unit 24A11 performs the control of moving the first lens group 28A along the optical axis OA1 toward the focus position determined in accordance with the focal length acquired by the focal length acquisition unit 24A12. That is, the control unit 24A11 derives the focus position corresponding to the focal length acquired by the focal length acquisition unit 24A12 from the focus position derivation table 76 in the storage 24B, and performs the control of moving the first lens group 28A along the optical axis OA1 toward the derived focus position. It should be noted that the focus position derived from the focus position derivation table 76 by the control unit 24A11 is an example of a "fourth focus position" according to the technology of the present disclosure.

It should be noted that, here, as the focus position derived by the control unit 24A11, the focus position derived from the focus position derivation table 76 is used as it is, but the technology of the present disclosure is not limited to this, and the finely adjusted focus position obtained by performing the fine adjustment (for example, multiplication of a coefficient) on the focus position derived from the focus position derivation table 76 may be used by the control unit 24A11.

In addition, the focus position derivation table 76 is described here, the technology of the present disclosure is not limited to this, and the focus position may be calculated from a calculation expression for deriving the focus position in which the focal length is a dependent variable and the focus position is an independent variable.

As an example, as shown in FIG. 28, in a case in which the determination unit 24A4 determines that the difference absolute value is equal to or smaller than the first threshold value, in a case in which the determination unit 24A4 determines that the VL focus evaluation value is smaller than the second reference evaluation value, and in a case in which the determination unit 24A4 determines that the focus target region is the predetermined minimum region, the control unit 24A11 performs the control of moving the first lens group 28A along the optical axis OA1 toward the first focus position estimated by the first focus position estimation unit 24A5.

Next, the action of the imaging apparatus 10 will be described with reference to FIGS. 29A to 29C.

FIGS. 29A to 29D show an example of a flow of the focus control processing performed by the CPU 24A in a case in which an instruction for starting the focus control processing is received by the reception device 66.

In the focus control processing shown in FIG. 29A, first, in step ST100, the focus target region setting unit 24A1 sets the focus target region for the subject S, and then the focus control processing proceeds to step ST102.

In step ST102, the control unit 24A11 causes the first image sensor 14 and the second image sensor 16 to image the subject S, and then the focus control processing proceeds to step ST104.

In step ST104, the IR phase difference image data extraction unit 24A2 acquires the near-infrared light image data from the first signal processing device 56, and then the focus control processing proceeds to step ST106.

In step ST106, the IR phase difference image data extraction unit 24A2 extracts the IR phase difference image data for the focus target region set in step ST100 from the near-infrared light image data acquired in step ST104, and then the focus control processing proceeds to step ST108.

In step ST108, the IR focus evaluation value calculation unit 24A3 calculates the IR focus evaluation value based on the IR phase difference image data extracted in step ST106, and then the focus control processing proceeds to step ST110.

In step ST110, the determination unit 24A4 determines whether or not the IR focus evaluation value calculated in step ST108 is equal to or larger than the first reference evaluation value. In a case in which the IR focus evaluation value is smaller than the first reference evaluation value in step ST110, a negative determination is made, and the focus control processing proceeds to step ST120 shown in FIG. 29B. In a case in which the IR focus evaluation value is equal to or larger than the first reference evaluation value in step ST110, a positive determination is made, and the focus control processing proceeds to step ST112.

In step ST112, the first focus position estimation unit 24A5 estimates the first focus position based on the IR focus evaluation value calculated in step ST108, and then the focus control processing proceeds to step ST114.

In step ST114, the VL phase difference image data extraction unit 24A6 acquires the visible light image data from the second signal processing device 60, and then the focus control processing proceeds to step ST116.

In step ST116, the VL phase difference image data extraction unit 24A6 extracts the VL phase difference image data for the focus target region set in step ST100 from the visible light image data acquired in step ST114, and then the focus control processing proceeds to step ST118.

In step ST118, the VL focus evaluation value calculation unit 24A7 calculates the VL focus evaluation value based on the VL phase difference image data extracted in step ST116, and then the focus control processing proceeds to step ST144 shown in FIG. 29C.

Figure 29B:
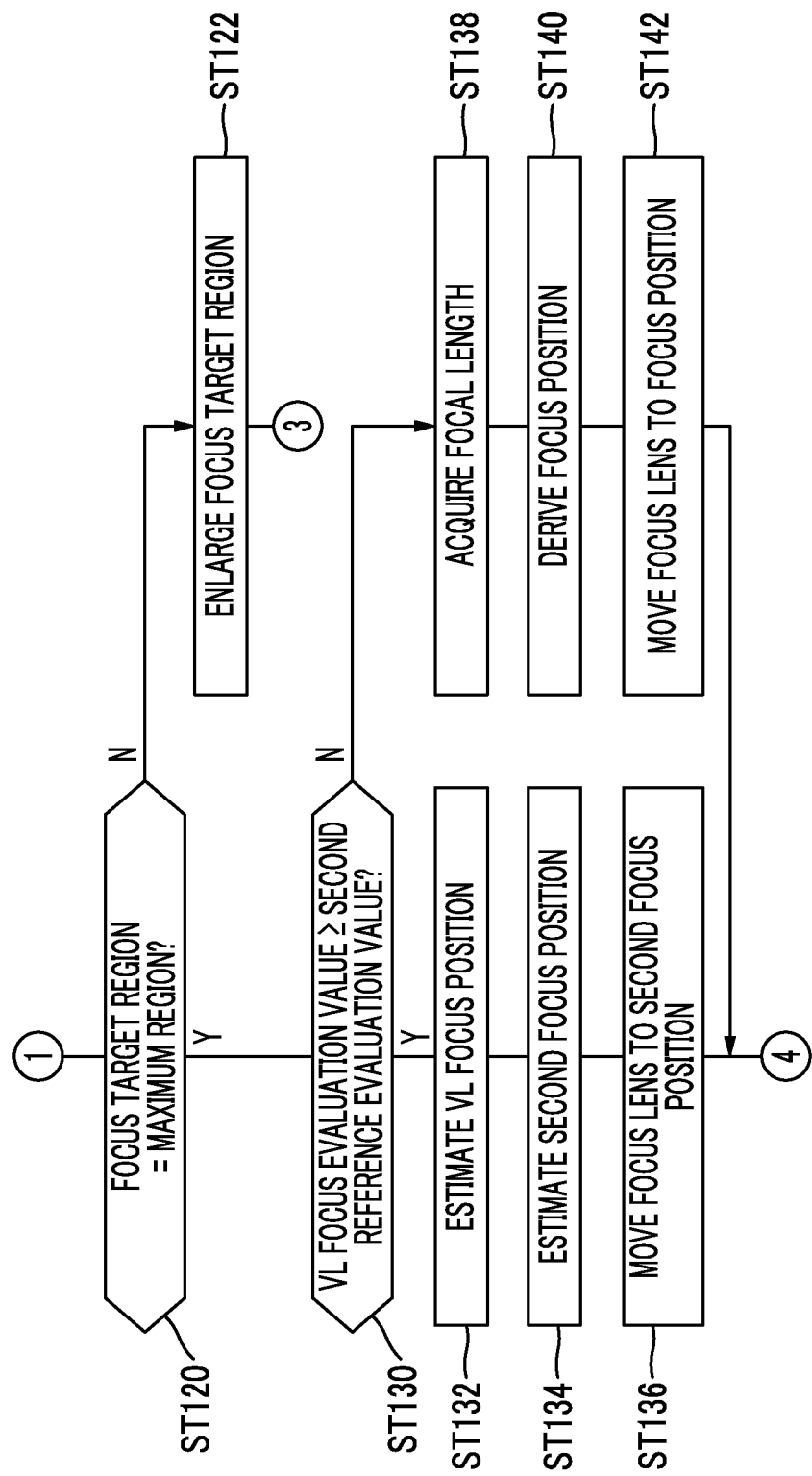
FIG. 29B is a continuation of the flowchart shown in FIG. 29A.

In step ST120 shown in FIG. 29B, the determination unit 24A4 determines whether or not the focus target region set at the present time is the predetermined maximum region. In step ST120, in a case in which the focus target region set at the present time is not the predetermined maximum region, a negative determination is made, and the focus control processing proceeds to step ST122. In step ST120, in a case in which the focus target region set at the present time is the predetermined maximum region, a positive determination is made, and the focus control processing proceeds to step ST130.

In step ST122, the focus target region setting unit 24A1 enlarges the focus target region, and then the focus control processing proceeds to step ST100 shown in FIG. 29A.

In step ST130, the determination unit 24A4 determines whether or not the VL focus evaluation value calculated in step ST118 is equal to or larger than the second reference evaluation value. In step ST130, in a case in which the VL focus evaluation value is smaller than the second reference evaluation value, a negative determination is made, and the focus control processing proceeds to step ST138. In step ST130, in a case in which the VL focus evaluation value is equal to or larger than the second reference evaluation value, a positive determination is made, and the focus control processing proceeds to step ST132.

In step ST132, the VL focus position estimation unit 24A8 estimates the VL focus position based on the VL focus evaluation value calculated in step ST118, and then the focus control processing proceeds to step ST134.

In step ST134, the second focus position estimation unit 24A9 estimates the second focus position based on the VL focus position estimated in step ST132, and then the focus control processing proceeds to step ST136.

In step ST136, the control unit 24A11 performs the control of moving the first lens group 28A along the optical axis OA1 toward the second focus position estimated in step ST134, and then the focus control processing ends.

In step ST138, the focal length acquisition unit 24A12 acquires the focal length from the memory 24C, and then the focus control processing proceeds to step ST140.

In step ST140, the control unit 24A11 derives the focus position corresponding to the focal length acquired in step ST138 from the focus position derivation table 76 in the storage 24B, and then the focus control processing proceeds to step ST142.

In step ST142, the control unit 24A11 performs the control of moving the first lens group 28A along the optical axis OA1 toward the focus position derived in step ST140, and then the focus control processing ends.

In step ST144 shown in FIG. 29C, the determination unit 24A4 determines whether or not the VL focus evaluation value calculated in step ST118 is equal to or larger than the second reference evaluation value. In step ST144, in a case in which the VL focus evaluation value is smaller than the second reference evaluation value, a negative determination is made, and the focus control processing proceeds to step ST158. In step ST144, in a case in which the VL focus evaluation value is equal to or larger than the second reference evaluation value, a positive determination is made, and the focus control processing proceeds to step ST146.

In step ST146, the VL focus position estimation unit 24A8 estimates the VL focus position based on the VL focus evaluation value calculated in step ST118, and then the focus control processing proceeds to step ST148.

In step ST148, the second focus position estimation unit 24A9 estimates the second focus position based on the VL focus position estimated in step ST146, and then the focus control processing proceeds to step ST150.

In step ST150, the difference calculation unit 24A10 calculates the difference absolute value between the first focus position estimated in step ST112 and the second focus position estimated in step ST148, and then the focus control processing proceeds to step ST152.

In step ST152, the determination unit 24A4 determines whether or not the difference absolute value calculated in step ST150 is equal to or smaller than the first threshold value. In step ST152, in a case in which the difference absolute value exceeds the first threshold value, a negative determination is made, and the focus control processing proceeds to step ST154. In step ST152, in a case in which the difference absolute value is equal to or smaller than the first threshold value, a positive determination is made, and the focus control processing proceeds to step ST158.

In step ST154, the determination unit 24A4 determines whether or not the focus target region set at the present time is the predetermined minimum region. In step ST154, in a case in which the focus target region set at the present time is not the predetermined minimum region, a negative determination is made, and the focus control processing proceeds to step ST156. In step ST154, in a case in which the focus target region set at the present time is the predetermined minimum region, a positive determination is made, and the focus control processing proceeds to step ST158.

In step ST156, the focus target region setting unit 24A1 reduces the focus target region, and then the focus control processing proceeds to step ST100 shown in FIG. 29A.

In step ST158, the control unit 24A11 performs the control of moving the first lens group 28A along the optical axis OA1 toward the first focus position estimated in step ST112, and then the focus control processing ends.

As described above, in the imaging apparatus 10, the first focus position is estimated by the first focus position estimation unit 24A5 based on the IR focus evaluation value, and the second focus position is estimated by the second focus position estimation unit 24A9 based on the VL focus evaluation value. Then, in a case in which the comparison result obtained by comparing the first focus position with the second focus position satisfies the predetermined condition (in the example shown in FIG. 29C, a positive determination is made in step ST152), the control unit 24A11 performs the control of moving the first lens group 28A along the optical axis OA1 based on the first focus position. Therefore, with the present configuration, it is possible to perform highly reliable focusing on the near-infrared light as compared with a case in which the focus lens is moved to the focus position estimated by using only the focus evaluation value determined in accordance with the near-infrared light image data. It should be noted that, although the near-infrared light is described here, the technology of the present disclosure is not limited to this, and any light having a longer wavelength than the visible light need only be used. In this case as well, the same effect can be obtained.

In addition, in the imaging apparatus 10, in a case in which the difference absolute value calculated by the difference calculation unit 24A10 is equal to or smaller than the first threshold value, the control unit 24A11 performs the control of moving the first lens group 28A along the optical axis OA1 based on the first focus position. Therefore, with the present configuration, it is possible to perform highly reliable focusing on the near-infrared light as compared with a case in which a value irrelevant to the deviation amount between the first focus position and the second focus position is used.

In addition, in the imaging apparatus 10, the VL focus position is estimated by the VL focus position estimation unit 24A8 based on the VL focus evaluation value, and the second focus position is estimated by the second focus position estimation unit 24A9 based on the VL focus position and the focal length. Therefore, with the present configuration, it is possible to highly accurately estimate the second focus position as compared with a case in which the second focus position is estimated without considering the VL focus position and the focal length.

In addition, in the imaging apparatus 10, in a case in which the IR focus evaluation value is equal to or larger than the first reference evaluation value, the first focus position is estimated by the first focus position estimation unit 24A5, and in a case in which the VL focus evaluation value is equal to or larger than the second reference evaluation value, the second focus position is estimated by the second focus position estimation unit 24A9. As a result, it is possible to prevent the first focus position from being estimated in a case in which the IR focus evaluation value is too low, and to prevent the second focus position from being estimated in a case in which the VL focus evaluation value is too low. Therefore, it is possible to perform highly reliable focusing on the near-infrared light as compared with a case in which the first focus position is estimated even in a case in which the IR focus evaluation value is smaller than the first reference evaluation value, and the second focus position is estimated even in a case in which the VL focus evaluation value is smaller than the second reference evaluation value.

In addition, in the imaging apparatus 10, in a case in which the VL focus evaluation value is too low, as a result, it is difficult to estimate the second focus position or the estimation accuracy of the second focus position is decreased. Therefore, the high or low level of the reliability of the VL focus evaluation value is determined by the determination unit 24A4 by using the second reference evaluation value. That is, the determination unit 24A4 determines whether or not the VL focus evaluation value is equal to or larger than the second reference evaluation value. Then, in a case in which the VL focus evaluation value is smaller than the second reference evaluation value, the control unit 24A11 performs the control of moving the first lens group 28A based on the first focus evaluation value. Therefore, with the present configuration, it is possible to perform highly reliable focusing on the near-infrared light as compared with a case in which the second focus position is estimated based on the VL focus evaluation value even though the VL focus evaluation value is smaller than the second reference evaluation value, and the movement destination of the focus lens is determined by using the estimated second focus position.

In addition, in the imaging apparatus 10, in a case in which the difference absolute value calculated by the difference calculation unit 24A10 exceeds the first threshold value, the focus target region is reduced by the focus target region setting unit 24A1 and the near-infrared light image data and the visible light image data are generated by performing imaging again after the focus target region is reduced. In this way, in a case in which the focus target region is reduced, it is possible to improve a possibility of decreasing the influence of the visible light on the nearest side on the visible light image data as compared with a case in which the focus target region is always fixed, as a result, it is possible to improve a possibility of obtaining the image data for the near-infrared light and the visible light on the infinity side from the nearest side. The above means that a possibility of obtaining the comparison result between the first focus position for the near-infrared light on the infinity side from the nearest side and the second focus position for the near-infrared light on the infinity side from the nearest side can be improved. Therefore, it is possible to perform easily focusing on the near-infrared light as compared with a case in which the focus target region is always fixed.

In addition, in the imaging apparatus 10, the focus target region is reduced to the predetermined minimum region by the focus target region setting unit 24A1. Therefore, with the present configuration, it is possible to improve the possibility of decreasing the influence of the visible light on the nearest side on the visible light image data as compared with a case in which the focus target region is not reduced to the predetermined minimum region.

In addition, in the imaging apparatus 10, in a case in which the IR focus evaluation value is smaller than the first reference evaluation value, the focus target region is enlarged by the focus target region setting unit 24A1 and the near-infrared light image data and the visible light image data are generated by performing imaging again after the focus target region is enlarged. In a case in which the focus target region is enlarged, it is possible to improve a possibility of increasing the influence of the near-infrared light on the infinity side on the near-infrared light image data as compared with a case in which the focus target region is always fixed, as a result, it is possible to improve a possibility of obtaining the image data for the near-infrared light and the visible light on the infinity side from the nearest side. The above means that a possibility of obtaining the comparison result between the first focus position for the near-infrared light on the infinity side from the nearest side and the second focus position for the near-infrared light on the infinity side from the nearest side can be improved. Therefore, it is possible to perform easily focusing on the near-infrared light as compared with a case in which the focus target region is always fixed.

In addition, in the imaging apparatus 10, the focus target region is enlarged to the predetermined maximum region by the focus target region setting unit 24A1. Therefore, with the present configuration, it is possible to improve the possibility of increasing the influence of the near-infrared light on the infinity side on the near-infrared light image data as compared with a case in which the focus target region is not enlarged to the predetermined maximum region.

Further, in the imaging apparatus 10, in a case in which the focus target region is enlarged to the predetermined maximum region by the focus target region setting unit 24A1 and the VL focus evaluation value is smaller than the second reference evaluation value, the control unit 24A11 performs the control of moving the first lens group 28A to the focus position determined in accordance with the focal length. Therefore, with the present configuration, even in a case in which a condition for estimating the first focus position is not satisfied, focusing can be performed in accordance with the focal length.

Second Embodiment

In the first embodiment, the form example is described in which the control unit 24A11 unconditionally moves the first lens group 28A along the optical axis OA1 toward the first focus position in a case in which the focus target region is reduced and reaches the predetermined minimum region. However, in the second embodiment, a case will be described in which the control unit 24A11 selectively moves the first lens group 28A to the first focus position and the second focus position along the optical axis OA1 depending on the condition in a case in which the focus target region is reduced and reaches the predetermined minimum region. It should be noted that, in the second embodiment, the components described in the first embodiment will be designated by the same reference numerals and description thereof will be omitted.

An imaging apparatus 100 (see FIGS. 1 and 2) according to the second embodiment is different from the imaging apparatus 10 in that a focus control processing program 80 is stored in the storage 24B instead of the focus control processing program 68.

Figure 30:
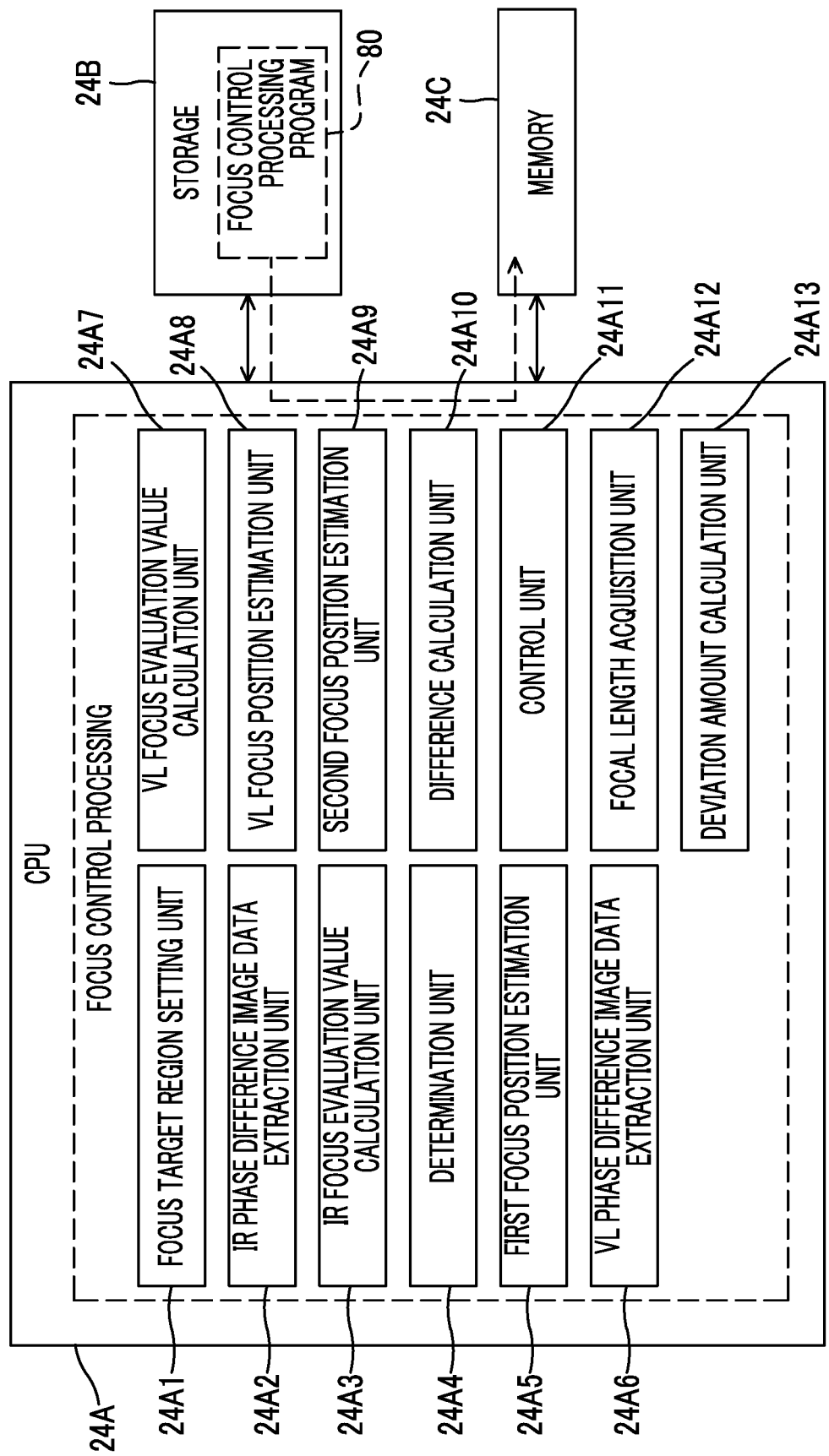
FIG. 30 is a block diagram showing an example of a main function of a CPU provided in the imaging apparatus according to the second embodiment.

As an example, as shown in FIG. 30, the CPU 24A reads out the focus control processing program 80 from the storage 24B and performs the read out focus control processing program 68 on the memory 24C to be operated as the focus target region setting unit 24A1, the IR phase difference image data extraction unit 24A2, the IR focus evaluation value calculation unit 24A3, the determination unit 24A4, the first focus position estimation unit 24A5, the VL phase difference image data extraction unit 24A6, the VL focus evaluation value calculation unit 24A7, the VL focus position estimation unit 24A8, the second focus position estimation unit 24A9, the difference calculation unit 24A10, the control unit 24A11, the focal length acquisition unit 24A12, and a deviation amount calculation unit 24A13.

That is, the focus control processing according to the second embodiment is realized by the CPU 24A being operated as the focus target region setting unit 24A1, the IR phase difference image data extraction unit 24A2, the IR focus evaluation value calculation unit 24A3, the determination unit 24A4, the first focus position estimation unit 24A5, the VL phase difference image data extraction unit 24A6, the VL focus evaluation value calculation unit 24A7, the VL focus position estimation unit 24A8, the second focus position estimation unit 24A9, the difference calculation unit 24A10, the control unit 24A11, the focal length acquisition unit 24A12, and the deviation amount calculation unit 24A13.

In a case in which the determination unit 24A4 determines that the difference absolute value is equal to or smaller than the first threshold value by performing the focus control processing, the CPU 24A selectively performs the control of moving the first lens group 28A along the optical axis OA1 based on the first focus position and a control of moving the first lens group 28A along the optical axis OA1 based on the second focus position in accordance with a degree of deviation of the second focus position from the first focus position to the infinity side.

In addition, in a case in which the focus target region is reduced to the predetermined minimum region, the CPU 24A selectively performs the control of moving the first lens group 28A along the optical axis OA1 based on the first focus position and the control of moving the first lens group 28A along the optical axis OA1 based on the second focus position in accordance with the degree of deviation of the second focus position from the first focus position to the infinity side.

Figure 31:
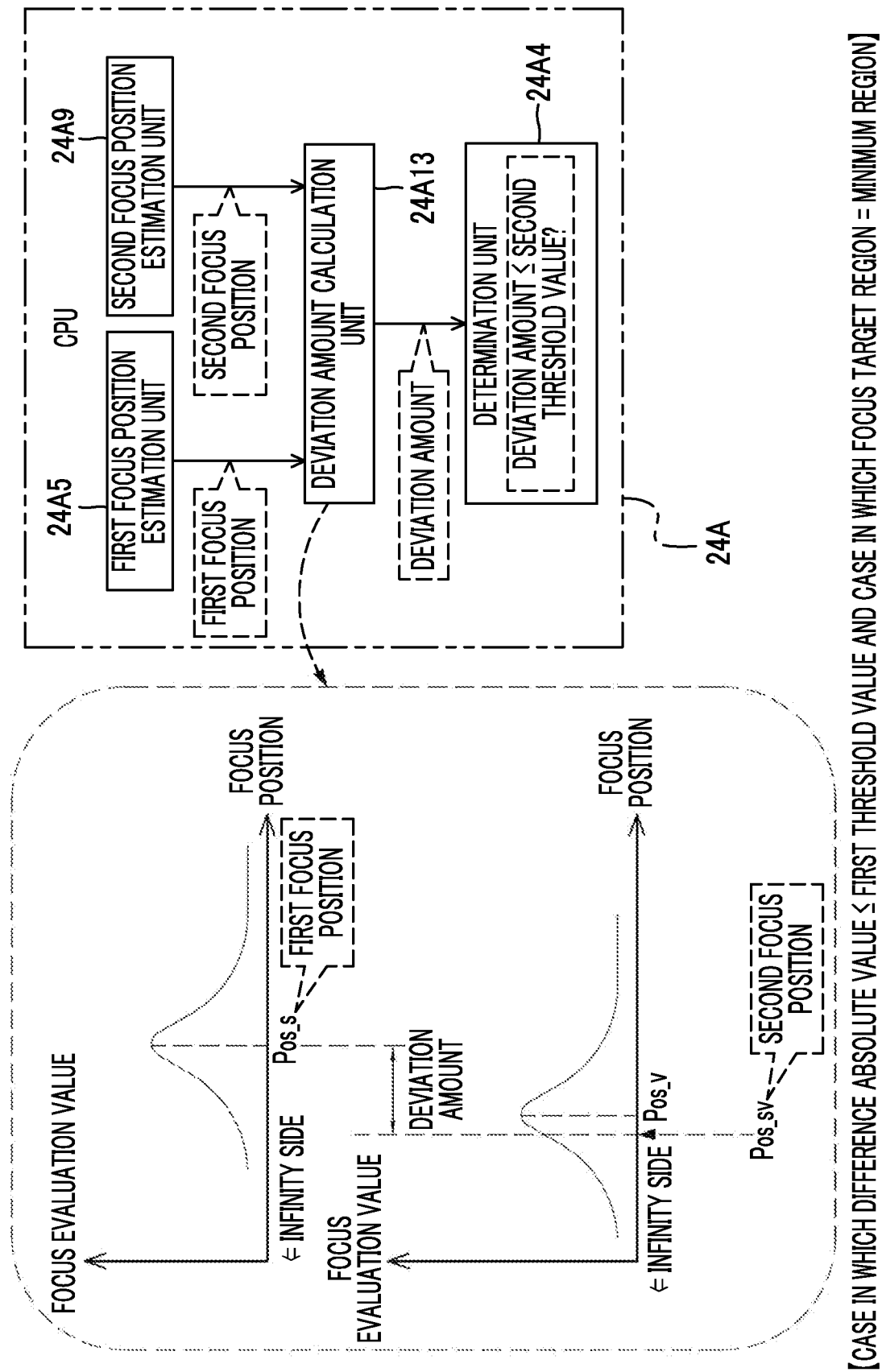
FIG. 31 is a conceptual diagram showing an example of processing contents of the first focus position estimation unit, the second focus position estimation unit, a deviation amount calculation unit, and the determination unit in a case in which the difference absolute value is equal to or smaller than the first threshold value and in a case in which the focus target region is the predetermined minimum region.

As an example, as shown in FIG. 31, in a case in which the determination unit 24A4 determines that the difference absolute value is equal to or smaller than the first threshold value, and in a case in which the determination unit 24A4 determines that the focus target region is the predetermined minimum region, the deviation amount calculation unit 24A13 calculates an amount of deviation (hereinafter, also referred to as a "deviation amount") of the second focus position from the first focus position to the infinity side. Here, as an example of the deviation amount, the absolute value of the difference between the first focus position and the second focus position is adopted. It should be noted that this is merely an example, and a ratio of the first focus position to the second focus position may be used, and any value may be used as long as the degree of deviation of the second focus position from the first focus position to the infinity side can be specified.

The determination unit 24A4 determines whether or not the deviation amount calculated by the deviation amount calculation unit 24A13 is equal to or smaller than the second threshold value. The second threshold value is a fixed value derived in advance as an upper limit value of the deviation amount at which the first focus position can be trusted by, for example, a test with an actual machine and/or computer simulation.

It should be noted that the second threshold value is an example of a "second threshold value" and a "third threshold value" according to the technology of the present disclosure. Although the fixed value is used as the second threshold value, the technology of the present disclosure is not limited to this, and a variable value that can be changed in accordance with various given conditions may be used.

Figure 32:
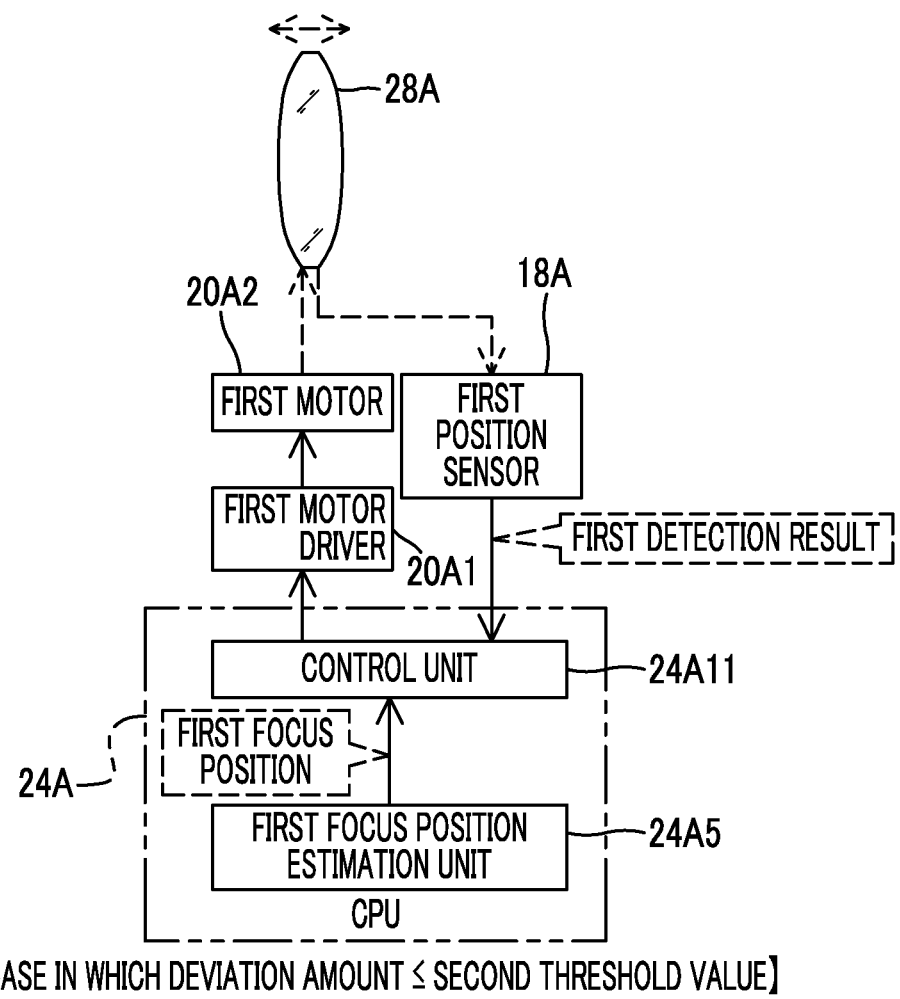
FIG. 32 is a conceptual diagram showing an example of processing contents of the first focus position estimation unit and the control unit in a case in which a deviation amount is equal to or smaller than a second threshold value.

In a case in which the determination unit 24A4 determines that the deviation amount calculated by the deviation amount calculation unit 24A13 is equal to or smaller than the second threshold value, as shown in FIG. 32 as an example, the control unit 24A11 performs the control of moving the first lens group 28A toward the first focus position along the optical axis OA1.

Figure 33:
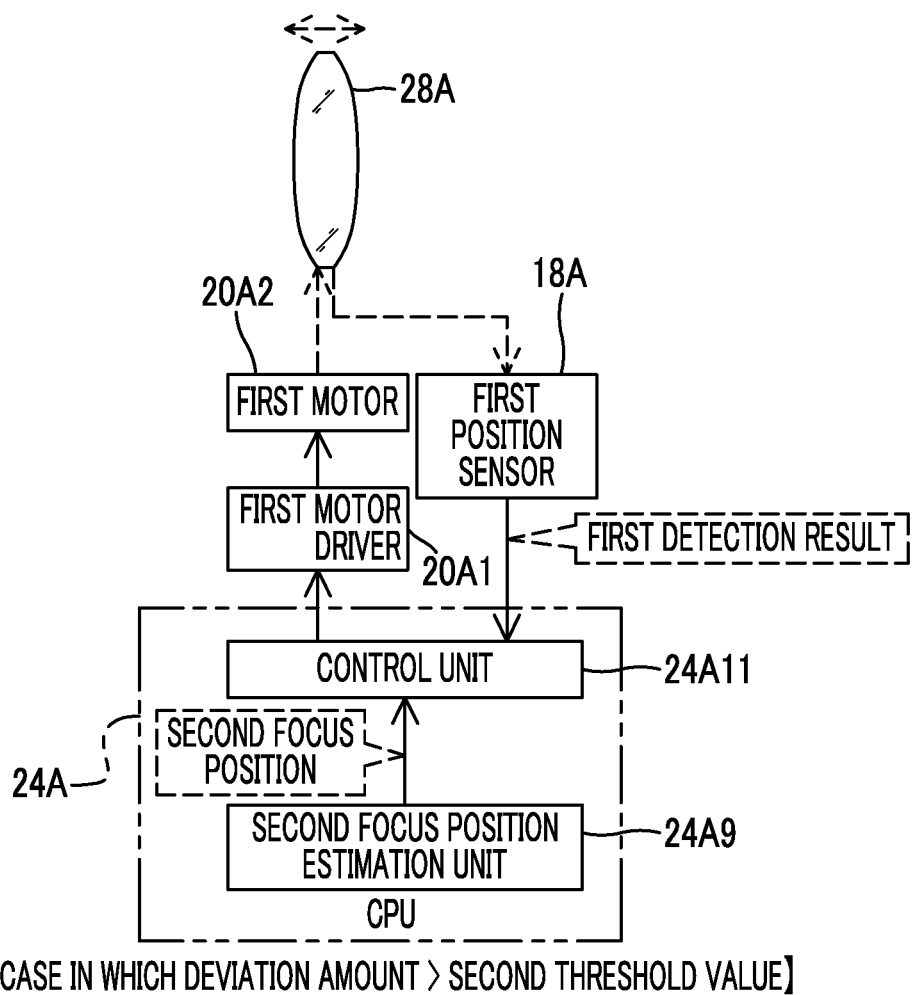
FIG. 33 is a conceptual diagram showing an example of processing contents of the second focus position estimation unit and the control unit in a case in which the deviation amount exceeds the second threshold value.

On the other hand, in a case in which the determination unit 24A4 determines that the deviation amount calculated by the deviation amount calculation unit 24A13 exceeds the second threshold value, as shown in FIG. 33 as an example, the control unit 24A11 performs the control of moving the first lens group 28A toward the second focus position along the optical axis OA1.

Next, the action of the imaging apparatus 100 will be described with reference to FIGS. 34A and 34B.

Figure 34A:
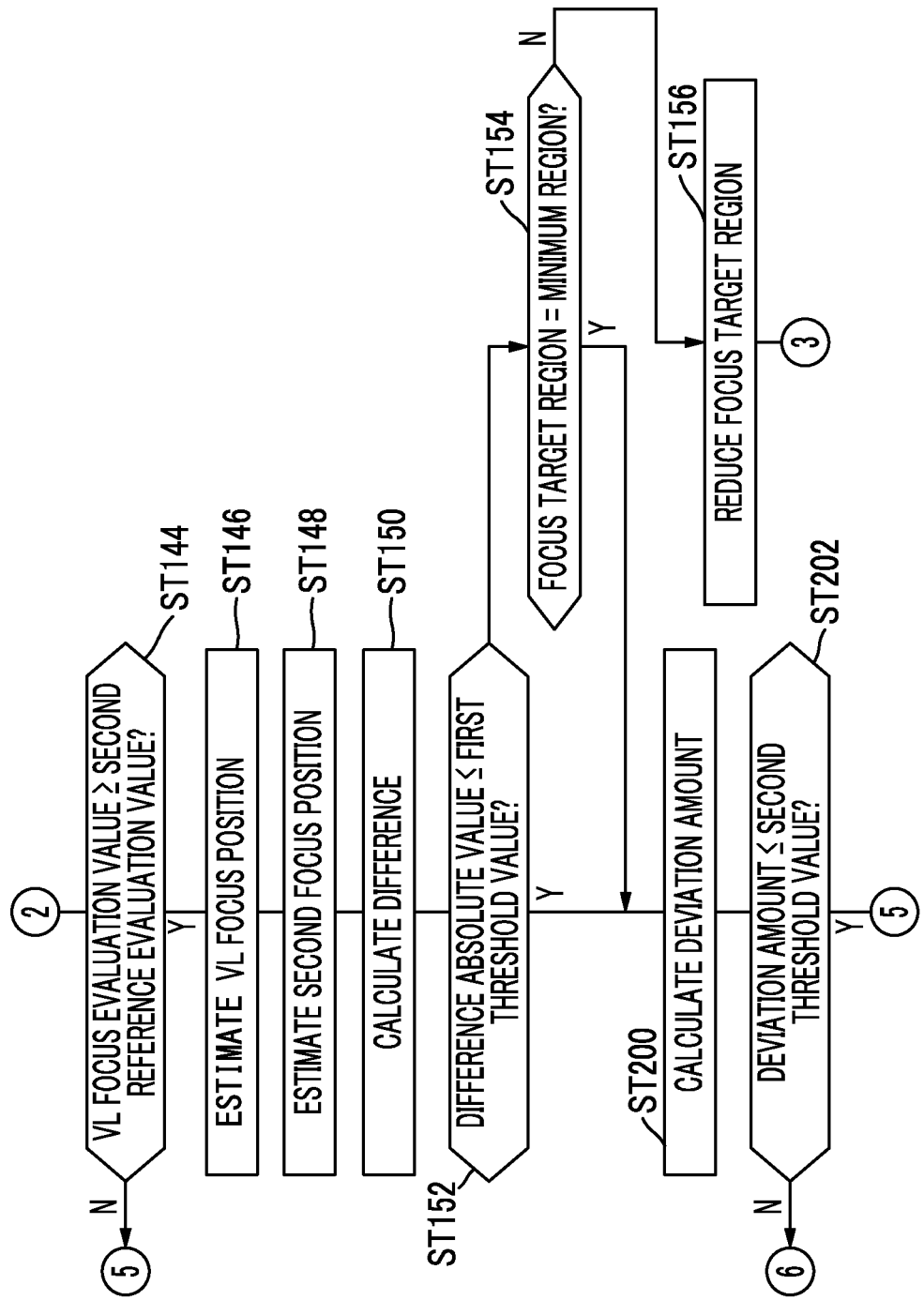
FIG. 34A is a flowchart showing an example of a flow of focus control processing according to the second embodiment.

FIGS. 34A and 34B show examples of a flow of the focus control processing according to the second embodiment. The focus control processing according to the second embodiment is different from the focus control processing (see FIGS. 29A to 29D) described in the first embodiment in that processing of step ST200 (see FIG. 34A), processing of step ST202 (see FIG. 34A), and processing of step ST204 (see FIG. 34B) are provided. In the following, the same steps as the focus control processing described in the first embodiment will be designated by the same step numbers, and processing of the steps different from the focus control processing described in the first embodiment will be described.

In a case in which a positive determination is made in step ST152 shown in FIG. 34A, and in a case in which a positive determination is made in step ST154, the focus control processing proceeds to step ST200. In step ST200, the deviation amount calculation unit 24A13 calculates the deviation amount indicating the degree of deviation from the second focus position estimated in step ST148 from the first focus position estimated in step ST112 (see FIG. 29A) to the infinity side, and then the focus control processing proceeds to step ST202.

In step ST202, the determination unit 24A4 determines whether or not the deviation amount calculated in step ST200 is equal to or smaller than the second threshold value. In step ST202, in a case in which the deviation amount is equal to or smaller than the second threshold value, a positive determination is made, and the focus control processing proceeds to step ST158 shown in FIG. 34B. In a case in which the deviation amount exceeds the second threshold value in step ST202, a negative determination is made, and the focus control processing proceeds to step ST204 shown in FIG. 34B.

In step ST204, the control unit 24A11 performs the control of moving the first lens group 28A toward the second focus position along the optical axis OA1, and then the focus control processing ends.

As described above, in the imaging apparatus 100, in a case in which the comparison result between the first focus position and the second focus position satisfies the predetermined condition (in the example shown in FIG. 34A, in a case in which a positive determination is made in step ST152), the control unit 24A11 selectively performs the control of moving the first lens group 28A along the optical axis OA1 based on the first focus position and the control of moving the first lens group 28A along the optical axis OA1 based on the second focus position in accordance with the degree of deviation of the second focus position from the first focus position to the infinity side. Therefore, with the present configuration, it is possible to easily perform focusing on the infinity side from the nearest side as compared with a case in which focusing is performed while always moving the focus lens along the optical axis based on the first focus position without considering the degree of deviation of the second focus position from the first focus position to the infinity side.

In addition, in the imaging apparatus 100, the deviation amount calculation unit 24A13 calculates the deviation amount as the degree of deviation of the second focus position from the first focus position to the infinity side. Then, in a case in which the deviation amount is equal to or smaller than the second threshold value, the control unit 24A11 performs the control of moving the first lens group 28A along the optical axis OA1 based on the first focus position. Therefore, with the present configuration, it is possible to perform highly reliable focusing on the near-infrared light as compared with a case in which focusing is performed while moving the focus lens along the optical axis based on the second focus position in a case in which the deviation amount is equal to or smaller than the second threshold value.

In addition, in the imaging apparatus 100, in a case in which the deviation amount exceeds the second threshold value, the control unit 24A11 performs the control of moving the first lens group 28A along the optical axis OA1 based on the second focus position. Therefore, with the present configuration, it is possible to perform highly reliable focusing on the near-infrared light as compared with a case in which focusing is performed while moving the focus lens along the optical axis based on the first focus position in a case in which the deviation amount exceeds the second threshold value.

In addition, in the imaging apparatus 100, in a case in which the focus target region is reduced to the predetermined minimum region by the focus target region setting unit 24A1 (in the example shown in FIG. 34A, in a case in which a positive determination is made in step ST154), the control unit 24A11 selectively performs the control of moving the first lens group 28A along the optical axis OA1 based on the first focus position and the control of moving the first lens group 28A along the optical axis OA1 based on the second focus position in accordance with the degree of deviation of the second focus position from the first focus position to the infinity side. Therefore, with the present configuration, it is possible to easily perform focusing on the infinity side from the nearest side as compared with a case in which focusing is performed while always moving the focus lens along the optical axis based on the first focus position without considering the degree of deviation of the second focus position from the first focus position to the infinity side in a case in which the focus target region is reduced to the predetermined minimum region.

In addition, in the imaging apparatus 100, in a case in which the focus target region is reduced to the predetermined minimum region by the focus target region setting unit 24A1 and the deviation amount is equal to or smaller than the second threshold value, the control unit 24A11 performs the control of moving the first lens group 28A along the optical axis OA1 based on the first focus position. Therefore, with the present configuration, it is possible to perform highly reliable focusing on the near-infrared light as compared with a case in which focusing is performed while moving the focus lens along the optical axis based on the second focus position in a case in which the focus target region is reduced to the predetermined minimum region and the deviation amount is equal to or smaller than the second threshold value.

Further, in the imaging apparatus 100, in a case in which the focus target region is reduced to the predetermined minimum region by the focus target region setting unit 24A1 and the deviation amount exceeds the second threshold value, the control unit 24A11 performs the control of moving the first lens group 28A along the optical axis OA1 based on the second focus position. Therefore, with the present configuration, it is possible to perform highly reliable focusing on the near-infrared light as compared with a case in which focusing is performed while moving the focus lens along the optical axis based on the first focus position in a case in which the focus target region is reduced to the predetermined minimum region and the deviation amount exceeds the second threshold value.

It should be noted that, in each of the embodiments described above, the near-infrared light is shown as an example of "first wavelength range light" according to the technology of the present disclosure and the visible light is shown as an example of "second wavelength range light" according to the technology of the present disclosure. However, the technology of the present disclosure is not limited to this, and the technology of the present disclosure is established even in a case in which the visible light is an example of "first wavelength range light" according to the technology of the present disclosure, and the near-infrared light is an example of "second wavelength range light" according to the technology of the present disclosure.

In addition, in each of the embodiments described above, the form example is described in which the difference absolute value is calculated, but the technology of the present disclosure is not limited to this. For example, a ratio of one of the first focus position or the second focus position to the other thereof may be used, and any value may be used as long as the degree of deviation between the second focus position and the first focus position can be specified.

In addition, in each of the embodiments described above, the first image sensor 14 and the second image sensor 16 are described, but the technology of the present disclosure is not limited to this. For example, instead of the first image sensor 14 and the second image sensor 16, an image sensor may be applied in which the first image sensor 14 and the second image sensor 16 are integrated. That is, instead of the first image sensor 14 and the second image sensor 16, a single image sensor may be applied in which the phase difference pixel P1, the non-phase difference pixel N1, the phase difference pixel P2, and the non-phase difference pixel N2 are mixed. In this case, the color separation prism 30 is no longer needed.

In addition, in each of the embodiments described above, the image plane phase difference pixel is described as the phase difference pixel P, but the technology of the present disclosure is not limited to this. For example, the non-phase difference pixels N may be disposed in place of the phase difference pixels P included in the photoelectric conversion elements 40 and 44 (see FIGS. 3 and 4), and a phase difference AF plate including a plurality of phase difference pixels P may be provided in the imaging apparatus 10 separately from the photoelectric conversion elements 40 and 44.

In addition, in the embodiment described above, an AF method using the distance measurement result based on the phase difference image data, that is, the phase difference AF method is described, but the technology of the present disclosure is not limited to this. For example, the contrast AF method may be adopted instead of the phase difference AF method. In addition, the AF method based on the distance measurement result using the parallax of a pair of images obtained from a stereo camera, or the AF method using a TOF method distance measurement result using a laser beam or the like may be adopted.

In addition, in the embodiment described above, the form example is described in which the non-phase difference pixel divided region 40N1 and the phase difference pixel divided region 40P1 are used in combination, but the technology of the present disclosure is not limited to this. For example, an area sensor may be used in which the phase difference image data and the non-phase difference image data are selectively generated and read out instead of the non-phase difference pixel divided region 40N1 and the phase difference pixel divided region 40P1. In addition, in the embodiment described above, the form example is described in which the non-phase difference pixel divided region 44N2 and the phase difference pixel divided region 44P2 are used in combination, but the technology of the present disclosure is not limited to this. For example, an area sensor may be used in which the phase difference image data and the non-phase difference image data are selectively generated and read out instead of the non-phase difference pixel divided region 44N2 and the phase difference pixel divided region 44P2.

In these cases, on the area sensor, a plurality of photosensitive pixels are two-dimensionally arranged. For the photosensitive pixels included in the area sensor, for example, a pair of independent photodiodes in which the light shielding member is not provided are used. In a case in which the non-phase difference image data is generated and read out, the photoelectric conversion is performed by the entire region of the photosensitive pixels (pair of photodiodes), and in a case in which the phase difference image data is generated and read out (for example, a case in which passive method distance measurement is performed), the photoelectric conversion is performed by at one photodiode of the pair of photodiodes. Here, one photodiode of the pair of photodiodes is a photodiode corresponding to the first phase difference pixel L described in the above embodiment, and the other photodiode of the pair of photodiodes is a photodiode corresponding to the second phase difference pixel R described in the above embodiment. It should be noted that the phase difference image data and the non-phase difference image data may be selectively generated and read out by all the photosensitive pixels included in the area sensor, but the technology of the present disclosure is not limited to this, and the phase difference image data and the non-phase difference image data may be selectively generated and read out by a part of the photosensitive pixels included in the area sensor.

In addition, in each of the embodiments described above, the form example is described in which the CMOS image sensor is adopted, but technology of the present disclosure is not limited to this, and other types of image sensors, such as a CCD image sensor, may be used.

In addition, in each of the embodiments described above, the third optical system 34 and the fourth optical system 36 are described, but the technology of the present disclosure is not limited to this, and the technology of the present disclosure is established even in a case in which the third optical system 34 and/or the fourth optical system 36 are not provided.

In addition, in each of the embodiments described above, the form example is described in which the first stop 28E is disposed at a position adjacent to the fourth lens group 28D in the direction of the optical axis OA1 on the object side from the fourth lens group 28D, but the technology of the present disclosure is not limited to this. For example, as shown in FIG. 25, the first stop 28E may be disposed at a position adjacent to the fourth lens group 28D on the image side from the fourth lens group 28D in the direction of the optical axis OA1.

In addition, in each of the embodiments described above, the zoom lens consisting of lenses of the four groups is described as the first optical system 28, but this is merely an example, and the technology of the present disclosure is not limited to this. For example, a zoom lens consisting of lenses of a negative, positive, and positive three groups in order from the object side may be applied, the optical power may be positive, negative, negative, and positive four-group zoom in order from the object side may be applied, the optical power may be positive, negative, positive, positive, and positive five-group zoom in order from the object side may be applied, and any zoom type can be used.

Figure 35:
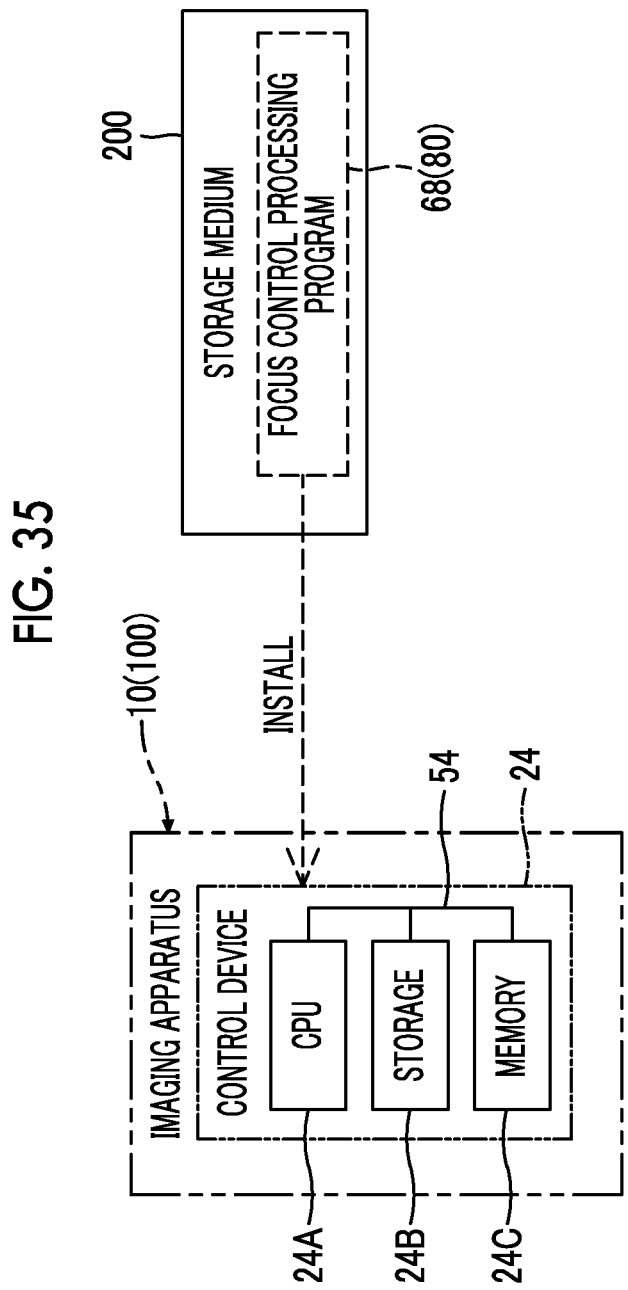
FIG. 35 is a block diagram showing an example of an aspect in which a focus control processing program according to the first and second embodiments is installed in the controller in the imaging apparatus from a storage medium that stores the focus control processing program.

In addition, in each of the embodiments described above, the form example is described in which the focus control processing programs 68 and 80 (in a case in which the distinction is not needed, referred to as the "focus control processing program" without designating the reference numeral) are stored in the storage 24B, but the technology of the present disclosure is not limited to this. For example, as shown in FIG. 35, the focus control processing program may be stored in a storage medium 200. The storage medium 200 is a non-transitory storage medium. Examples of the storage medium 200 include any portable storage medium, such as an SSD or a USB memory.

The focus control processing program, which is stored in the storage medium 200, is installed in the control device 24. The CPU 24A performs the focus control processing in accordance with the focus control processing program.

In addition, the focus control processing program may be stored in the storage unit of another computer or server device connected to the control device 24 via a communication network (not shown), and the focus control processing program may be downloaded in response to a request of the imaging apparatuses 10 and 100 to be installed in the control device 24.

It should be noted that it is not required to store the entire focus control processing program in the storage unit or the storage 24B of another computer or server device connected to the control device 24, and a part of the focus control processing program may be stored.

In the example shown in FIG. 35, the aspect example is described in which the control device 24 is built in the imaging apparatuses 10 and 100, but the technology of the present disclosure is not limited to this, and for example, the control device 24 may be provided outside the imaging apparatuses 10 and 100.

In the example shown in FIG. 35, the CPU 24A is a single CPU, but may be a plurality of CPUs. In addition, a GPU may be applied instead of the CPU 24A.

In the example shown in FIG. 35, the control device 24 is described, but the technology of the present disclosure is not limited to this, and a device including an ASIC, an FPGA, and/or a PLD may be applied instead of the control device 24. In addition, a hardware configuration and a software configuration may be used in combination, instead of the control device 24.

As a hardware resource for performing the focus control processing described in the embodiment, the following various processors can be used. Examples of the processor include a CPU which is a general-purpose processor functioning as the hardware resource for performing the focus control processing by performing software, that is, a program. In addition, examples of the processor include a dedicated electric circuit which is a processor having a circuit configuration designed to be dedicated to performing specific processing, such as the FPGA, the PLD, or the ASIC. A memory is built in or connected to any processor, and any processor performs the focus control processing by using the memory.

The hardware resource for performing the focus control processing may be composed of one of these various processors, or may be composed of a combination (for example, a combination of a plurality of FPGAs or a combination of a CPU and an FPGA) of two or more processors of the same type or different types. In addition, the hardware resource for performing the focus control processing may be one processor.

As a configuring example of one processor, first, there is a form in which one processor is composed of a combination of one or more CPUs and software and the processor functions as the hardware resource for performing the focus control processing. Secondly, as represented by SoC, there is a form in which a processor that realizes the functions of the entire system including a plurality of hardware resources for performing the focus control processing with one IC chip is used. As described above, the focus control processing is realized by using one or more of the various processors as the hardware resources.

Further, as the hardware structure of these various processors, more specifically, it is possible to use an electric circuit in which circuit elements, such as semiconductor elements, are combined. In addition, the focus control processing described above is merely an example. Therefore, it is needless to say that the deletion of an unneeded step, the addition of a new step, and the change of a processing order may be employed within a range not departing from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unneeded parts may be deleted, new elements may be added, or replacements may be made with respect to the description contents and the shown contents above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be incorporated by reference.

What is claimed is:

1. A lens control device comprising:
a processor that performs a control of generating image data for each of first wavelength range light and second wavelength range light by causing an image sensor in which the first wavelength range light and the second wavelength range light are imaged by an imaging lens including a focus lens that is moved along an optical axis to perform imaging for each of the first wavelength range light and the second wavelength range light; and
a memory built in or connected to the processor,
wherein the processor
estimates a first focus position of the focus lens for the first wavelength range light based on a first focus evaluation value determined in accordance with the image data of the first wavelength range light,
estimates a second focus position of the focus lens for the first wavelength range light based on a second focus evaluation value determined in accordance with the image data of the second wavelength range light, and
performs a control of moving the focus lens along the optical axis based on the first focus position in a case in which a comparison result obtained by comparing the first focus position with the second focus position satisfies a predetermined condition.

2. The lens control device according to claim 1,
wherein the comparison result is a value corresponding to a deviation amount between the first focus position and the second focus position, and
the predetermined condition is a condition that is equal to or smaller than a first threshold value.

3. The lens control device according to claim 1,
wherein the processor
estimates a third focus position of the focus lens for the second wavelength range light based on the second focus evaluation value, and estimates the second focus position based on the third focus position and a focal length of the imaging lens.

4. The lens control device according to claim 1,
wherein the processor
estimates the first focus position in a case in which the first focus evaluation value is equal to or larger than a first reference evaluation value, and
estimates the second focus position in a case in which the second focus evaluation value is equal to or larger than a second reference evaluation value.

5. The lens control device according to claim 4,
wherein, in a case in which the second focus evaluation value is smaller than the second reference evaluation value, the processor performs the control of moving the focus lens based on the first focus position.

6. The lens control device according to claim 1,
wherein, in a case in which the comparison result satisfies the predetermined condition, the processor selectively performs the control of moving the focus lens along the optical axis based on the first focus position and a control of moving the focus lens along the optical axis based on the second focus position in accordance with a degree of deviation of the second focus position from the first focus position to an infinity side.

7. The lens control device according to claim 6,
wherein, in a case in which the degree of deviation of the second focus position from the first focus position to the infinity side is equal to or smaller than a second threshold value, the processor performs the control of moving the focus lens along the optical axis based on the first focus position.

8. The lens control device according to claim 7,
wherein, in a case in which the degree of deviation of the second focus position from the first focus position to the infinity side exceeds the second threshold value, the processor performs the control of moving the focus lens along the optical axis based on the second focus position.

9. The lens control device according to claim 1,
wherein, in a case in which the comparison result does not satisfy the predetermined condition, the processor reduces a first focus target region included in a first imaging region imaged by the image sensor, causes the image sensor to image the first imaging region for each of the first wavelength range light and the second wavelength range light, and generates the image data of each of the first wavelength range light and the second wavelength range light.

10. The lens control device according to claim 9,
wherein the processor performs a control of reducing the first focus target region to a predetermined minimum region.

11. The lens control device according to claim 10,
wherein, in a case in which the first focus target region is reduced to the minimum region, the processor selectively performs the control of moving the focus lens along the optical axis based on the first focus position and a control of moving the focus lens along the optical axis based on the second focus position in accordance with a degree of deviation of the second focus position from the first focus position to an infinity side.

12. The lens control device according to claim 11,
wherein, in a case in which the degree of deviation of the second focus position from the first focus position to the infinity side is equal to or smaller than a third threshold value, the processor performs the control of moving the focus lens along the optical axis based on the first focus position.

13. The lens control device according to claim 12,
wherein, in a case in which the degree of deviation of the second focus position from the first focus position to the infinity side exceeds the third threshold value, the processor performs the control of moving the focus lens along the optical axis based on the second focus position.

14. The lens control device according to claim 1,
wherein, in a case in which the first focus evaluation value is smaller than a third reference evaluation value, the processor enlarges a second focus target region included in a second imaging region imaged by the image sensor, causes the image sensor to image the second imaging region for each of the first wavelength range light and the second wavelength range light, and generates the image data for each of the first wavelength range light and the second wavelength range light.

15. The lens control device according to claim 14,
wherein the processor performs a control of enlarging the second focus target region to a predetermined maximum region.

16. The lens control device according to claim 15,
wherein, in a case in which the second focus target region is enlarged to the maximum region and the second focus evaluation value is smaller than a fourth reference evaluation value, the processor performs a control of moving the focus lens to a fourth focus position determined in accordance with a focal length.

17. The lens control device according to claim 1,
wherein the second wavelength range light is visible light, and
the first wavelength range light is light having a longer wavelength than the visible light.

18. An imaging apparatus comprising:
the lens control device according to claim 1; and
the image sensor.

19. An operation method of a lens control device including a processor that performs a control of generating image data for each of first wavelength range light and second wavelength range light by causing an image sensor in which the first wavelength range light and the second wavelength range light are imaged by an imaging lens including a focus lens that is moved along an optical axis to perform imaging for each of the first wavelength range light and the second wavelength range light, and a memory built in or connected to the processor, the method comprising:
estimating a first focus position of the focus lens for the first wavelength range light based on a first focus evaluation value determined in accordance with the image data of the first wavelength range light;
estimating a second focus position of the focus lens for the first wavelength range light based on a second focus evaluation value determined in accordance with the image data of the second wavelength range light; and
performing a control of moving the focus lens along the optical axis based on the first focus position in a case in which a comparison result obtained by comparing the first focus position with the second focus position satisfies a predetermined condition.

20. A non-transitory computer-readable storage medium storing a program executable by a computer to perform a process, the computer being applied to a lens control device including a processor that performs a control of generating image data for each of first wavelength range light and second wavelength range light by causing an image sensor in which the first wavelength range light and the second wavelength range light are imaged by an imaging lens including a focus lens that is moved along an optical axis to perform imaging for each of the first wavelength range light and the second wavelength range light, and a memory built in or connected to the processor, the process comprising:

estimating a first focus position of the focus lens for the first wavelength range light based on a first focus evaluation value determined in accordance with the image data of the first wavelength range light;

estimating a second focus position of the focus lens for the first wavelength range light based on a second focus evaluation value determined in accordance with the image data of the second wavelength range light; and performing a control of moving the focus lens along the optical axis based on the first focus position in a case in which a comparison result obtained by comparing the first focus position with the second focus position satisfies a predetermined condition.

* * * * *